(12) United States Patent
Ross et al.

(10) Patent No.: US 11,595,850 B2
(45) Date of Patent: Feb. 28, 2023

(54) EDGE COMPUTING PLATFORM BASED ON WIRELESS MESH ARCHITECTURE

(71) Applicant: L3VEL, LLC, Wilmington, DE (US)

(72) Inventors: Kevin Ross, Lehi, UT (US); Muhammad Ahsan Naim, Irving, TX (US)

(73) Assignee: L3VEL, LLC, Wilmington, DE (US)

( * ) Notice: Subject to any disclaimer, the term of this patent is extended or adjusted under 35 U.S.C. 154(b) by 0 days.

(21) Appl. No.: 17/506,594

(22) Filed: Oct. 20, 2021

(65) Prior Publication Data

US 2022/0124558 A1  Apr. 21, 2022

Related U.S. Application Data

(60) Provisional application No. 63/094,306, filed on Oct. 20, 2020.

(51) Int. Cl.
  *H04W 28/08* (2009.01)

(52) U.S. Cl.
  CPC ... *H04W 28/0815* (2020.05); *H04W 28/0835* (2020.05); *H04W 28/0858* (2020.05); *H04W 28/0892* (2020.05)

(58) Field of Classification Search
  CPC ......... H04W 28/0815; H04W 28/0835; H04W 28/0858; H04W 28/0892
  See application file for complete search history.

(56) References Cited

U.S. PATENT DOCUMENTS

| 8,385,921 | B1 | 2/2013 | Shousterman et al. |
| 8,406,126 | B1 | 3/2013 | Leiba et al. |
| 9,425,985 | B1 | 8/2016 | Shousterman et al. |

(Continued)

FOREIGN PATENT DOCUMENTS

| KR | 10-2020-0080416 A | 7/2020 |
| WO | 2018083548 A1 | 5/2018 |

(Continued)

OTHER PUBLICATIONS

Grigat et al. 'mmWave Distribution Netowrk Usage Model,' Deutsche Telekom AG, IEEE 802.11-17/1019r2, Slides 1-15, Jul. 11, 2017, 16 pages.

(Continued)

*Primary Examiner* — Ahmed Elallam
(74) *Attorney, Agent, or Firm* — Lee Sullivan Shea & Smith LLP

(57) ABSTRACT

Disclosed herein is an architecture for an edge computing platform based on an underlying wireless mesh network. The architecture includes nodes installed with equipment for operating as part of a wireless mesh network, including (1) a first tier of one or more Point of Presence (PoP) node, (2) a second tier of one or more seed nodes that are each directly connected to at least one PoP node via a PoP-to-seed wireless link, and (3) a third tier of one or more anchor nodes that are each connected to at least one seed node either (i) directly via a seed-to-anchor wireless link or (ii) indirectly via one or more intermediate anchor nodes, one or more anchor-to-anchor wireless links, and one seed-to-anchor wireless link, where at least one node in each of these tiers is further installed with equipment for operating as part of an edge computing platform.

10 Claims, 32 Drawing Sheets

(56) References Cited

U.S. PATENT DOCUMENTS

| | | | |
|---|---|---|---|
| 9,538,331 | B2 | 1/2017 | Ross |
| 9,621,465 | B2 | 4/2017 | Ross |
| 9,860,179 | B2 | 1/2018 | Ross |
| 9,942,776 | B2 | 4/2018 | Ross et al. |
| 9,973,939 | B2 | 5/2018 | Ross |
| 10,027,508 | B2 | 7/2018 | Leiba et al. |
| 10,334,446 | B2 * | 6/2019 | Ashrafi ............ H04L 41/122 |
| D856,962 | S | 8/2019 | Hart et al. |
| 10,530,851 | B1 | 1/2020 | Hart |
| 10,530,882 | B2 | 1/2020 | Ross |
| 10,966,266 | B2 * | 3/2021 | Ross ............ H04B 7/0408 |
| 11,246,180 | B2 * | 2/2022 | Ross ............ H04W 40/20 |
| 11,388,054 | B2 * | 7/2022 | Guim Bernat ........ G06F 9/5072 |
| 2011/0075675 | A1 | 3/2011 | Koodli et al. |
| 2014/0057570 | A1 | 2/2014 | Leiba |
| 2015/0358082 | A1 | 12/2015 | Ross |
| 2018/0331935 | A1 | 11/2018 | Ross et al. |
| 2018/0343685 | A1 | 11/2018 | Hart et al. |
| 2021/0203756 | A1 * | 7/2021 | Yerli ............ H04L 67/34 |
| 2022/0255846 | A1 * | 8/2022 | Ross ............ H04L 45/16 |

FOREIGN PATENT DOCUMENTS

| | | | | |
|---|---|---|---|---|
| WO | WO-2021067140 A1 * | 4/2021 | ............ | H04L 67/10 |
| WO | WO-2021158313 A1 * | 8/2021 | ............ | H04L 47/125 |

OTHER PUBLICATIONS

'View on 5G Architecture,' 5G PPP Architecture Working Group, Version 3.0, Jun. 19, 2019, pp. 1-166 [Retrieved on Jan. 20, 2022]. Retrieved from the Internet: <URL: https://5g-ppp.eu/wp-content/uploads/2019/07/5G-PPP-5GArchitecture-White-Paper_v3.0_PublicConsultation.pdf>.

C.S. Rao et al., 'mmWave Applications in NextGen Wireless Broadband Evolution in 5G Era Impact of Sir JC Bose invention', IEEE India Info., vol. 14, No. 2, Jun. 2019, pp. 64-72 [Retrieved on Jan. 20, 2022]. Retrieved from the Internet: <URL: http://site.ieee.org/indiacouncil/files/2019/07/p64-p72.pdf>.

International Searching Authority, International Search Report and Written Opinion, PCT/US2021/055912, dated Feb. 9, 2022, 9 pages.

* cited by examiner

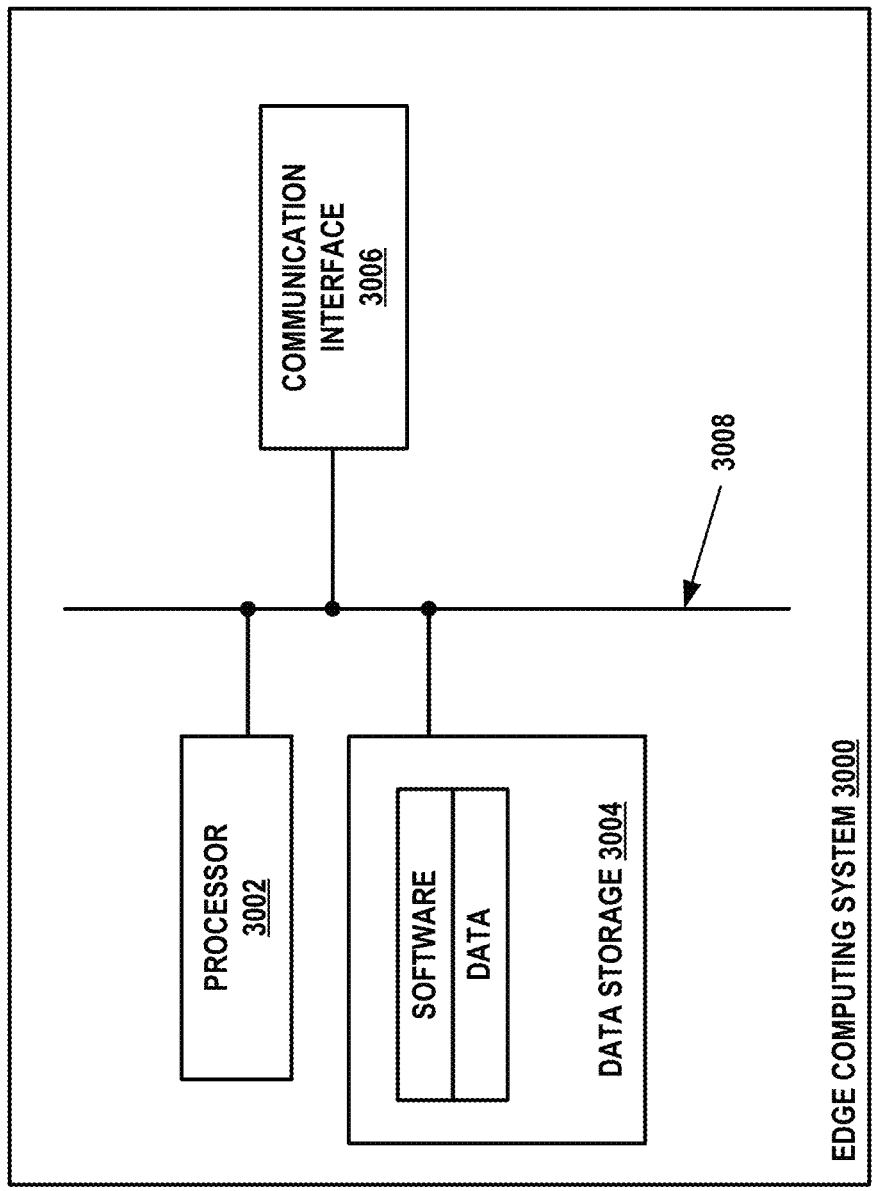

EDGE COMPUTING PLATFORM BASED ON WIRELESS MESH ARCHITECTURE

CROSS-REFERENCE TO RELATED APPLICATIONS

This application claims priority to U.S. Provisional Application No. 63/094,306, filed Oct. 20, 2020 and entitled "NEXT GENERATION EDGE COMPUTING PLATFORM USING MILLIMETER WAVE WIRELESS MESH NETWORK," which is incorporated herein by reference in its entirety.

BACKGROUND

Today, many software applications that run on client devices rely on a back-end computing platform for tasks such as processing and data storage. In practice, such a back-end computing platform typically takes the form of a centralized, cloud-based computing platform that is accessed by client devices over the Internet. However, for some types of modern software applications, it is becoming increasingly difficult for a centralized, cloud-based computing platform to perform these tasks in a manner that complies with bandwidth and/or latency requirements for such software applications. For instance, some modern software applications require a large volume of data to be exchanged between a client device and a back-end computing platform, and if all of that data is required to be sent back to a centralized, cloud-based computing platform for processing and/or data storage, it can consume a significant amount of bandwidth and also suffer from increased latency, which may degrade the responsiveness and usability of the software application. Some examples of software applications where this may present an issue include autonomous vehicle ("AV") applications, industrial automation and/or robotics applications, augmented/virtual reality applications, and video monitoring and/or processing applications, among other possibilities.

OVERVIEW

Due to these and other issues with utilizing a centralized, cloud-based computing platform to perform processing and/or data storage for certain software applications, edge computing platforms have recently emerged as an alternative option for performing back-end processing and/or data storage for a software application that is to be run on client devices. In general, an edge computing platform comprises a distributed computing topology in which computing systems for processing and/or storing data are located closer to where the data for an application is actually generated and/or consumed, which is referred to as the "edge" of the topology. In this respect, software applications that utilize an edge computing platform may be referred herein as "edge computing applications," and the computing systems within the edge computing platform that perform the processing and/or data storage for an edge computing application may be referred to as "edge computing systems."

While existing edge computing platforms do provide bandwidth and latency improvements over centralized, cloud-based computing platforms for certain edge computing applications, the architecture of these existing edge computing platforms still leaves much room for improvement, particularly in terms of the technology used to interconnect the edge computing systems of an edge computing platform, the distribution of the processing power within the edge computing platform (which is typically uniform across the different nodes), and the manner in which processing and data storage tasks for an edge computing application are managed and handled within the edge computing platform.

To address these and other problems with existing edge computing platforms, disclosed herein is a new architecture for an edge computing platform that is built on top of an underlying wireless mesh network architecture comprising multiple different tiers of nodes that are interconnected via wireless point-to-point (ptp) or point-to-multipoint (ptmp) links (e.g., millimeter-wave ptp or ptmp links). For instance, a wireless mesh network constructed in accordance with the present disclosure may comprise (1) a first tier of one or more fiber Point of Presence (PoP) nodes that are each located at a PoP site having fiber access to a core network, (2) a second tier of one or more seed nodes that are each located at a seed site (e.g., a residential or commercial building) and connect back to at least one fiber PoP node via a PoP-to-seed wireless ptp or ptmp link, and (3) a third tier of one or more anchor nodes that are each located at an anchor site (e.g., a residential or commercial building) and connect back to at least one seed node either directly via a seed-to-anchor wireless ptp or ptmp link or indirectly through one or more intermediate anchor nodes, one or more anchor-to-anchor wireless ptp or ptmp links, and one seed-to-anchor wireless ptp or ptmp link.

This wireless mesh architecture (which may sometimes be referred to as a "next generation" wireless mesh network) may be utilized to deliver various types of services to end users, including but not limited to telecommunication services such as high-speed internet. In this respect, one pool of end users may be individuals that are located (e.g., reside or work) at the fiber PoP, seed, and anchor sites for the wireless mesh network, but in addition, end users can receive such service(s) through client nodes that are equipped to connect to the wireless mesh network (and more particularly, to certain nodes of the wireless mesh network such as anchor nodes that are physically closest to the client nodes) via wireless ptp or ptmp links.

In one implementation of the disclosed architecture, the fiber PoP, seed, and anchor nodes of the wireless mesh network may be interconnected together via wireless ptp links, while the client nodes may connect to the wireless mesh network via wireless ptmp links that originate at certain nodes of the wireless mesh network (e.g., anchor nodes). In this respect, the wireless mesh network may be considered to have two different "layers" (or "segments") of wireless links: (1) a first "ptp layer" comprising the wireless ptp links that interconnect the fiber PoP, seed, and anchor nodes together, which may require minimal or no coordination after deployment of the wireless mesh network, and (2) a second "ptmp layer" comprising the wireless ptmp links that connect infrastructure nodes of the wireless mesh network to client nodes, which may require some coordination for frequency planning, interference mitigation, or the like.

In accordance with the present disclosure, some of all of the nodes in the different tiers of the wireless mesh network may then additionally be installed with respective equipment that enables such nodes to operate as part of an edge computing platform, such as respective edge computing systems each comprising hardware and associated software for performing functions related to an edge computing application, while client nodes may be programmed with the capability to operate as endpoints for one or more edge computing applications that utilize the edge computing platform. The edge computing systems installed at the different tiers of nodes in the wireless mesh network may then be configured to communicate with one another via the wireless links described above, which may take the form of millimeter-wave ptp and/or ptmp links that have high capacity (e.g., a bandwidth ranging from 20 gigabits per second to 100 gigabits per second bi-directionally) and low latency (e.g., less than 1 millisecond for ptp links and less than 4 milliseconds for ptmp links). This novel architecture enables the nodes in the wireless mesh network to additionally perform processing and/or data storage for edge computing applications in a distributed manner at sites that are closer to the location where data for the edge computing applications is being generated and/or consumed, which may improve the response time and/or usability of such edge computing applications.

In one implementation of the disclosed architecture, the edge computing systems that are installed at the different tiers of nodes of the wireless mesh network may also have different levels of processing power. For instance, the edge computing systems installed at fiber PoP nodes of a wireless mesh network may generally have the highest level of processing power within the communication system, the edge computing systems installed at seed nodes of the wireless mesh network may generally have the second highest level of processing power within the communication system, and the edge computing systems installed at anchor nodes of the wireless mesh network may generally have the third highest level of processing power within the communication system. In this respect, the processing power of the edge computing systems may be defined based on various factors, examples of which may include clock speed, memory size, number of processing cores, and/or total number of physical computers/servers, among other possibilities.

When engaging in processing and/or data storage for an edge computing application, such an implementation enables the distributed edge computing platform disclosed herein to intelligently balance between (1) utilizing edge computing systems installed at nodes that are closer to an endpoint of an edge computing application such as anchor nodes, which may have lesser processing power than other nodes that are deeper into the distributed edge computing platform but may enable the communication between the endpoint and the nodes to traverse shorter distances (e.g., a lower number of hops) that should theoretically result in lower latency, and (2) utilizing edge computing systems installed at nodes that are further away from an endpoint of an edge computing application such as seed nodes or fiber PoP nodes, which may have more processing power than other nodes that are closer to the edge of the distributed edge computing platform but may require communication between the endpoint and the nodes to traverse longer distances (e.g., a higher number of hops) that may result in increased latency. In this respect, the edge computing systems belonging to the different tiers of the distributed edge computing platform disclosed herein may function to coordinate with one another to arbitrate the utilization of edge computing resources within the platform in a manner that is intended to optimize certain metrics related to the edge computing application, such as response time or bandwidth.

For instance, when an edge computing system installed at a given node receives a request to process data for an edge computing application, the edge computing system may evaluate and balance factors such as (1) the available processing power at the receiving node as compared to other nodes of the distributed edge computing platform, which may be defined in terms of the total available processing power at the nodes and perhaps also the current utilization of the processing power at the nodes (to the extent such information is available), and (2) the expected latency involved in offloading the processing to one or more other nodes in the distributed edge computing platform, which may be defined in terms of a number of hops between the receiving node and the one or more other nodes, the maximum available bandwidth (or minimum possible latency) of each wireless link between the receiving node and the one or more other nodes, and perhaps also the current utilization of each wireless link between the receiving node and the one or more other nodes (to the extent such information is available). The edge computing system at the receiving node may evaluate other factors as well. Based on its evaluation, the edge computing system at the receiving node may then determine an appropriate plan for processing the data for the edge computing application (e.g., a plan that is expected to yield the quickest response time), and if that plan involves processing at one or more other nodes within the distributed edge computing platform, the edge computing system at the receiving node may in turn coordinate with the edge computing system at each of the one or more other nodes in order to cause the processing to be carried out.

Accordingly, in one aspect, disclosed herein is a computing system comprising a set of nodes that are installed with respective equipment for operating as part of a wireless mesh network, the set of nodes comprising (1) a first tier of one or more nodes that are each located at a PoP site having fiber access to a core network, (2) a second tier of one or more nodes that are each located at a seed site (e.g., a residential or commercial building), where each node in the second tier is directly connected to at least one node in the first tier via a PoP-to-seed wireless link, and (3) a third tier of one or more nodes that are each located at an anchor site (e.g., a residential or commercial building), where each node in the third tier is connected to at least one node in the second tier either (i) directly via a seed-to-anchor wireless link or (ii) indirectly via one or more intermediate nodes in the third tier, one or more anchor-to-anchor wireless links, and one seed-to-anchor wireless link, where at least one node in the first tier, at least one node in the second tier, and at least one node in the third tier is further installed with respective equipment (e.g., a respective edge computing system) for operating as part of an edge computing platform.

In example embodiments, the respective edge computing system installed at the at least one node in the first tier has a higher level of processing power than the respective edge computing system installed at the least one node in the second tier, and the respective edge computing system installed at the least one node in the second tier has a higher level of processing power than the respective edge computing system installed at the least one node in the third tier.

Further, in example embodiments, the respective edge computing systems installed at the at least one node in the first tier, the at least one node in the second tier, and the at least one node in the third tier are configured to coordinate with one another to arbitrate utilization of computing resources within the edge computing platform based at least on (i) processing power and (ii) latency.

Further yet, in example embodiments, the computing system may further comprise a client node that is connected to the wireless mesh network via an anchor-to-client wireless link that originates at a given node in the third tier (e.g., whichever node in the third tier is physically closest to the client node), where the client node is configured to operate as an endpoint for an edge computing application that utilizes the edge computing platform. In such example embodiments, each PoP-to-seed wireless link, each seed-to-anchor wireless link, and each anchor-to-anchor wireless link may comprise a millimeter-wave ptp link, while the anchor-to-client wireless link may comprise a millimeter-wave ptmp link.

The foregoing has outlined rather broadly the features and technical advantages of examples according to this disclosure so that the following detailed description may be better understood. Additional features and advantages will be described below. It should be understood that the specific examples disclosed herein may be readily utilized as a basis for modifying or designing other structures for carrying out the same operations disclosed herein. Characteristics of the concepts disclosed herein including their organization and method of operation together with associated advantages will be better understood from the following description when considered in connection with the accompanying figures. It should be understood that the figures are provided for the purpose of illustration and description only.

One of ordinary skill in the art will appreciate these as well as numerous other aspects in reading the following disclosure.

BRIEF DESCRIPTION OF THE DRAWINGS

A further understanding of the nature and advantages the present disclosure may be realized by reference to the following drawings.

FIG. 30 is a simplified block diagram of an edge computing system, in accordance with the present disclosure.

DETAILED DESCRIPTION

Disclosed herein are technologies for wireless mesh networks that serve as the basis for communication systems configured to provide various types of services to end users, including but not limited to telecommunication services such as high-speed internet.

Figure 1:
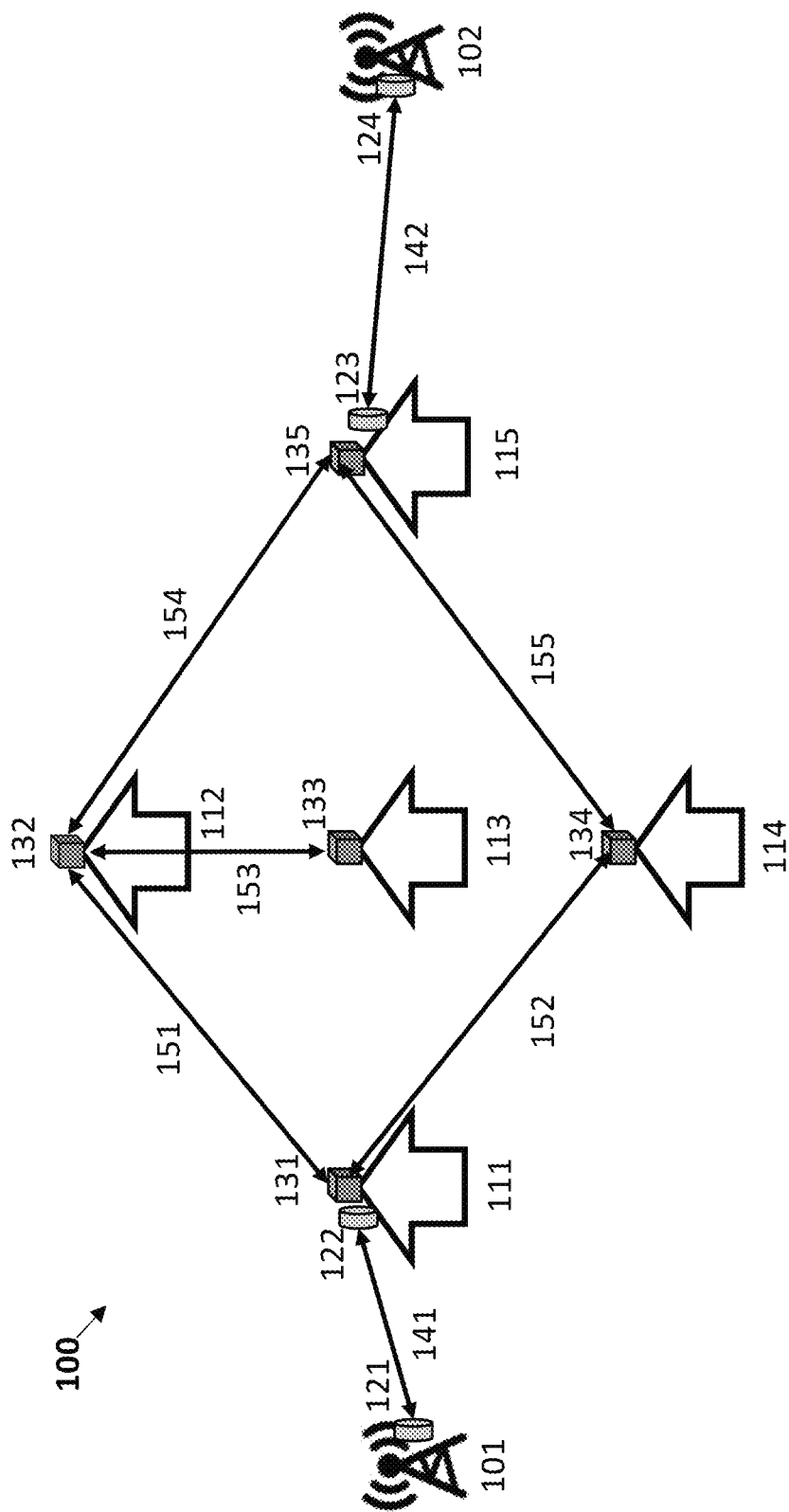
FIG. 1 depicts an example of a communication system that is based on a wireless mesh network, in accordance with the present disclosure.

For instance, the wireless mesh network technologies disclosed herein may form the basis for a data communication system capable of providing multigigabit internet speeds through a mesh network of infrastructure nodes interconnected via wireless point-to-point (ptp) and/or point-to-multipoint (ptmp) links, such as the example communication system 100 illustrated in FIG. 1. As shown, communication system 100 in FIG. 1 includes Tower/fiber access points 101 and 102, which may each also be referred to as a fiber Point of Presence ("PoP"). Tower/fiber access points 101 and 102 can be co-located or can be located at different physical locations. Tower/fiber access points 101 and 102 have access to a high-bandwidth dark (or lit) fiber capable of providing up to several hundred gigabits/second of data throughput. Tower/fiber access points 101 and 102 provide backhaul connectivity to a core network/data center (not shown in the FIG. 1 for the sake of simplicity).

In accordance with the present disclosure, Tower/Fiber access points 101 and 102 may host respective wireless communication equipment that enables Tower/Fiber access points 101 and 102 to operate as wireless communication nodes of a wireless mesh network. In this respect, the Tower/Fiber access points 101 and 102 that are installed with the wireless communication equipment for operating as wireless mesh nodes may each be referred to herein as a "fiber PoP node" of the wireless mesh network shown in FIG. 1.

For instance, as shown, Tower/Fiber access points 101 and 102 may host respective sets of wireless communication equipment 122 and 123 for establishing ptp links with a next tier of wireless communication nodes in the wireless mesh network (which, as noted below, may be referred to as the "seed nodes" of the wireless communication network). The respective sets of wireless communication equipment 121 and 124 are capable of reception and transmission of high bandwidth (multiple gigahertz) signals operating at very high frequencies (e.g., 6 Ghz~100 Ghz such as 28 Ghz, V band, E band, etc.). The respective sets of wireless communication equipment 121 and 124 may each comprise a baseband/digital unit equipped with components including but not limited to a processor, memory, etc. The respective sets of wireless communication equipment 121 and 124 also each comprise an RF unit and an antenna unit for establishing at least one ptp link with another wireless communication node of the wireless mesh network. In at least some embodiments, the antenna subsystem of each respective set of wireless communication equipment 121 and 124 is capable of reception and transmission of directional signals where a significant portion of the signal energy is concentrated within a few degrees around the antenna boresight (e.g., within a range of 0.5 degrees to 5 degrees), both in vertical and horizontal directions, in contrast to omni directional antennas where signal energy is close to evenly spread across 360° degrees.

As further shown in FIG. 1, communication system 100 includes seed homes 111 and 115. Examples of seed homes include detached single-family homes, non-detached residential buildings such as multi-dwelling units (MDUs), commercial buildings such as small/medium businesses (SMB), or some other private property or infrastructure, where communication equipment can be deployed on rooftops of such seed homes among other possibilities. (In this respect, it will be appreciated that a "seed home" need not necessarily be a residential home.) In accordance with the present disclosure, seed homes 111 and 115 may host respective wireless communication equipment that enables seed homes 111 and 115 to operate as wireless communication nodes of a wireless mesh network. In this respect, the seed homes 111 and 115 that are installed with the respective wireless communication equipment for operating as wireless mesh nodes may each be referred to herein as a "seed node" of the wireless mesh network shown in FIG. 1.

For instance, as shown in FIG. 1, seed homes 111 and 115 may host respective sets of wireless communication equipment 122 and 123 for establishing ptp links with the fiber PoP nodes of the wireless mesh network, which may be considered a different tier of the wireless mesh network. The respective sets of wireless communication equipment 122 and 123 are each capable of reception and transmission of high bandwidth (multiple gigahertz) signals operating at very high frequencies (e.g., 6 Ghz~100 Ghz such as 28 Ghz, V band, E band, etc.), which are commonly referred to as millimeter-wave frequencies. The respective sets of wireless communication equipment 122 and 123 may each comprise a baseband/digital unit equipped with components including but not limited to a processor, memory, etc. The respective sets of wireless communication equipment 122 and 123 may also comprise an RF unit and antenna unit for establishing at least one ptp link with another wireless communication node in the wireless mesh network. In at least some embodiments, the antenna subsystem of each respective set of wireless communication equipment 122 and 123 may be capable of reception and transmission of directional signals where a significant portion of the signal energy is concentrated within a few degrees around the antenna boresight (e.g., within a range of 0.5 degrees to 5 degrees), both in vertical and horizontal directions, in contrast to omni directional antennas where signal energy is close to evenly spread across 360° degrees.

For example, wireless communication equipment 121 residing at Tower/fiber access point 101 and wireless communication equipment 122 residing at seed home 111 may work together to form a bi-directional high-bandwidth communication ptp data link 141 that provides connectivity between Tower/fiber access point 101 and seed home 111. Similarly, wireless communication equipment 124 residing at Tower/fiber access point 102 and wireless communication equipment 123 residing at seed home 115 may work together to form a bi-directional high-bandwidth communication ptp data link 142 that provides connectivity between Tower/fiber access point 102 and seed home 115.

As further shown in FIG. 1, seed homes 111 and 115, in addition to wireless communication equipment 122 and 123, may also host respective, second sets of wireless communication equipment 131 and 135 for establishing ptp and/or ptmp links with a next tier of wireless communication nodes in the wireless mesh network (which, as noted below, may be referred to as "anchor nodes" of the wireless mesh network). In the example of FIG. 1, the respective, second sets of wireless communication equipment 131 and 135 may each comprise multiple independent transmission/reception submodules for establishing multiple ptp and/or ptmp links, which may also be referred to as "radio modules." However, it should be understood that the respective, second sets of wireless communication equipment 131 and 135 could also each comprise a single radio module for establishing a single ptp or ptmp link, as opposed to multiple radio modules.

Each module of the respective, second sets of wireless communication equipment 131 and 135 is capable of reception and transmission of high bandwidth (multiple gigahertz) signals operating at very high frequencies (e.g., 6 Ghz~100

Ghz such as 28 Ghz, V band, E band, etc.), which as noted above are commonly referred to as millimeter-wave frequencies. Each module of the respective, second sets of wireless communication equipment 131 and 135 comprises an independent baseband/digital unit equipped with components including but not limited to a processor, memory, etc. Each module in the respective, second sets of wireless communication equipment 131 and 135 also comprises an independent RF unit and independent antenna unit for establishing at least one ptp link or ptmp link with another wireless communication node (or perhaps multiple other wireless communication nodes) in the wireless mesh network. In at least some embodiments, the antenna subsystem of one or more modules of the second set of wireless communication equipment 131 may be a ptp antenna unit that is capable of reception and transmission of directional signals where a significant portion of the signal energy is concentrated within a few degrees around the antenna boresight (e.g., within a range of 0.5 degrees to 5 degrees), both in vertical and horizontal directions, in contrast to omni directional antennas where signal energy is close to evenly spread across 360° degrees. However, in other embodiments, the antenna subsystem of one or more modules of the second set of wireless communication equipment 131 may be a ptmp antenna unit that is capable of beamforming and creating multiple beams simultaneously in different directions. As described in further detail below, the second set of wireless communication equipment 131 may take various other forms as well.

Communication system 100 also includes multiple anchor homes 112, 113 and 114. As with seed homes 111 and 115, anchor homes 112, 113 and 114 may include detached single-family homes, non-detached residential buildings such as MDUs, commercial buildings such as SMBs, or some other private property or infrastructure, where wireless communication equipment can be deployed on rooftops of such anchor homes among other possibilities. (In this respect, it will be appreciated that an "anchor home" need not necessarily be a residential home.) Further, as with seed homes 111 and 115, anchor homes 112, 113 and 114 may host respective wireless communication equipment that enables anchor homes 112, 113 and 114 to operate as wireless communication nodes of a wireless mesh network. However, unlike seed homes 111 and 115, anchor homes are generally not installed with wireless communication equipment that provides a direct wireless connectivity to any Tower/Fiber access point. Instead, anchor homes 112, 113 and 114 are typically only installed with wireless communication equipment for establishing ptp and/or ptmp links with seed nodes and/or with other wireless communication nodes in the same tier of the wireless mesh network, where such wireless communication equipment may be similar to the respective, second sets of wireless communication equipment 131 and 135 for establishing ptp and/or ptmp links that is installed at each of the seed homes 111 and 115. The anchor homes 112, 113 and 114 that are installed with the respective wireless communication equipment for operating as wireless mesh nodes may each be referred to herein as an "anchor node" of the wireless mesh network shown in FIG. 1.

For example, anchor home 112 hosts wireless communication equipment 132. A first module of wireless communication equipment 132 residing at anchor home 112 and another module of wireless communication equipment 131 residing at seed home 111 may work together to form a bi-directional high bandwidth communication ptp data link 151 that provides wireless connectivity between seed home 111 and anchor home 112. Similarly, as another example, a second module of wireless communication equipment 132 residing at anchor home 112 and a module of wireless communication equipment 133 residing at anchor home 113 may work together to form a bi-directional high bandwidth communication ptp data link 153 that provides wireless connectivity between anchor home 112 and anchor home 113. As yet another example, a third module of wireless communication equipment 132 residing at anchor home 112 and a module of wireless communication equipment 135 residing at seed home 115 may work together to form a bi-directional high bandwidth communication ptp data link 154 that provides wireless connectivity between anchor home 112 and seed home 115. As a further example, another module of wireless communication equipment 131 residing at seed home 111 and a module of wireless communication equipment 134 residing at anchor home 114 work together to form a bi-directional high bandwidth communication ptp data link 152 that provides wireless connectivity between anchor home 114 and seed home 111. As still another example, another module of wireless communication equipment 134 residing at anchor home 114 and a module of wireless communication equipment 135 residing at seed home 115 may work together to form a bi-directional high bandwidth communication ptp data link 155 that provides wireless connectivity between anchor home 114 and seed home 115. Other examples are possible as well.

Bi-directional communication links 141, 142, 151, 152, 153, 154 & 155 shown in FIG. 1 can use various different multiple access schemes for transmission and reception including but not limited to frequency division multiple access (FDMA), time division multiple access (TDMA), single carrier FDMA (SC-FDMA), single carrier TDMA (SC-TDMA), code division multiple access (CDMA), orthogonal frequency division multiple access (OFDMA), and/or non-orthogonal multiple access (NOMA) as described in various generations of communication technologies including 1G, 2G, 3G, 4G, 5G and 6G, etc. Further, in at least some embodiments, bi-directional communication links 141, 142, 151, 152, 153, 154 & 155 may each comprise a millimeter-wave link. Further yet, bi-directional communication links 141, 142, 151, 152, 153, 154 & 155 formed by a set of communication nodes comprising two or more of 121, 122, 123, 124, 131, 132, 133, 134, and/or 135 are capable of data information transfer via a variety of digital transmission schemes, including but not limited to amplitude modulation (AM), phase modulation (PM), pulse amplitude modulation/quadrature amplitude modulation (PAM/QAM), and/or ultra-wide band (UWB) pulse modulation (pico-second pulses), etc.

In FIG. 1, two Tower/fiber access points 101 & 102, two seed homes 111 & 115 and three anchor homes 112, 113 & 114 and seven bi-directional ptp data links 141, 142, 151, 152, 153, 154 & 155 are shown to illustrate an example of a communication system that is based on the wireless mesh network technologies disclosed herein. However, in general, it should be understood that communication system 100 can include a different number of Tower/fiber PoP nodes, seed nodes, anchor nodes, and/or communication links, which may depend on the specific layout of a particular instantiation of the communication system deployed in the field. Similarly, although, FIG. 1 shows a particular arrangement of communication equipment 121, 122, 123 & 124 that provides connectivity between a Tower/fiber access point (e.g., Tower/fiber access points 101, 102) and a seed home, as well as a particular arrangement of communication equipment 131, 132, 133, 134 & 135 that provides connectivity between two anchor homes or between an anchor and a seed home, the wireless communication equipment that is installed at the nodes of a wireless mesh network can vary from one communication system to another communication system, which may depend on the specific size and layout of a particular instantiation of the communication system. It should also be understood that communication system 100 may also contain other nodes (e.g., network switches/routers, etc.) that are omitted here for the sake of simplicity.

In line with the discussion above, communication system 100 of FIG. 1 may be utilized to provide any of various types of services to end users, including but not limited to telecommunication services such as high-speed internet. In this respect, it should be understood that one pool of end users of the service(s) provided by communication system 100 may be individuals that reside (or work) at the seed homes and anchor homes of FIG. 1. Additionally, although not shown in FIG. 1, it should be understood that communication system of FIG. 1 may also include client nodes that connect to certain nodes of the communication system (e.g., anchor nodes) via wireless ptp or ptmp links so as to enable other end users to receive the service(s) provided by communication system 100. These client nodes may take various forms, examples of which may include fixed-location customer premise equipment (CPE) and mobile computing devices, among other possibilities.

Figure 2:
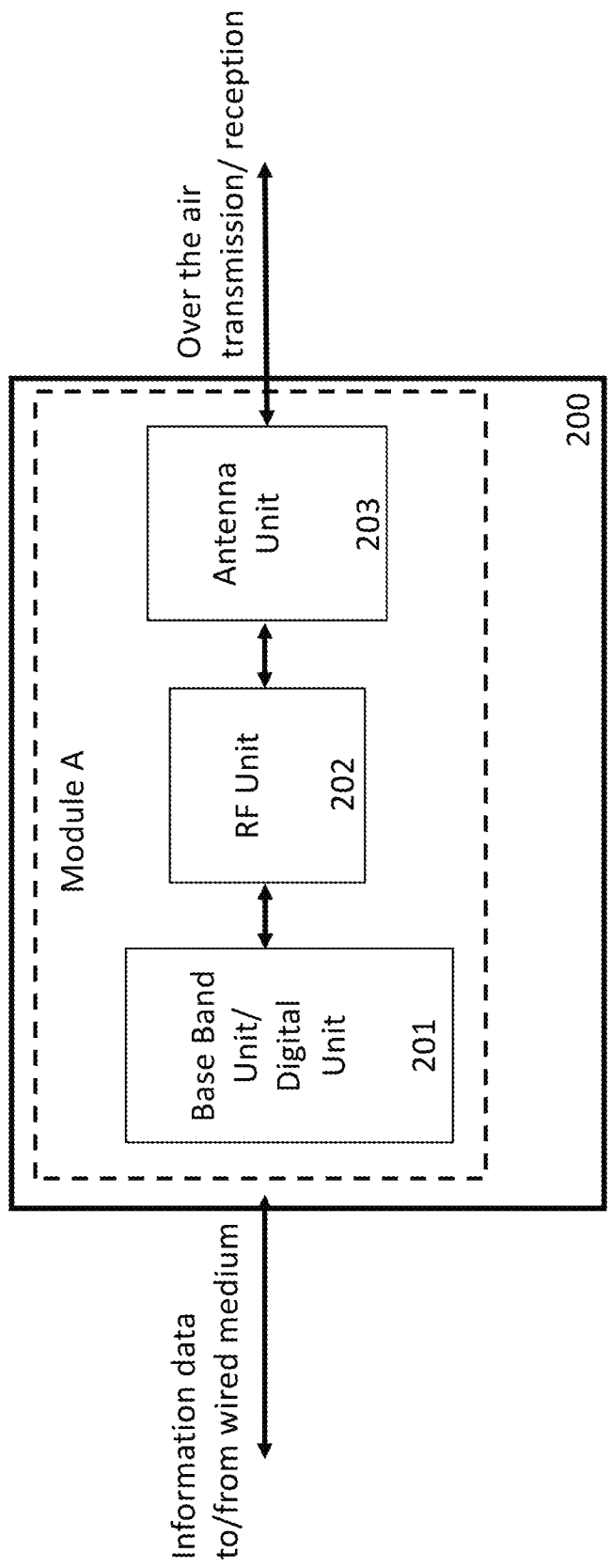
FIG. 2 depicts one possible example of a wireless communication node comprising a Module A type of radio module, in accordance with the present disclosure.

Referring to FIG. 2, one possible example of a wireless communication node of FIG. 1 is shown as a wireless communication node 200 installed with wireless communication equipment that comprises a module labelled as "Module A," which is one type of ptp radio module. As shown, Module A comprises a base band unit or digital unit 201 which runs the physical layer level protocol including digital modulation/demodulation (modem) and other higher layer protocols such as a MAC layer, etc. Base band unit 201 interacts with other nodes of a communication system that are external to the node at which the wireless communication equipment 200 is installed via a wired medium.

Module A also includes RF unit 202 which, among other things, performs processing of intermediate frequency (IF) signals and defines the frequency range of the radio signals that can be transmitted or received via Module A. RF unit 202 is capable of operating over a wide range of frequencies (e.g., V band frequencies ranging from 57 Ghz to 71 Ghz).

Further, as shown, Module A also comprises antenna unit 203 which performs the transmission and reception of over the air radio signals. Antenna unit 203 is capable of transmitting and receiving extremely narrow beam of signals. Antenna unit 203 may be constructed with metamaterials that have excellent properties of controlling the directionality of radio signals that cannot be exhibited by ordinary antennas. Module A with the help of antenna unit 203 is capable of establishing ptp links with a different module residing at a different node of the communication system.

Figure 3:
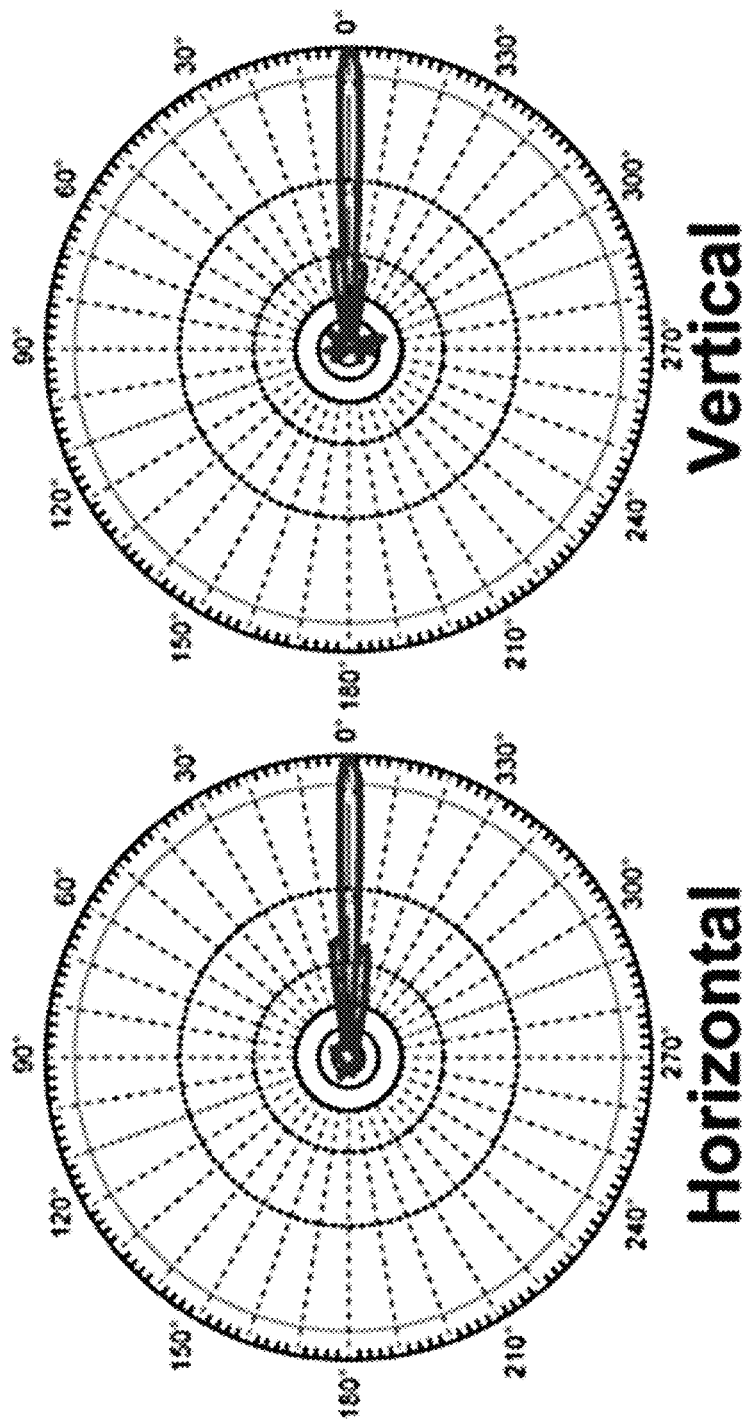
FIG. 3 depicts an example antenna pattern of a Module A type of radio module, in accordance with the present disclosure.

Referring to FIG. 3, an example of an antenna pattern of Module A created by antenna unit 203 is shown. It can be seen from the antenna pattern in FIG. 3 that the beam width of antenna unit 203 of Module A is extremely narrow (less than a degree) and the side lobe power levels start to drop at a rapid rate. For instance, as shown, approximately 5-6 degrees from the main lobe, power levels may drop by more than 30 dB.

It should be understood that the antenna pattern of antenna unit 203 shown in FIG. 3 is just one example showing the extremely narrow beam antenna pattern generation capability of Module A. In other instances, due to a change in antenna elements, size, frequency, etc., different patterns may be generated. Further, while Module A can be constructed using metamaterials described above, it should be understood that Module A can be constructed using a parabolic antenna or other types of antennas. However, it should be understood that the main characteristic of generation of extremely narrow antenna beam pattern is common to all the instances of Module A.

Figure 4:
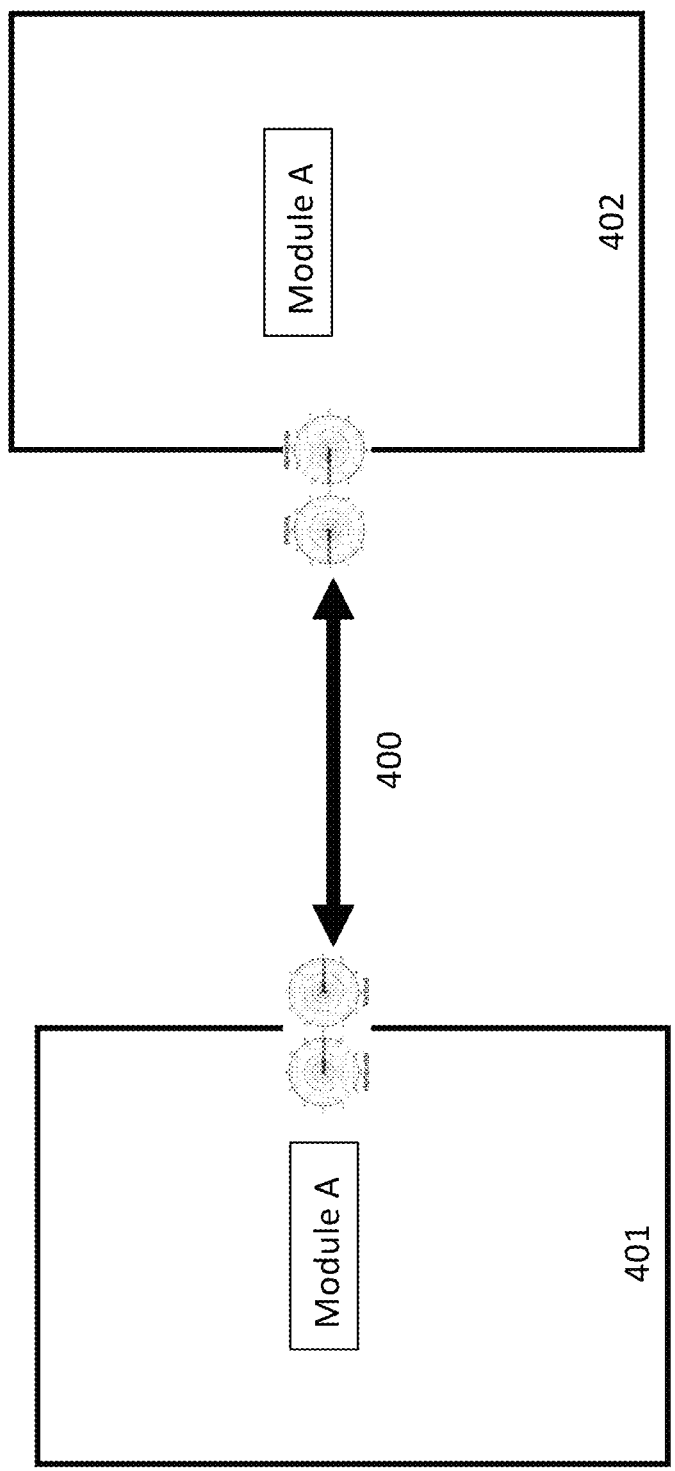
FIG. 4 depicts an example of a point-to-point communication link established between two wireless communication nodes, in accordance with the present disclosure.

Referring to FIG. 4, a ptp wireless communication link 400 established between two wireless communication nodes 401 and 402 is shown. Wireless communication nodes 401 and 402 each host a single communication module (i.e., "Module A") that may take the form similar to Module A depicted in FIG. 2 and described above. As shown in FIG. 4, due to the antenna unit characteristics of each respective Module A in the wireless communication nodes 401 and 402, the bi-directional ptp link 400 may have an extremely narrow beam. This transmission and reception capability of radio signals over an extremely narrow beam via ptp link 400 provides interference immunity in scenarios where there are a large number of wireless communication links established by multiple wireless communication nodes concentrated in a small area and operating in the same frequency.

In some implementations, Module A can additionally provide beam steerability characteristics in addition to the capability of transmitting and receiving data over extremely narrow beams as explained above and illustrated in the context of FIGS. 2-4.

Figure 5:
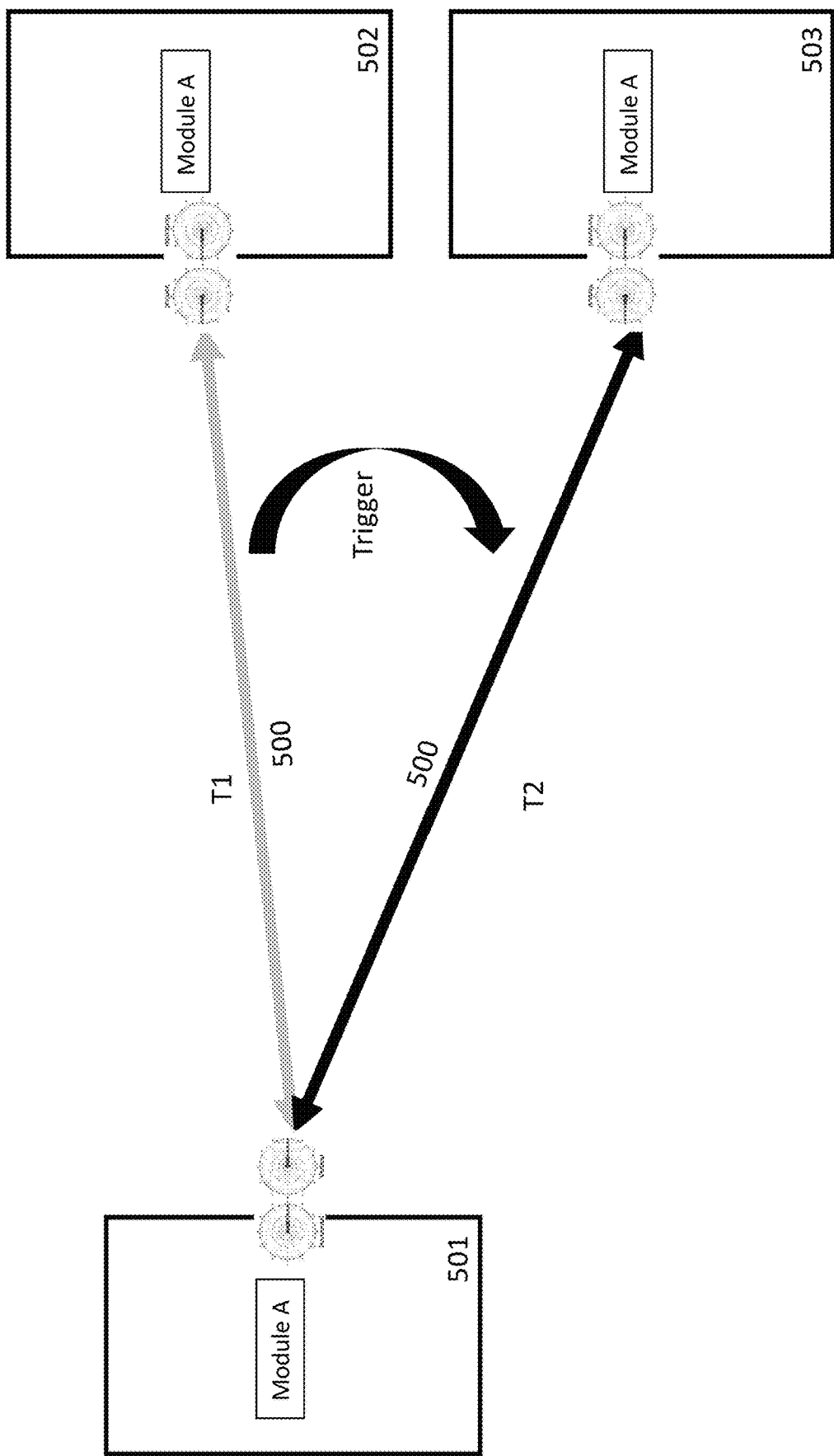
FIG. 5 depicts an example of a wireless communication node invoking beam steering, in accordance with the present disclosure.

For example, referring to FIG. 5, a wireless communication node 501 comprising Module A, a second wireless communication node 502 comprising Module A, and a third wireless communication node 503 comprising Module A is shown. During time T1, Module A of wireless communication node 501 and Module A of wireless communication node 502 work together to establish an extremely narrow beam based bi-directional link 500 for the exchange of information data between wireless communication nodes 501 and 502. Due to some trigger, Module A of wireless communication node 501 may invoke the beam steering capability of the module and change the direction of the antenna transmission and reception beam towards wireless communication node 503 and work together with Module A of wireless communication node 503 to dynamically establish a bi-directional extremely narrow beam-based link 500 between wireless communication node 501 and wireless communication node 503 during time T2. The trigger for this beam steering can be due to changes in the link condition between wireless communication node 501 and wireless communication node 502, which may involve various factors, including but not limited to, a change from a LOS path to a non-LOS path due to a change in environment, increased interference, a change in a position of wireless communication node 502 with respect to wireless communication node 501, and/or instructions from higher layers, etc.

In one embodiment, wireless communication node 503 can be different than wireless communication node 502. In another embodiment, wireless communication node 503 can be the same as wireless communication node 502 but in a different physical location.

In some embodiments, wireless communication nodes defined above and discussed in the context of FIGS. 2-5 can host more than one module. This allows a wireless communication node to communicate simultaneously with multiple other wireless communication nodes of the communication system by establishing multiple extremely narrow beam bi-directional links with the help of multiple modules (e.g., multiple Module As) belonging to different wireless communication nodes working together.

Figure 6:
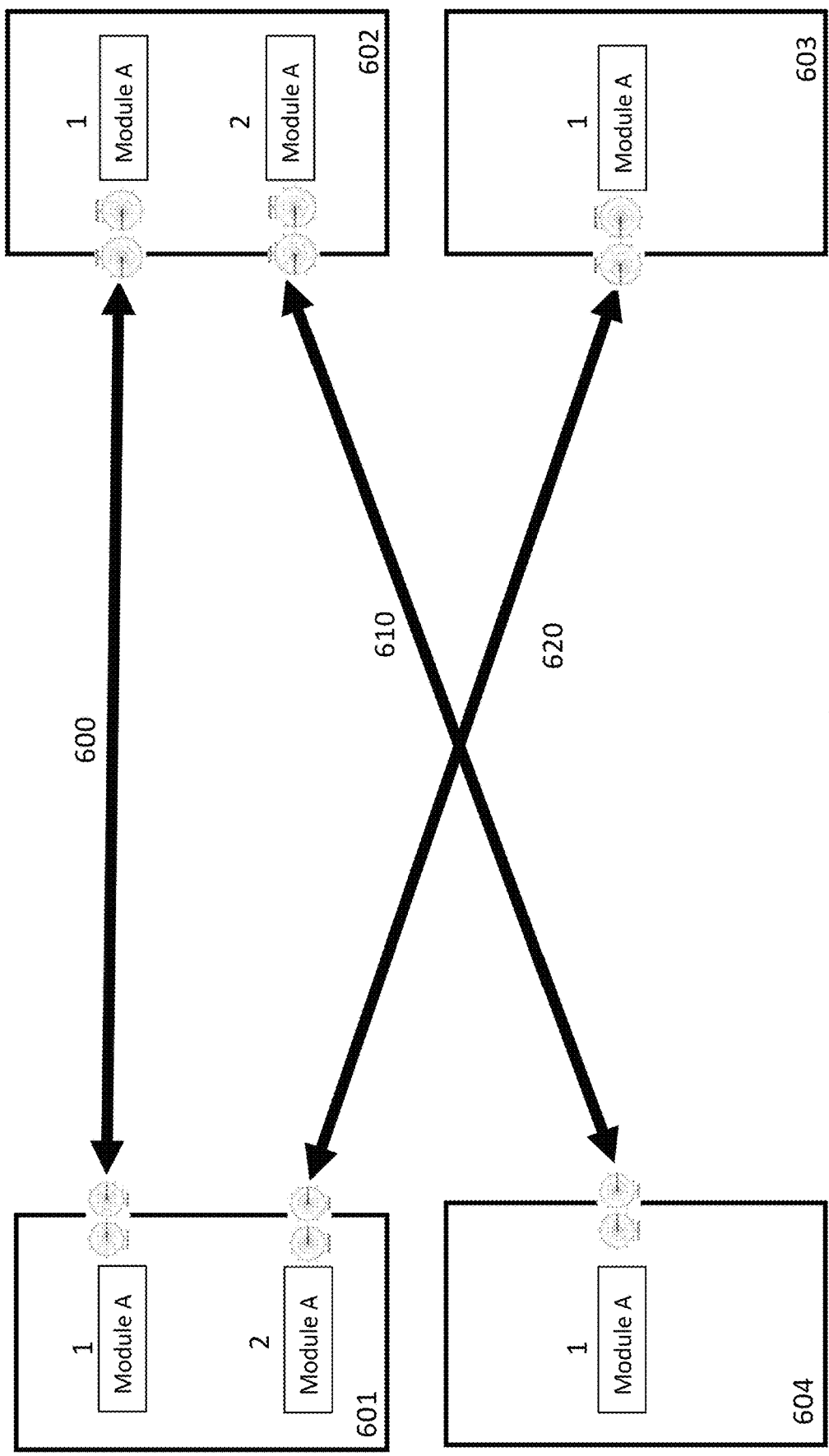
FIG. 6 depicts an example of an arrangement in which certain wireless communication nodes are communicating with multiple other wireless communication nodes, in accordance with the present disclosure.

As one example to illustrate, referring to FIG. 6, wireless communication nodes 601 and 602 each host two Module As labeled "1" and "2," while wireless communication nodes 603 and 604 each host a single Module A. As shown, a $1^{st}$ Module A of wireless communication node 601 and a $1^{st}$ Module A of wireless communication node 602 work together to establish extremely narrow bi-directional beam-based link 600 to provide a wireless connection between wireless communication node 601 and 602. Similarly, a $2^{nd}$ Module A of wireless communication node 601 and 602 and a $1^{st}$ (and only) Module A of wireless communication nodes 603 and 604 respectively work together to establish extremely narrow bi-directional beam-based links 610 and 620 to provide wireless connections between wireless communication nodes 601-603 and 602-604, respectively.

In one embodiment, the $1^{st}$ and $2^{nd}$ Module A of wireless communication nodes 601 and 602 can be inside the same physical enclosure and in other embodiments, the $1^{st}$ Module A of wireless communication nodes 601 and 603 can be inside one physical enclosure and the $2^{nd}$ Module A of wireless communication nodes 601 and 603 can be inside a different physical enclosure. In embodiments where different Module As belonging to the same wireless communication node are contained in separate physical enclosures, these Module As can be connected via a wired link as they are co-located in the same seed home or anchor home.

In FIG. 6, a maximum of two Module As are shown to be contained in a wireless communication node that enables the wireless communication node to establish two independent bi-directional links with different wireless communication nodes simultaneously. However, it should be understood that a wireless communication node can host more than two Module As and the maximum number of Module As that a wireless communication node can host may depend on the maximum total power available to the wireless communication node.

Further, it should be understood that in one embodiment, all Module As belonging to the same wireless communication node may operate on the same carrier frequencies of a frequency band, and in other embodiments, different Module As belonging to same wireless communication node may operate on different carrier frequencies of a frequency band.

Figure 7:
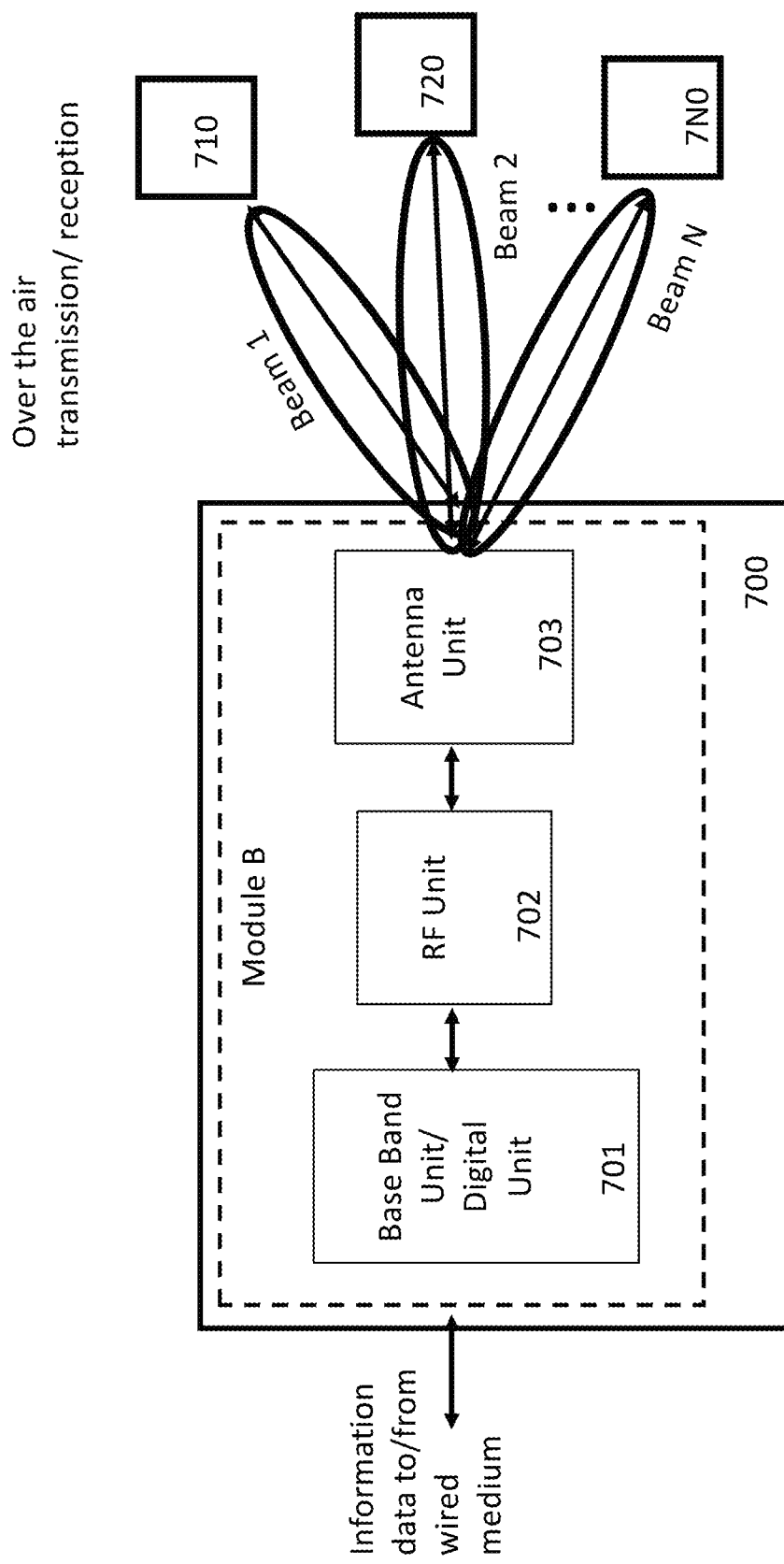
FIG. 7 depicts another possible example of a wireless communication node comprising a Module B type of radio module, in accordance with the present disclosure.

Referring to FIG. 7, another possible example of a wireless communication node of FIG. 1 is shown as a wireless communication node 700 installed with wireless communication equipment that comprises a single module labeled as "Module B," which is one type of ptmp radio module. For purposes of illustration only, wireless communication node 700 of FIG. 7 is shown to be engaging in over-the-air transmission and/or reception with multiple other wireless communication nodes 710 to 7N0.

Module B comprises base band unit or digital unit 701 which runs the physical layer level protocol including digital modulation/demodulation (modem) and other higher layer protocols such as a MAC layer, etc. Base band unit 701 interacts with other nodes of a communication system that are external to the node at which the wireless communication node 700 is installed via wired medium.

Module B also includes RF unit 702, which among other things processes IF signals and defines the frequency range of the radio signals that can be transmitted or received with Module B. RF unit 702 is capable of operating over a wide range of frequencies (e.g., V band frequencies ranging from 57 Ghz to 71 Ghz).

Further, Module B comprises antenna unit 703, which performs the transmission and reception of over the air radio signals. Antenna unit 703 may be an active antenna system (AAS) that comprises a phased array of transmitters and receivers that are capable of beamforming and creating multiple beams simultaneously in different directions. By virtue of the simultaneous creation of multiple beams in different directions, AAS of antenna unit 703 enables the wireless communication node 700 to establish ptmp wireless communication links with multiple wireless communication nodes. Hence Module B with the help of antenna unit 703 is capable of establishing ptmp links with a different module residing in a different wireless communication node.

As further shown in FIG. 7, Module B residing in wireless communication node 700 is shown to create 1 to N multiple beams with the help of AAS of antenna unit 703. Value N depends on the number of transmit and receive antennas in AAS of antenna unit 703. Specifically, it can be seen that wireless communication unit 700 is connected to wireless communication unit 710, wireless communication unit 720, and wireless communication unit 7N0 via bi-directional beam 1, beam 2 and beam N respectively. It can also be seen from the antenna pattern in FIG. 7 that the beam width of the ptmp beams of antenna unit 703 of Module B are not extremely narrow (e.g., 3 dB beam width of 7-10 degree) and side lobes power levels do not start to drop at a rapid rate, which is in contrast to the antenna pattern of the antenna unit belonging to Module A described above and discussed in the context of FIGS. 2-6.

Further, Module B of wireless communication node 700 also differs from Module A (discussed above in the context of FIGS. 2-6) in that the multiple bi-directional links operate in a single frequency range at a given time. For example, signal beams 1 to N that connect wireless communication node 700 to wireless communication nodes 710 to 7N0 respectively may only operate within the same frequency range at a given instant of time. It is to be noted that at a different instant, all beams 1 to N can switch to operate at a frequency range different from the frequency range used in the previous time instant, however, frequency range of an individual beam remains the same as the frequency range of all the other N−1 beams at a given instant of time. Hence, with respect to Module B, although due to phased antenna arrays can create multiple beams to create point-to-multi point links to connect one wireless communication node with multiple wireless communication nodes as shown in FIG. 7, an interference profile at the receiver side with such a ptmp arrangement is inferior to an interference profile of an arrangement where a wireless communication node hosts multiple Module As and creates multiple ptp links as shown in FIG. 6, where wireless communication node 601 uses two Module As to connect to wireless communication node 602 and wireless communication node 603 simultaneously. The main reasons of high interference with Module B may be due to (1) individual phased antenna array-based beams that are not as narrow as extremely narrow beams generated by metamaterial-based antenna of Module A and/or (2) all beams of Module B belonging to one wireless communication unit that cannot operate at different frequency ranges unlike multiple ptp narrow beams of wireless communication node that host multiple Module As.

Figure 8:
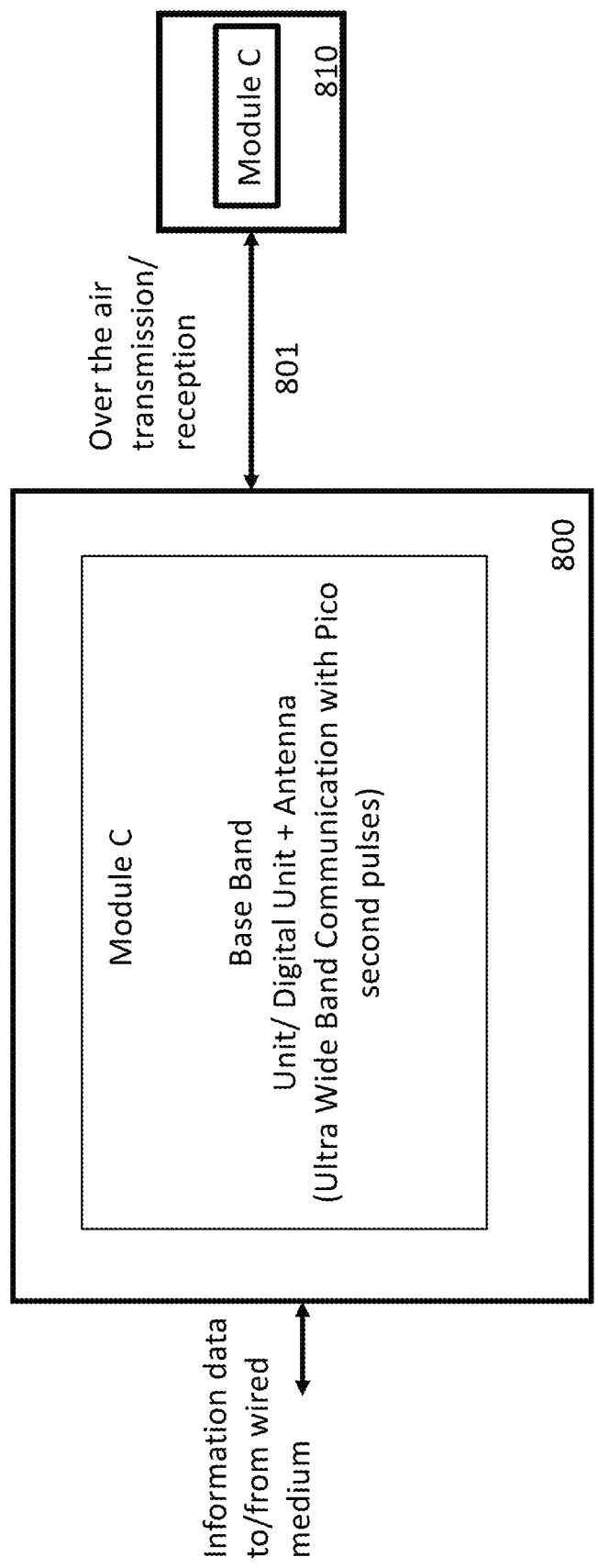
FIG. 8. depicts yet another possible example of a wireless communication node comprising a Module C type of radio module, in accordance with the present disclosure.

Referring to FIG. 8, still another possible example of a wireless communication node of FIG. 1 is shown as a wireless communication node 800 installed with wireless communication equipment that comprises a module labeled as "Module C," which is another type of ptp radio module. For purposes of illustration only, wireless communication node 800 of FIG. 8 is shown to be engaging in over-the-air transmission and/or reception with another wireless communication node 810 that is also hosting a Module C type of ptp radio module.

Module C comprises a base band unit or digital unit which runs the physical layer level protocol including digital modulation/demodulation (modem) and other higher layer protocols such as MAC layer etc. Module C's baseband unit interacts with other nodes of a communication system that are external to the wireless communication node 800 via wired medium.

Module C also includes an ultra-wide band antenna embedded with the baseband unit. Module C is capable of generation, transmission, and reception of extremely short duration pulses (a few picoseconds long) and uses pulse modulation (and its variations such as pulse amplitude modulation, etc.) to transmit data at extremely high rates (e.g., greater than 100 Gbps) by transmitting signals over a very wide range of frequencies. In one embodiment, pulses used for communication by Module C can use frequencies ranging from few hundred megahertz to few hundred gigahertz. One of ordinary skill in the art will appreciate that the range of frequencies used by pulses generated by Module C of wireless communication unit 800 can take a different range as well. Moreover, multiple module Cs can be placed together to create a 1-, 2-, or 3-dimensional array. Elements of this array (e.g., module C) are capable of performing a time synchronized transmission for beam forming. This allows the RF signal energy of the Pico second/UWB pulses to focus in a desired (receiver) direction and can also enable the creation of null or low RF signal energy of the Pico second/UWB pulse in other directions to avoid interference.

One fundamental difference between the characteristic of signals generated by Module C and signals generated by Module A and/or Module B is that these signals generated by Module C are ultra wide band (UWB) signals and their power spectral density over the entire range of frequencies is very low. In this respect, these UWB signals do not create interference with other signals operating on a narrow band of frequencies as these UWB signals are treated as noise by receivers of normal wireless communication nodes.

As further shown in FIG. 8, Module C of wireless communication node 800 and Module C of wireless communication unit 810 establish a link 801 by working together. As explained above, such a communication link 801 operates over an ultra-wide range of frequencies. However, even in the presence of other wireless communication nodes (not shown in FIG. 8) such as wireless communication nodes with Module A or Module B that operate on a narrow band of frequencies compared to Module C of wireless communication node 800, network performance is not impacted as power spectral density over the frequency range of communication link 801 that overlaps with frequency ranges on which a nearby wireless communication node using narrow band signals using for example Module A and/or Module B operates is very low and is treated as noise by the receivers of Module A and/or Module B.

In another embodiment, and in line with the discussion above, a wireless communication node of FIG. 1 can host multiple types of modules. This allows a wireless communication node to communicate simultaneously with multiple wireless communication nodes and with two different interference profiles.

Figure 9:
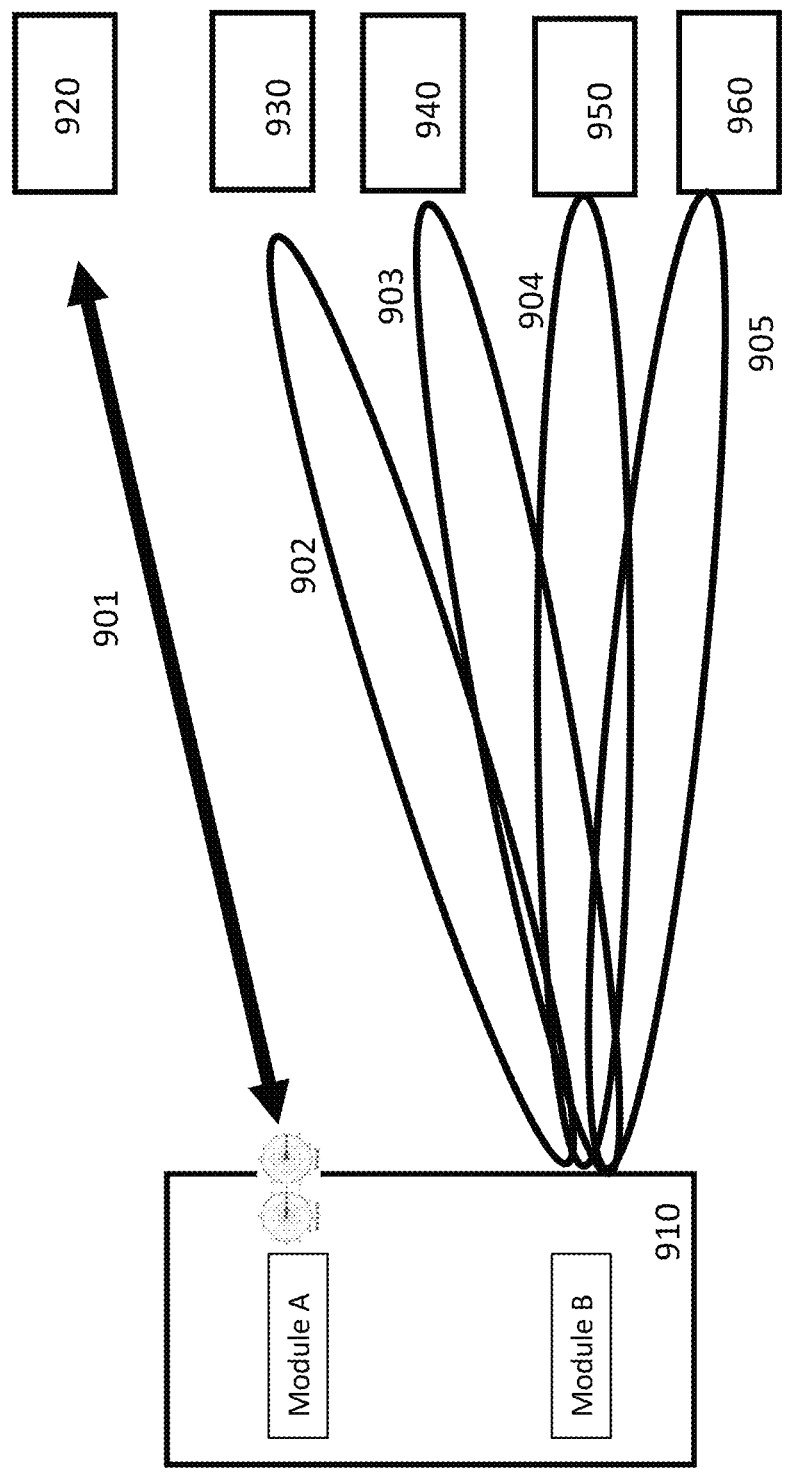
FIG. 9 depicts an example of a wireless communication node comprising Module A and Module C types of radio modules, in accordance with the present disclosure.

As one example to illustrate, referring to FIG. 9, an example wireless communication node 910 is shown that hosts one Module A and one Module B. As shown in FIG. 9, Module A of wireless communication node 910 and a communication module of an example wireless communication node 920 may work together to establish an extremely narrow bi-directional beam-based link 901 to provide wireless connection between wireless communication nodes 910 and 920. Additionally, Module B of wireless communication node 910, which is based on AAS and generates multiple beams simultaneously, may create a ptmp link that connects wireless communication node 910 with example wireless communication nodes 930, 940, 950 and 960. Specifically, Module B of wireless communication node 910 coordinates with (1) a module of wireless communication node 930 to establish bi-directional beam 902, (2) a module of wireless communication node 940 to establish bi-directional beam 903, (3) a module of wireless communication node 950 to establish bi-directional beam 904, and (4) a module of wireless communication node 960 to establish bi-directional beam 905. In one embodiment, extremely narrow beam 901 and group of beams including 902, 903, 904 and 905 may all operate within the same range of carrier frequencies at a given time. In another embodiment, extremely narrow beam 901 may operate within a different range of frequencies compared to the range of frequencies used by the group of beams including 902, 903, 904 and 905 at a given time.

In one embodiment, Module A and Module B of wireless communication node 910 can be inside the same physical enclosure. In other embodiments, Module A and Module B of wireless communication node 910 can be inside two separate physical enclosures. In such embodiments where Module A and Module B belong to the same wireless communication node contained in separate physical enclosures, Module A and Module B can be connected via a wired link as they are co-located in the same seed home or anchor home.

In FIG. 9, a total of two modules (i.e., a single Module A and a single Module B) are shown to be part of a wireless communication node 910 that enables the wireless communication node to establish two independent and different types of bi-directional links with different wireless communication nodes simultaneously. However, it should be understood that wireless communication node 910 can host more than two modules (e.g., a combination of one or more Module As and one or more Module Bs) and the maximum number of total modules that a wireless communication node can host may depend on various factors, including but not limited to the maximum total power available to the wireless communication node. Further, it should be understood that in one embodiment, all modules belonging to same wireless communication node may operate on the same carrier frequencies of a frequency band but in other embodiments, different modules belonging to the same wireless communication node may operate on different carrier frequencies of a frequency band.

As noted above, a wireless communication node of FIG. 1 can host more than one type of module. This allows a wireless communication node to communicate simultaneously with multiple wireless communication nodes and with different interference profiles.

Figure 10:
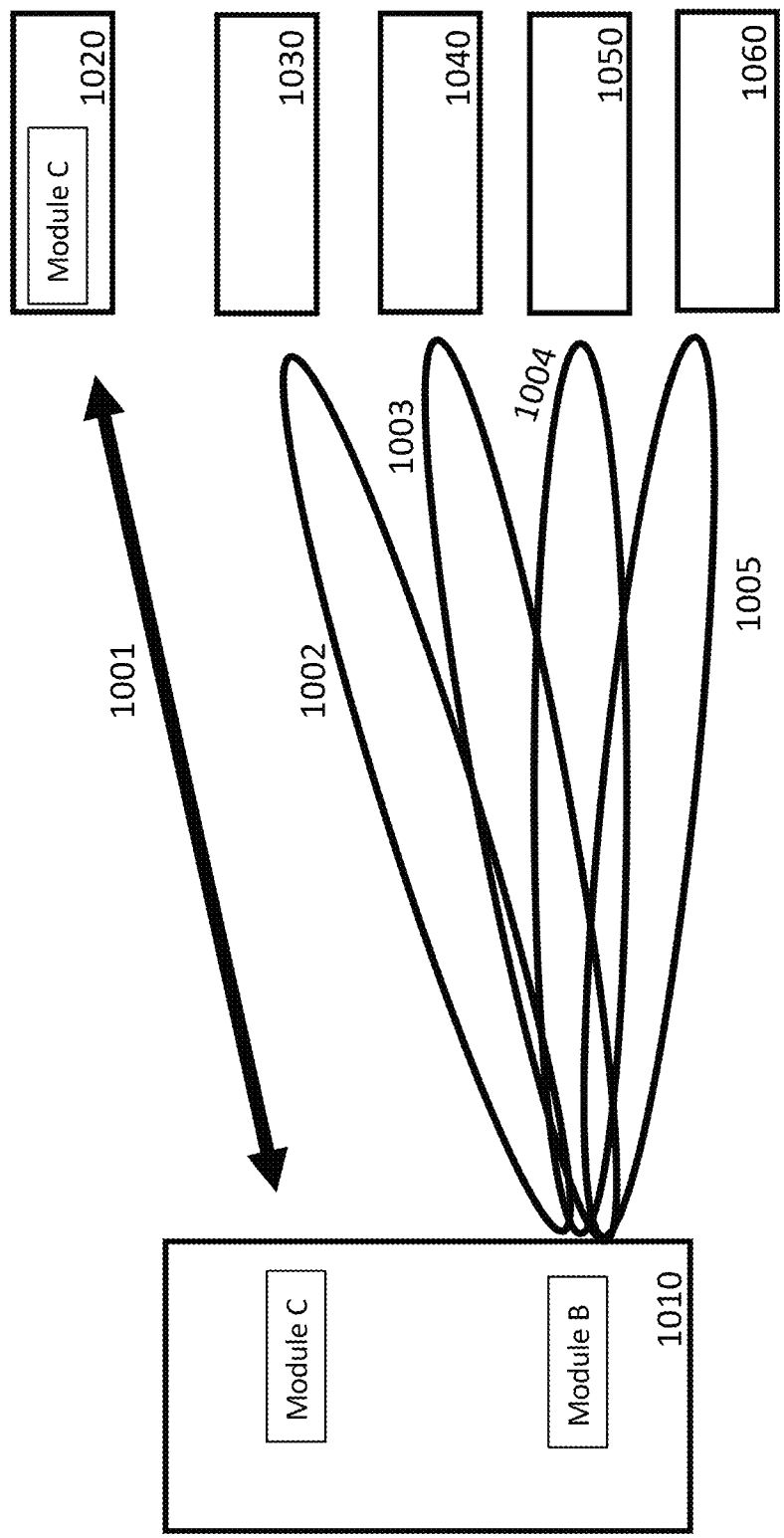
FIG. 10 depicts an example of a wireless communication node comprising Module B and Module C types of radio modules, in accordance with the present disclosure.

As another example to illustrate, referring to FIG. 10, an example wireless communication node 1010 is shown that hosts one Module C and one Module B. As shown in FIG. 10, Module C of wireless communication node 1010 and Module C of an example wireless communication node 1020 may work together to establish extremely high data rate ultra-wide frequency and low power spectral density beam-based link 1001 to provide wireless connection between wireless communication nodes 1010 and 1020. Additionally, Module B of wireless communication node 1010, which is based on AAS and generates multiple beams simultaneously, may create a ptmp link that connects wireless communication node 1010 with example wireless communication nodes 1030, 1040, 1050 and 1060. Specifically, Module B of wireless communication node 1010 coordinates with (1) a module of wireless communication node 1030 to establish bi-directional beam 1002, (2) a module of wireless communication node 1040 to establish bi-directional beam 1003, (3) a module of wireless communication node 1050 to establish bi-directional beam 1004, and (4) a module of wireless communication node 1060 to establish bi-directional beam 1005.

In one embodiment, Module C and Module B of wireless communication node 1010 can be inside same physical enclosure. In other embodiments, Module C and Module B of wireless communication node 1010 can be inside two separate physical enclosures. In such an embodiment where Module C and Module B belong to the same wireless communication node contained in separate physical enclosures, Module C and Module B can be connected via a wired link as they are co-located in same seed home or anchor home.

In FIG. 10, a total of two modules (i.e., a single Module C and a single Module B) are shown to be part of a wireless communication node 1010 that enables the wireless communication node to establish two independent and different types of bi-directional links with different wireless communication nodes simultaneously. However, it should be understood that wireless communication node 1010 can host more than two types of module (e.g., a combination of Module A, Module B and/or Module C) and the maximum number of total modules that a wireless communication node can host may depend on various factors, including the maximum total power available to the wireless communication node. It should be also understood that in one embodiment, all modules belonging to same wireless communication node may operate on same carrier frequencies of a frequency band, while in other embodiments, different modules belonging to same wireless communication node may operate on different carrier frequencies of a frequency band.

In another embodiment, a wireless communication node of FIG. 1 can host more than one type of module and dynamically change the type of link between wireless communication nodes. This allows a wireless communication node to communicate simultaneously with multiple wireless communication nodes and with different interference profiles and to adapt with changes in the network environment.

Figure 11A:
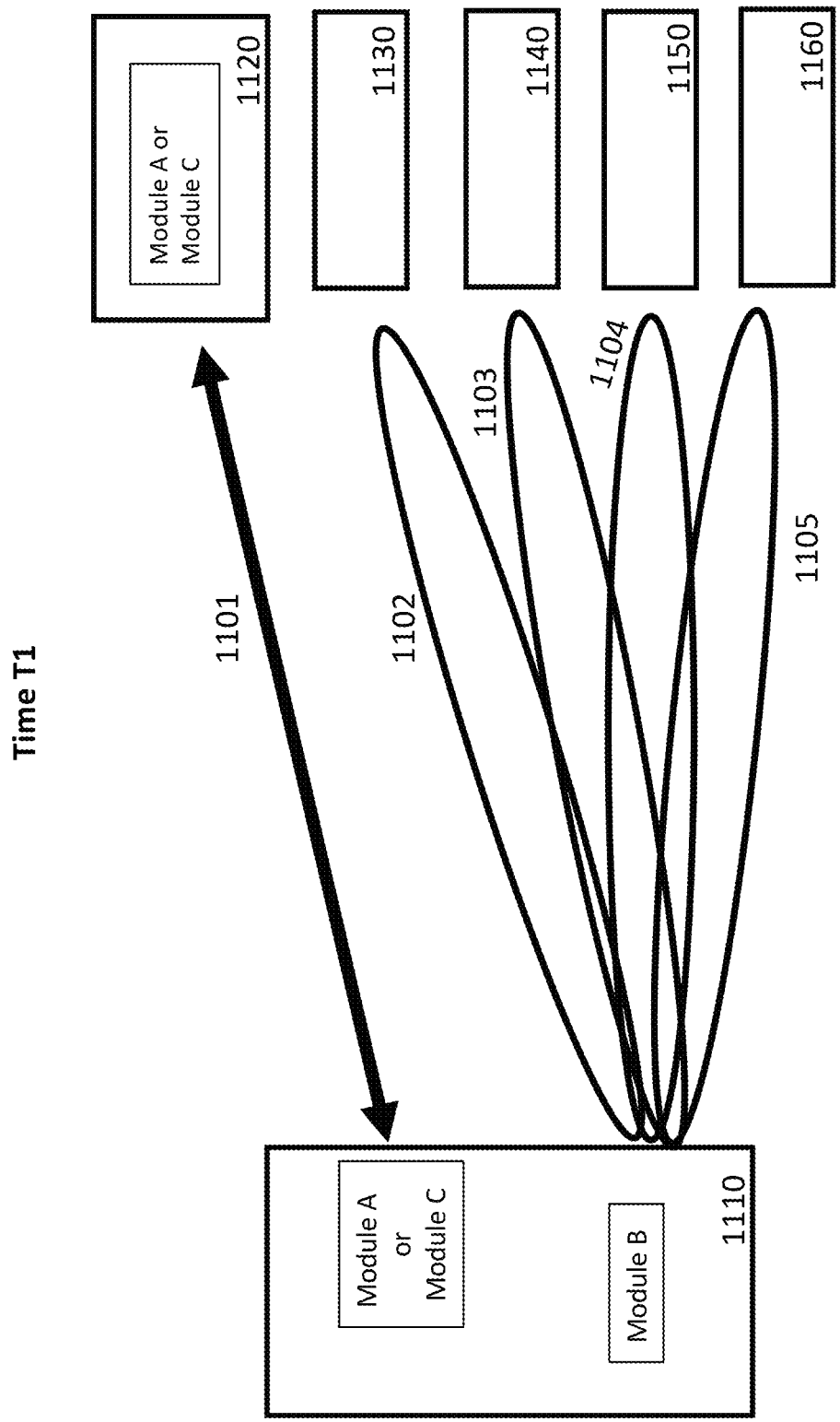
FIG. 11A depicts an example of a wireless communication node communicating with multiple other wireless communication nodes at a first time, in accordance with the present disclosure.

As one example to illustrate, referring to FIG. 11A, an example wireless communication node 1110 is shown that hosts a Module C or Module A along with a Module B. During time T1, Module A/Module C of wireless communication node 1110 and a communication module of an example wireless communication node 1120 may work together to establish either an extremely high date rate ultra-wide frequency low power spectral density beam or an extremely narrow beam-based link 1101 to provide a wireless connection between wireless communication nodes 1110 and 1120. At substantially the same time duration T1, Module B of wireless communication node 1110, which is based on AAS and generates multiple beams simultaneously, may create a ptmp link that connects wireless communication node 1110 with example wireless communication nodes 1130, 1140, 1150 and 1160. Specifically, Module B of wireless communication node 1110 coordinates with (1) a module of wireless communication node 1130 to establish bi-directional beam 1102, (2) a module of wireless communication node 1140 to establish bi-directional beam 1103, (3) a module of wireless communication node 1150 to establish bi-directional beam 1104, and (4) a module of wireless communication node 1160 to establish bi-directional beam 1105.

Figure 11B:
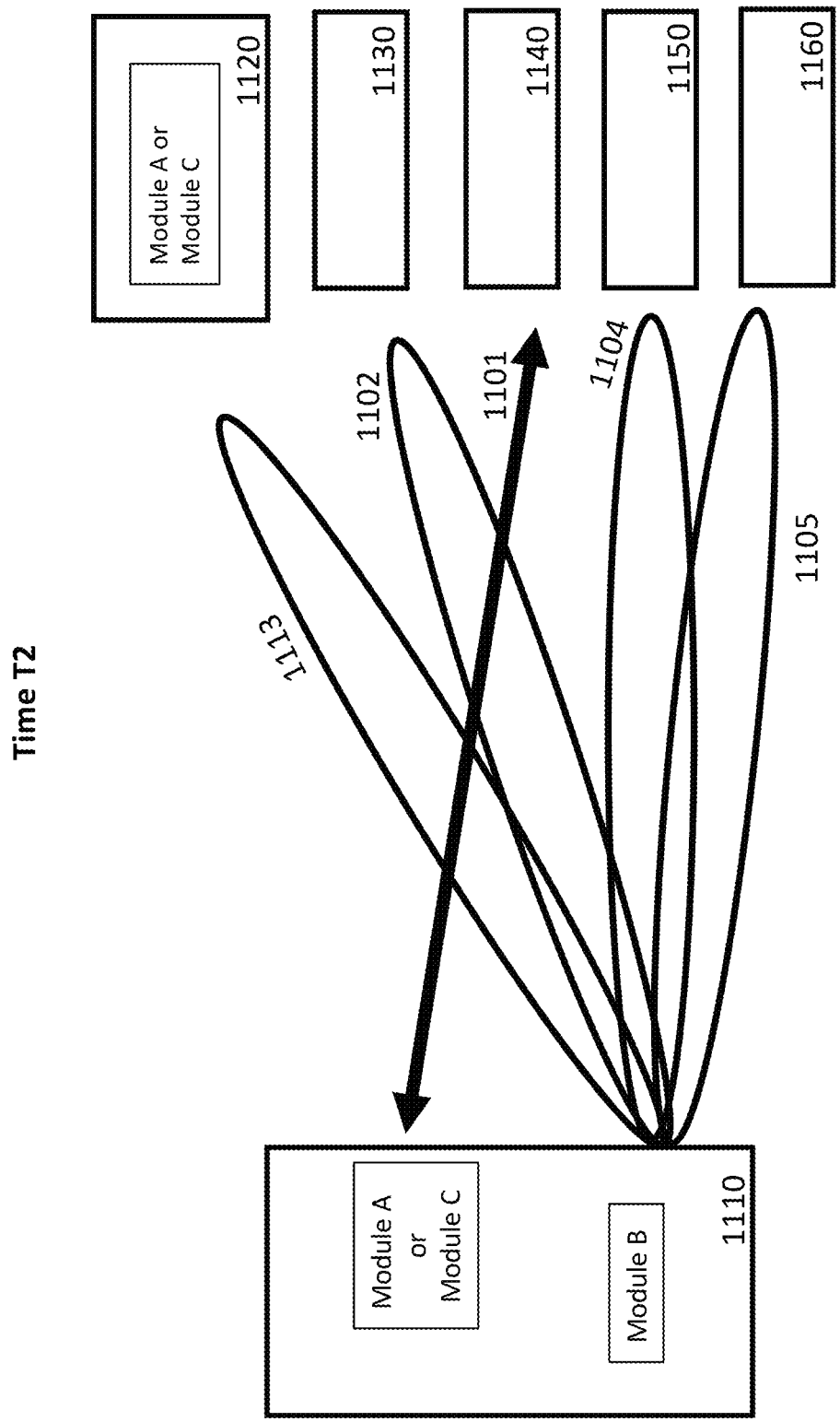
FIG. 11B depicts an example of a wireless communication node communicating with multiple other wireless communication nodes at a second time after the wireless communication node has engaged in beam steering to dynamically change its wireless connections, in accordance with the present disclosure.

Referring to FIG. 11B, at a different time T2, due to some trigger, Module A/Module C of wireless communication node 1110 may dynamically switch its wireless link from wireless communication node 1120 to wireless communication node 1140 by steering the beam towards wireless communication node 1140. At the same time or after receiving instructions from a higher layer, Module B of wireless communication node 1110 disconnects its link with wireless communication node 1140 via beam 1103 and generates a new beam 1113 in the direction of wireless communication node 1120 and establishes connection with wireless communication node 1120. Trigger for this beam steering can be due to changes in the link condition between wireless communication node 1110 and wireless communication node 1120 or 1140, which may involve various factors, including but not limited to change from a LOS path to a non-LOS path due to a change in environment, increased interference, a change in position of wireless communication node 1120 or 1140 with respect to wireless communication node 1110, instructions from higher layers, etc.

As shown in FIGS. 11A-B, dynamic link switching may occur between wireless communication nodes 1110, 1120 and 1140. However, it should be understood that dynamic switching can also occur between different communication nodes.

In some instances, one or more wireless communication nodes of FIG. 1 may leave the wireless mesh network. In such case, links between nodes may be dropped and the communication network may dynamically re-align itself by adjusting/switching link types between the remaining number of wireless communication nodes in the wireless mesh network to best suit the needs to the wireless communication nodes and the wireless mesh network.

In some embodiments, wireless communication nodes 1120, 1130, 1140, 1150 and 1160 can host multiple modules of the same or different types. For example, one or more of wireless communication nodes 1120, 1130, 1140, 1150 and 1160 can host one Module A and one Module B. Hence, when wireless communication node 1110 makes a ptp link using its Module A or Module C with a first communication module (e.g., Module A or C) of wireless communication nodes 1120, 1130, 1140, 1150 and 1160, then a second communication module (e.g., Module B) of wireless communication nodes 1120, 1130, 1140, 1150 and 1160 can simultaneously create ptmp wireless communication links with other modules of wireless communication nodes in the communication system that are not shown here. Similarly, when wireless communication node 1110 makes a ptmp link using its Module B with the first communication module (e.g., Module A or C) of wireless communication nodes 1120, 1130, 1140, 1150 and 1160, then the second communication module (e.g., Module B) of wireless communication nodes 1120, 1130, 1140, 1150 and 1160 can simultaneously create ptmp wireless communication links with other modules of wireless communication nodes in the communication system that are not shown here.

As another example, one or more of wireless communication nodes 1120, 1130, 1140, 1150 and 1160 can host two Module As or Module Cs. Hence, when wireless communication node 1110 makes a ptp link using its Module A or Module C with the first Module A or C of wireless communication nodes 1120, 1130, 1140, 1150 and 1160, then the second Module A or Module C of wireless communication nodes 1120, 1130, 1140, 1150 and 1160 can simultaneously create ptp wireless communication links with other modules of wireless communication nodes in the communication system that are not shown here. Similarly, when wireless communication node 1110 makes a ptmp links using its Module B with the first communication modules (Module A or C) of wireless communication nodes 1120, 1130, 1140, 1150 and 1160, then the second Module A or C of wireless communication nodes 1120, 1130, 1140, 1150 and 1160 can simultaneously create ptp wireless communication links with other modules of wireless communication nodes in the communication system that are not shown here.

As yet another example, wireless communication nodes 1120, 1130, 1140, 1150 and 1160 can host multiple Module As or Module Cs and a Module B. For instance, one or more of wireless communication nodes 1120, 1130, 1140, 1150 and 1160 can host two Module As or Module Cs and one Module B. Hence, when wireless communication node 1110 makes a ptp link using its Module A or Module C with a first Module A or C of wireless communication nodes 1120, 1130, 1140, 1150 and 1160, then a second Module A or Module C of wireless communication nodes 1120, 1130, 1140, 1150 and 1160 can simultaneously create ptp wireless communication links with a third communication module (e.g., Module B) of wireless communication nodes 1120, 1130, 1140, 1150 and 1160 can simultaneously create ptmp wireless communication links with other modules of wireless communication nodes in the wireless mesh network that are not shown here. Similarly, when wireless communication node 1110 makes a ptmp link using its Module B with the first communication module (e.g., Module A or C) of wireless communication nodes 1120, 1130, 1140, 1150 and 1160, then the second communication module (e.g., Module A or C) of wireless communication nodes 1120, 1130, 1140, 1150 and 1160 can simultaneously create ptp wireless communication links with other modules of wireless communication nodes in the mesh network that are not shown here and a third communication module (e.g., Module B) of wireless communication nodes 1120, 1130, 1140, 1150 and 1160 can simultaneously create ptmp wireless communication links with other modules of wireless communication nodes in the mesh network that are not shown here.

It is to be noted that wireless communication links established by Module A or Module C have high reliability due to interference immunity either due to extremely narrow beams or due to transmission of data over ultra-high bandwidth. These features make these links more suitable to carry control information and data for multiple users of a communication system that is based on the wireless mesh network technologies disclosed herein. Hence links established by Module A or Module C can act as a wireless backhaul for a communication system while links established with Module B can provide access to individual users of the communication system.

In one embodiment, an entire wireless mesh network can be composed of ptp links where both links providing backhaul and access have interference immunity. Although such links are more expensive due to the requirement of separate modules to establish individual links, such links are suitable when certain high service quality or reliability is required to be ensured for all end users of the service(s) delivered via the wireless mesh network.

Figure 12:
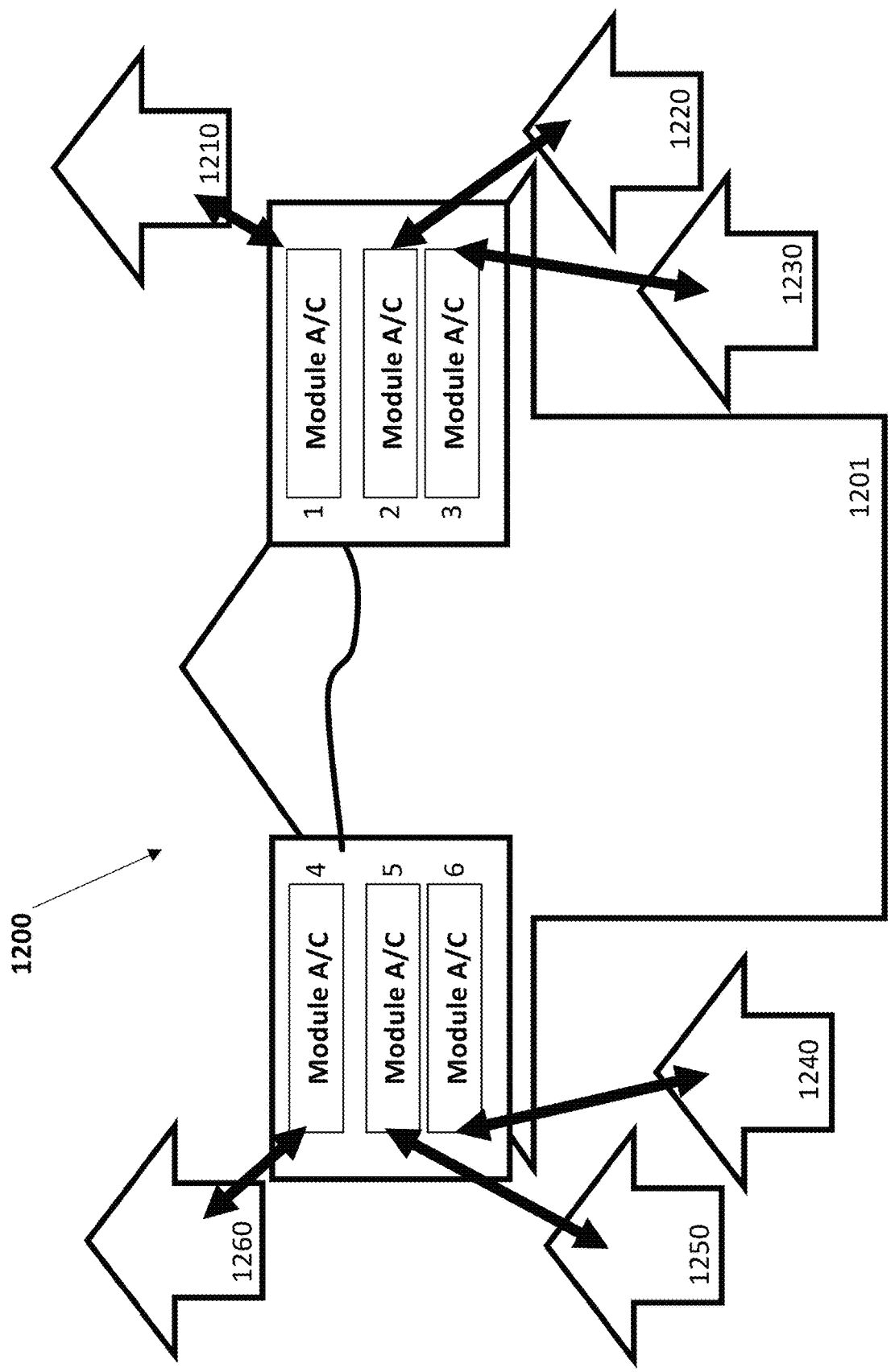
FIG. 12 depicts an example of a site at which at which a seed or an anchor node of a wireless mesh network has been deployed, in accordance with the present disclosure.

For example, FIG. 12 shows a site 1200 at which a seed or an anchor node of a wireless mesh network has been deployed. Site 1200 hosts wireless communication node 1201 that includes a total of 6 communication modules that each take the form of a Module A or Module C type of ptp module. Hence wireless communication node 1201 is capable of establishing six ptp links. As shown, wireless communication node 1201 uses a $1^{st}$ and $4^{th}$ Module A/Module C to establish connections with site 1210 and site 1260 that serve as backhaul links, while wireless communication node 1201 uses a $2^{nd}$, $3^{rd}$, $5^{th}$ and $6^{th}$ Module A/Module C to establish ptp links with sites 1220, 1230, 1250 and 1240 to provide access links. In this respect, links between sites 1200 and 1220, sites 1200 and 1230, sites 1200 and 1240, and sites 1200 and 1250 only carry data for individual users, whereas links between sites 1200 and 1260 and sites 1200 and 1210 carry signaling and data for all the sites including 1200, 1210, 1220, 1230, 1240, 1250 and 1260.

In another embodiment, a wireless mesh network can be composed of combination of ptp links and ptmp links, where the ptp links generally serve as backhaul links for carrying aggregated mesh access traffic for the wireless mesh access network and the ptmp links generally serve as access links for carrying individual mesh access traffic to individual users. In this respect, the ptp links and ptmp links may be considered to define different "layers" (or "segments") of the wireless mesh access network. Although such a wireless mesh network does not necessarily provide interference immunity to all the end users of the service(s) delivered via the wireless mesh network due to presence of ptmp links, such a wireless mesh network is less expensive due to the non-requirement of separate modules to establish individual links and may also be better suited for adding client nodes that do not have predefined locations.

Figure 13:
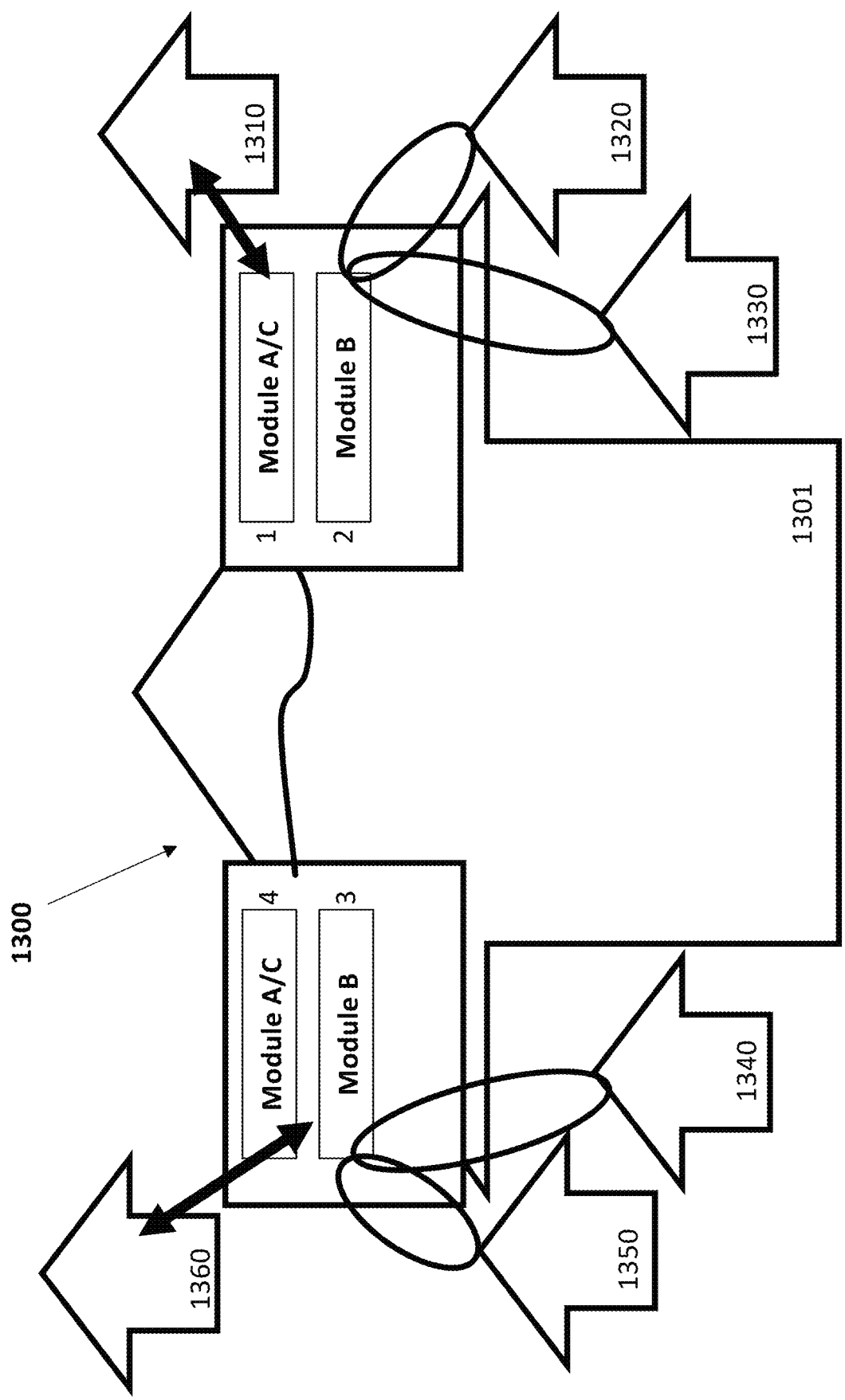
FIG. 13 depicts another example of a site at which at which a seed or an anchor node of a wireless mesh network has been deployed, in accordance with the present disclosure.

For example, FIG. 13 shows a site 1300 at which a seed or an anchor node of a wireless mesh network has been deployed. Site 1300 hosts a wireless communication node 1301 that includes a total of 4 communication modules, two of which take the form of ptp modules (e.g., Module A and/or Module C) and two of which take the form of ptmp modules (e.g., Module B). Hence this wireless communication node is capable of establishing two ptp links and two ptmp links. As shown, wireless communication node 1301 uses a $1^{st}$ and $4^{th}$ Module A/Module C to establish connections with site 1310 and site 1360 that serve as backhaul links, while wireless communication node 1301 uses a $2^{nd}$ Module B to establish ptmp links with sites 1320, 1330 and uses a $3^{rd}$ Module B to establish ptmp links with sites 1350 and 1340 to provide access links. In other words, links between sites 1300 and 1320, sites 1300 and 1330, sites 1300 and 1340 and sites 1300 and 1350 only carry data for individual users, whereas links between sites 1300 and 1360 and sites 1300 and 1310 carry signaling and data for all the sites including 1300, 1310, 1320, 1330, 1340, 1350 and 1360.

Figure 14:
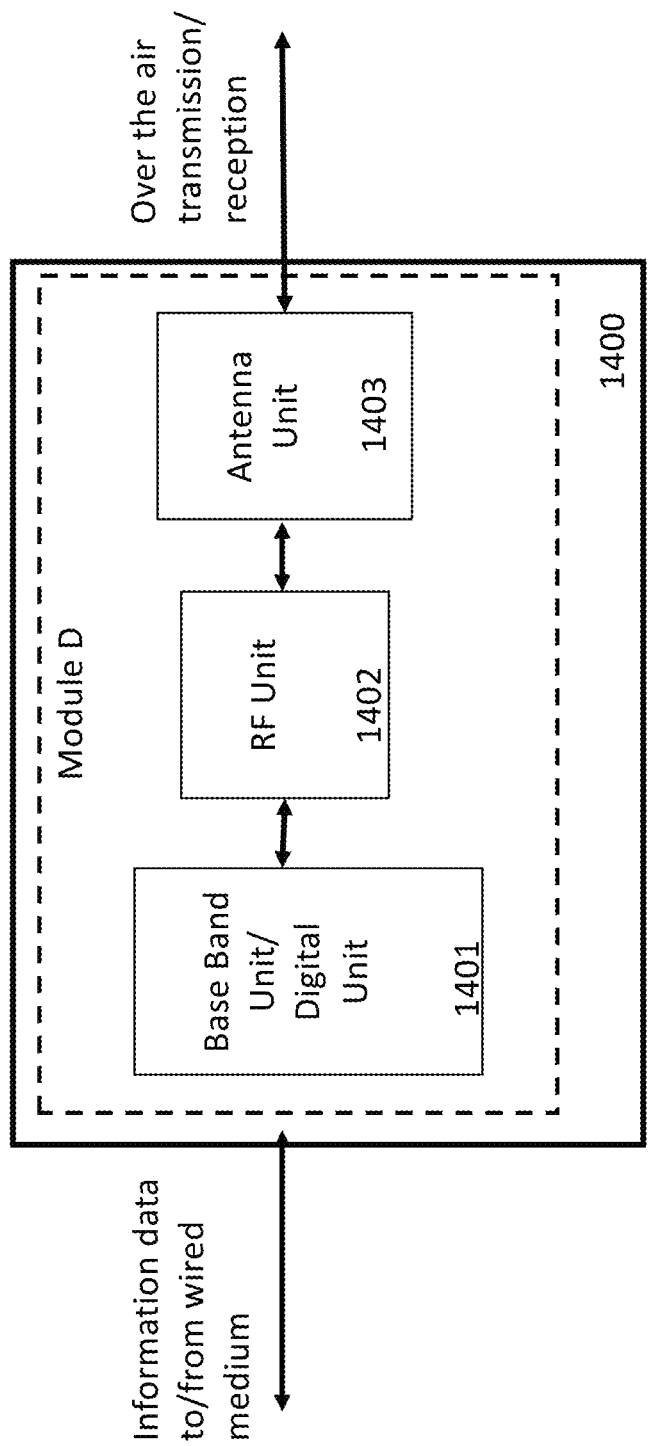
FIG. 14 depicts another example of wireless communication node comprising a Module D type of radio module, in accordance with the present disclosure.

Referring to FIG. 14, another possible example of a wireless communication node of FIG. 1 is shown as a wireless communication node 1400 installed with wireless communication equipment that comprises a single module labeled as "Module D." Module D comprises base band unit or digital unit 1401 which runs the physical layer level protocol including digital modulation/demodulation (modem) and other higher layer protocols such as MAC layer, etc. Base band unit 1401 interacts with other nodes of the communication system that are external to the wireless communication node 1400 via wired medium.

Module D also includes RF unit 1402, which among other things processes IF signals and defines the frequency range of the radio signals that can be transmitted or received with the Module D. RF unit 1402 is capable of operating over a wide range of frequencies (e.g., 5 Ghz band frequencies ranging from 5 Ghz to 6 Ghz).

Further, as shown, Module D also comprises antenna unit 1403 which performs the transmission and reception of over the air radio signals. Antenna unit 1403 is capable of transmitting and receiving extremely narrow beam of signals. Antenna unit 1403 may be constructed with either 1-dimensional or 2-dimensional antenna element arrays that have excellent properties of controlling the directionality of radio signals using beam forming and can propagate even in a non-line of sight environment. Module D with the help of antenna unit 1403 is capable of establishing ptmp links with a tower capable of performing massive MIMO (multiple input multiple output) beams. In one embodiment, Module D can be designed and manufactured at least in part using ASIC (Application specific integrated circuit) and an integrated RF unit called RFIC.

Figure 15:
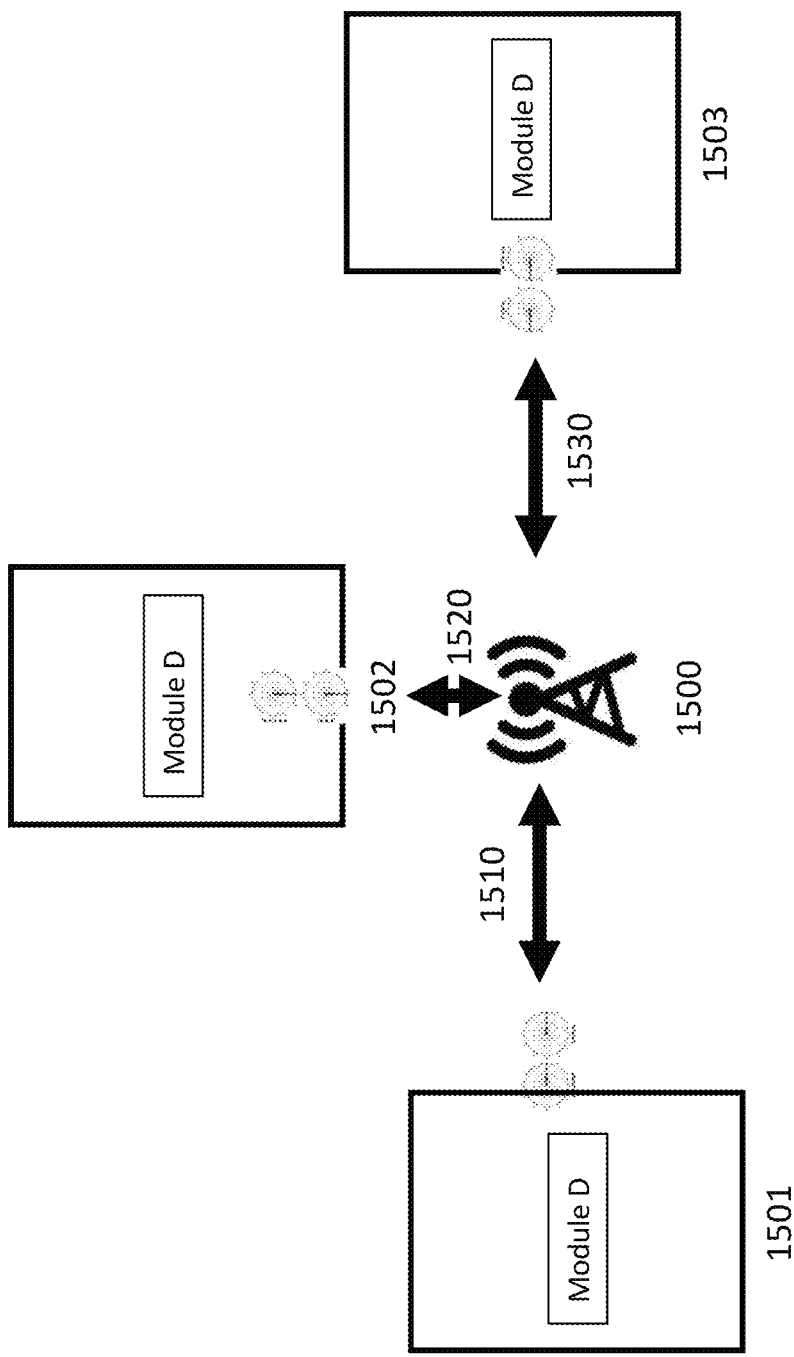
FIG. 15 depicts an example of multiple wireless communication nodes comprising a Module D type of radio modules connected to a tower, in accordance with the present disclosure.

Referring to FIG. 15, an example of multiple Module Ds connected to a tower 1500 is shown. Specifically, wireless communication node 1501 hosting a Module D described above is connected to tower 1500 via massive MIMO beam link 1510 that can be both line-of-sight and non-line-of-sight, wireless communication node 1502 hosting a Module D described above is connected to tower 1500 via massive MIMO beam link 1520 that can be both line-of-sight and non-line-of-sight, and wireless communication node 1503 hosting a Module D described above is connected to tower 1500 via massive MIMO beam link 1530 that can be both line-of-sight and non-line-of-sight. The tower 1500 is equipped with a Massive MIMO module that can create multiple bi-directional narrow beam links simultaneously in all directions with 360 degrees of coverage area. In one embodiment, tower 1500 can operate in the 5 Ghz band including frequencies ranging from 5000 Mhz to 6000 Mhz. In other embodiments, tower 1500 and associated wireless communication nodes 1501, 1502 and 1503 can operate within a different frequency band.

It should be understood that while FIG. 15 shows only one tower and three wireless communication nodes hosting Module D in the communication system, a given communication system can have multiple towers similar to tower 1500 and these towers can each be connected to a large number of wireless communication nodes hosting various other modules.

In accordance with the present disclosure, the route that a particular packet takes from a source to a destination may be dynamically selected based on factors including but not limited to link quality, loading, latency etc. For example, referring to FIG. 16, communication system 1600 is shown that is similar to communication system 100 and has all the components described in the context of FIG. 1. Additionally, communication system 1600 of FIG. 16 includes a tower 1610 which is similar to tower 1500 described in the context of FIG. 15. In contrast to communication system 100 in FIG. 1, the wireless communication equipment 131, 132, 133, 134 and 135 at the seed and anchor nodes of the communication system may include an additional Module D besides Module A/Module B or Module C that enables these wireless communication nodes to optionally establish bi-directional links having the features described in the context of FIGS. 14-15 with tower 1610 using massive MIMO beamforming capabilities. Such links labeled as 1601, 1602, 1603, 1604 and 1605 can work in both line-of-sight and non-line of sight environment and can provide alternate communication paths to the seed and/or anchor nodes of the communication system in an event where a ptp or ptmp link that connects one such wireless communication node to a peer wireless communication node to form a wireless mesh network fails or experiences performance degradation due to various reasons including but not limited to a change in the line-of-sight profile of a millimeter-wave link between two wireless communication nodes.

Figure 16:
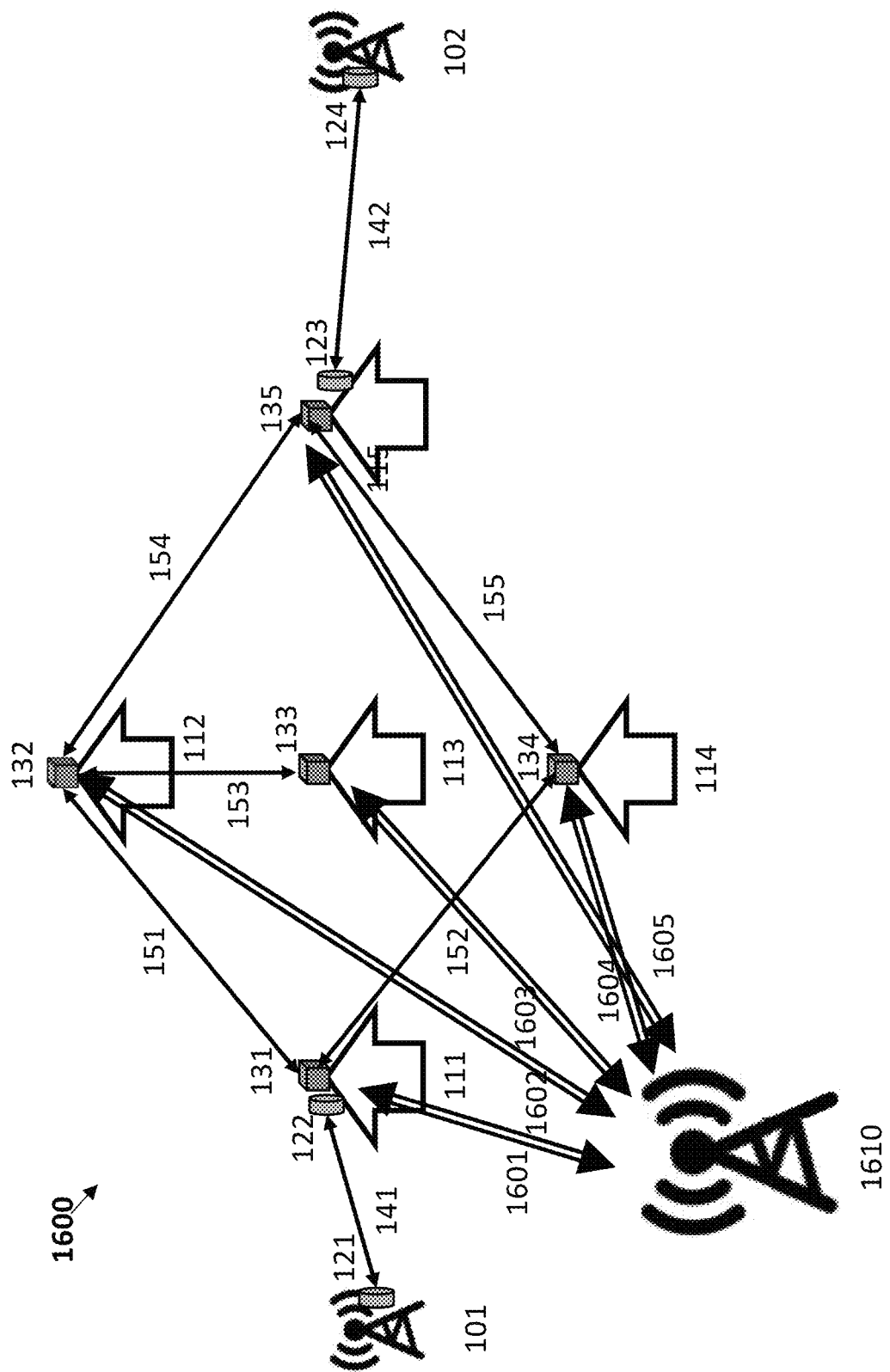
FIG. 16 depicts another example of a communication system that comprises a wireless mesh network, in accordance with the present disclosure.

In FIG. 16, only one tower (i.e., tower 1610) capable of massive MIMO ptmp communication is shown to be connected to the five wireless communication nodes of the communication system. However, it should be understood that a communication system can also have more than one tower, each connected to multiple different wireless communication nodes hosting various other modules.

In areas within tower 1500's (and other towers of same type) coverage area, a given communication system can initially start in a ptmp manner, where tower 1500 (and other towers of same type) provides access to individual customers using sub 6 Ghz massive MIMO ptmp beams. Later, nodes in the given communication system can opportunistically connect with other nodes using regular modules (e.g., Module A/Module B/Module C) in the presence of line-of-sight. This way, the given communication system may evolve to form a wireless mesh network with ptp and ptmp connections between nodes in addition to each communication node having a path directly (non-line-of-sight) to tower 1500 (and other towers of same type) that fall within the coverage area.

One of ordinary skill in the art will appreciate that a route a given packet takes from a source to a destination in this communication system may be optimized by considering various factors including latency, congestion, reliability etc. One of ordinary skill in the art will also appreciate that a given communication system can later add seed nodes (e.g., the seed nodes hosted at seed homes 111 and 115 in FIG. 1) along with tower/fiber access points 101 and 102 to provide alternate backhaul as per need basis.

In another embodiment, instead of providing massive MIMO ptmp networking capability using a terrestrial tower, ptmp massive MIMO capability to wireless communication nodes can also be provided by a satellite, such as a low earth orbit (LEO) satellite. For example, referring to FIG. 17, communication system 1700 is shown that is similar to communication system 100 and has all the components described in the context of FIG. 1. Additionally, system 1700 of FIG. 17 includes a satellite 1710 which is capable of massive MIMO transmission and reception on frequencies including but not limited to 5-6 Ghz, similar to tower 1500 described in the context of FIG. 15. In contrast to communication system 100 in FIG. 1, the wireless communication equipment 131, 132, 133, 134 and 135 at the seed and anchor nodes of the communication system may include an additional Module D (besides Module A/Module B or Module C) that enables these wireless communication nodes to optionally establish bi-directional links having the features described in the context of FIGS. 14-15 with satellite 1710 using massive MIMO beamforming capabilities. Such links labelled as 1701, 1702, 1703, 1704 and 1705 can provide alternate communication paths to the seed and/or anchor nodes of the communication system in an event where a ptp or ptmp link that connects one such wireless communication node to a peer wireless communication node to form a wireless mesh network fails or experiences performance degradation due to various reasons including but not limited to a change in the line-of-sight profile of a millimeter-wave link between two wireless communication nodes.

Figure 17:
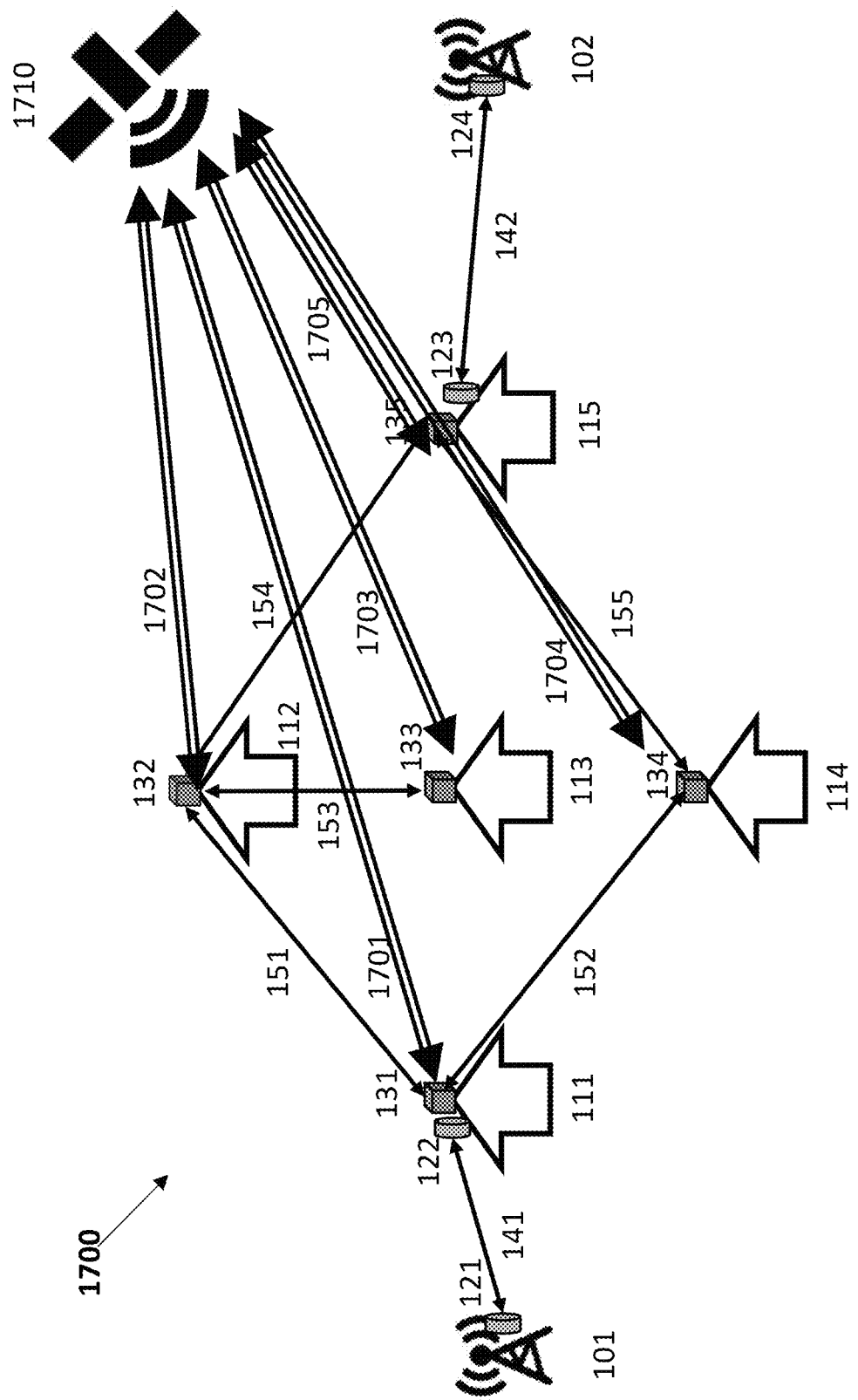
FIG. 17 depicts yet another example of a communication system that comprises a wireless mesh network, in accordance with the present disclosure.

In FIG. 17, only one satellite 1710 capable of massive MIMO ptmp communication is shown to be connected to the five wireless communication nodes of the communication system. However, it should be understood that a communication system can also have more than one satellite, each connected to multiple different wireless communication nodes hosting various other modules.

In another embodiment, some of the wireless communication nodes that provide backhaul functionality can be equipped with multiple communication modules that enable these wireless communication nodes to transport backhaul data between an end user and a core network using multiple different types of communication links. For example, referring to FIG. 18, communication system 1800 is shown that is similar to communication system 100 and has all the components described in the context of FIG. 1. Additionally, system 1800 of FIG. 18 includes a satellite 1810 which is capable of massive MIMO transmission and reception on frequencies including but not limited to 5-6 Ghz, similar to tower 1500 described in the context of FIG. 15. System 1800 also includes a massive MIMO cable tower 1820 which is also similar to tower 1500 described in the context of FIG. 15.

In contrast to communication system 100 in FIG. 1, the wireless communication equipment 131, 132, 133, 134 and 135 at the seed and anchor nodes of the communication system may include an additional Module D (besides Module A/Module B or Module C) that enables these wireless communication nodes to optionally establish bi-directional links having the features described in the context of FIGS. 14-15 with satellite 1810 and tower 1820 using massive MIMO beamforming capabilities. Such links labeled as 1801, 1802, 1803 and 1804 can provide alternate communication paths to the seed and/or anchor nodes of the communication system in an event where a ptp or ptmp link that connects one such wireless communication node to a peer wireless communication node to form a wireless mesh network fails or experiences performance degradation due to various reasons, including but not limited to change in the line-of-sight profile of a millimeter-wave link between two wireless communication nodes.

Figure 18:
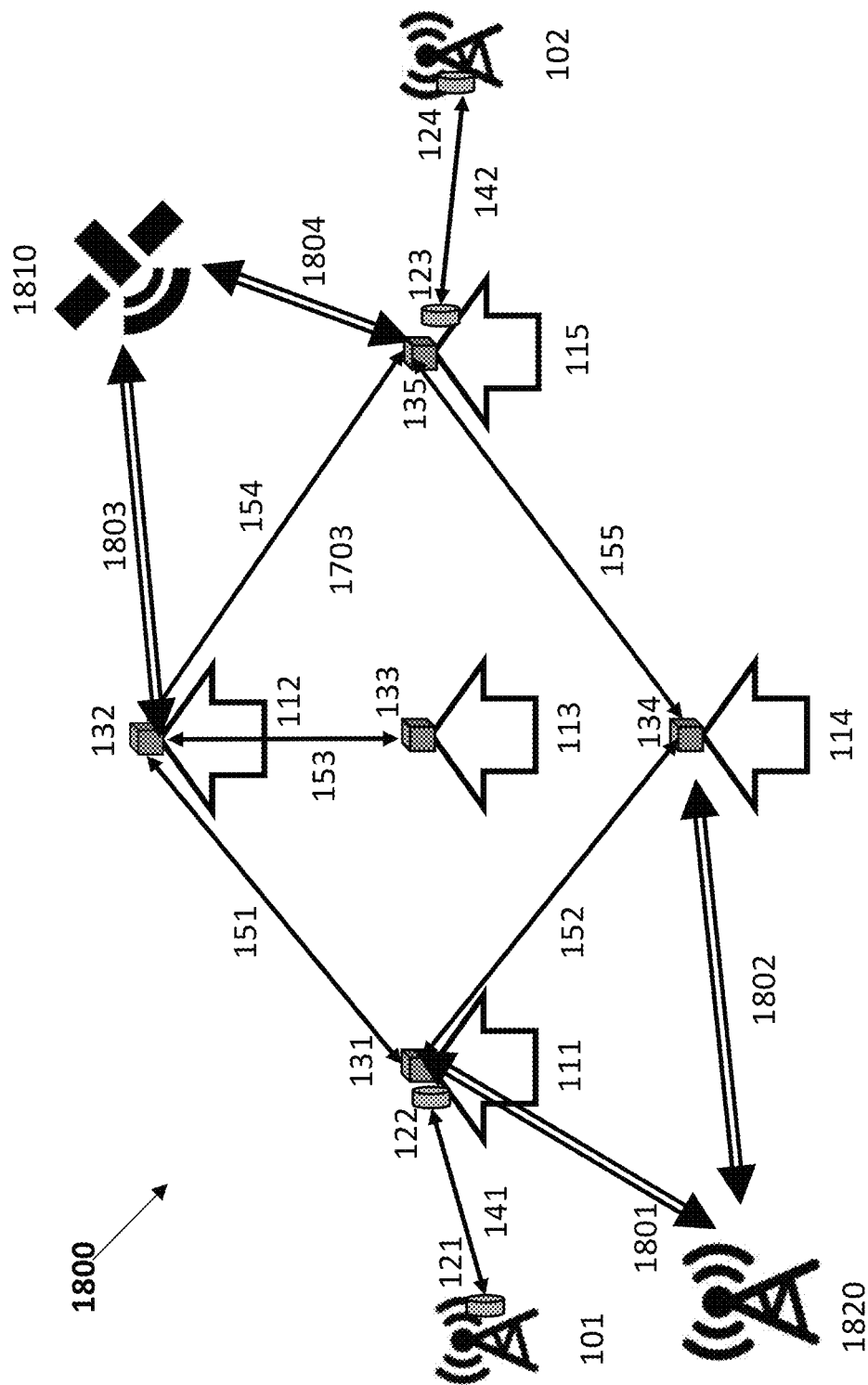
FIG. 18 depicts still another example of a communication system that comprises a wireless mesh network, in accordance with the present disclosure.

Specifically, satellite 1810 in FIG. 18 is connected to the seed node hosted at seed home 115 using wireless communication equipment 135 via link 1804 and to the anchor node hosted at anchor home 112 using wireless communication equipment 132 via link 1803. In this respect, the seed node hosted at seed home 115 has multiple options to route backhaul traffic to the core network.

In one embodiment, the seed node hosted at seed home 115 can pick a satellite link 1804 to transport backhaul data at a given time, and based on some trigger at a different time, can cause its wireless communication equipment 135/123 to switch links for backhaul data transmission from satellite link 1804 to wireless link 142 (which as noted above may be a ptp or ptmp millimeter-wave-based link such as an E-band link) coupled to the fiber PoP node hosted at tower/fiber access point 102. Such trigger may include latency, bandwidth, packet loss requirements, etc. of a particular application.

FIG. 18 also shows an anchor node hosted at an anchor home 113 where the node's wireless communication equipment 133 may exchange data with the anchor node hosted at anchor home 112 using its wireless communication equipment 132. If the anchor node at anchor home 112 receives end-user data from the anchor node at anchor home 113, the anchor node at anchor home 112 may then have multiple options to transport end-user data to the core network via its wireless communication equipment 132, including (1) directly sending the end-user data to the core network via satellite link connection 1803, (2) indirectly sending the end-user data to the core network via the seed node at seed home 115, which may send the end-user data to the core network either via satellite link connection 1804 or via link 142 with the fiber PoP node hosted at access point 102, or (3) indirectly sending the end-user data to the core network via the seed node at seed home 111, which may send the end-user data to the core network either via link connection 1802 or via link 141 with the fiber PoP node hosted at access point 101, among other options.

In one embodiment, wireless communication equipment 132 of the anchor node at anchor home 112 can also dynamically switch its connection link to route data to and from the anchor node at anchor home 113. For example, due to some trigger similar to the triggers described above, wireless communication equipment 132 can dynamically switch from directly communicating data between the anchor node at anchor home 113 and the core network via satellite link 1803 to indirectly communicating data between the anchor node at anchor home 113 via the seed node at seed home 115 and satellite link 1804, as one possible implementation.

It should be understood that links 1803 and 1804 can be part of same massive MIMO beam or links 1803 and 1804 can be part of different massive MIMO beams. It should also be understood that satellite links 1803 and 1804 can use the same frequency range of communications or can operate in different frequency ranges. Further, while FIG. 18 shows only one satellite (i.e., satellite 1810) capable of massive MIMO ptmp communication that is connected to two wireless communication nodes 132 and 135, it should be understood that a communication system can also have more than one satellite, each connected to multiple different wireless communication nodes hosting various other modules.

As further shown in FIG. 18, tower 1820 is connected to the seed node at seed home 111 via link 1801 and to the anchor node at anchor home 112 via link 1802. This provides the anchor node at anchor home 114 with options to route packets to the core network in multiple ways including (a) indirectly through one of the seed nodes at seed homes 111 and 115 through links 152 or 155 (which as noted above may be ptp or ptmp millimeter-wave-based links), and (b) directly to tower 1820 via massive MIMO based link 1802. Similarly, the seed node hosted at seed home 111 has multiple options to route backhaul traffic to the core network. In one embodiment, the seed node hosted at seed home 111 can pick link 1801 to transport backhaul data at a given time, and based on some trigger at a different time, can cause its wireless communication equipment 131/122 to switch links for backhaul data transmission from link 1801 to wireless link 141 which as noted above may be a ptp or ptmp millimeter-wave-based link such as an E-band link) coupled to the fiber PoP node hosted at tower/fiber access point 101. Such trigger may include latency, bandwidth, packet loss requirements, etc. of a particular application.

In FIG. 18, only one tower (i.e., tower 1820) capable of massive MIMO ptmp communication is shown to be connected to two wireless communication nodes. However, it should be understood that a communication system can also have a different number of massive MIMO towers, each connected to multiple different wireless communication nodes hosting various other modules.

In accordance with the present disclosure, the wireless communication equipment (ptp link modules, ptmp link modules, multiple ptp link modules, combination of multiple ptp and ptmp links, antennas for cellular small cells/CPEs and millimeter-wave equipment, cable, mounts, power supply boxes, etc.) that gets deployed and installed at a seed or anchor home can be consumer financed. For instance, in case of a customer meeting a certain credit score threshold (or any other credit checking criteria), the equipment required to add a millimeter-wave mesh node at the customer's premises (i.e., to add the customer to the wireless mesh network) and provide high speed internet service may be financed by a bank on the behalf of the customer, and the customer may agree with the financing bank to re-pay the amount financed by the bank over a certain time period by making periodic (e.g. monthly) payments based on the terms and conditions of the agreement. This way, the customer becomes owner of the equipment (a wireless mesh network node) once the full financed amount is made to the financing bank. This customer can in one embodiment lease back the wireless mesh network node equipment installed on its property to the wireless mesh network operator that installed the wireless mesh network equipment on its property and provide high speed internet data service. In another embodiment, this customer can lease back the wireless mesh network node equipment installed on its property to the wireless mesh network operator that installed the wireless mesh network equipment on its property and provide high speed internet data service for a certain term (e.g., 18 months, 24 months, 36 months, etc.).

In some instances, this customer may be required to lease back the equipment to only that operator which originally installed the equipment at the customer location and provided high speed internet data services. In other instances, this customer can lease back the equipment to any wireless internet network operator. In another instance, lease back of the equipment to an operator other than the operator which originally installed the network equipment at the customer location may only occur with the permission of the wireless internet network operator that originally installed that equipment at customer location. In yet another instance, such lease back to a different wireless internet network operator may only occur after expiration of the lease term with the original wireless internet network operator.

For a wireless internet network operator building and operating a wireless mesh network, the type of customer financing-based network deployment described above becomes a crowd sourcing or crowdfunding-based infrastructure roll out mechanism, where instead of one or few large entities, CAPEX is sourced from a pool of individuals who in some instances are the customers of the wireless mesh network operator. Such customers can get high speed internet data service from the wireless mesh network operator (operating using ptp/ptmp modules, other communication nodes and equipment and various variations discussed earlier in this disclosure) at a subsidized/discounted rate. In certain cases, such customers may get two separate bills periodically, one for the high-speed internet data service and other for the equipment financing from bank. In another case, customers can get a single consolidated bill from a wireless mesh operator.

In some instances, all customers of a wireless mesh operator can be based on consumer financing explained above in a neighborhood or market where wireless mesh operator offers its high-speed internet data service. In other instances, wireless mesh network's customers in a market or neighborhood can be financed through a variety of different ways including operator financing where wireless mesh operator pays for the equipment of the wireless mesh node, financed through bundling with a private utility or service that has a relatively smaller market size (e.g. home security/automation, solar energy, etc.) compared to market size of the high speed internet where a bundled service is offered and wireless mesh operator uses the marketing/sales commission received from the private utility or service provider to fund the wireless mesh node equipment, financed through the revenue generated from running blockchain platform based services on the wireless mesh network nodes along with the consumer/customer based financing that is explained earlier in the disclosure.

Further, in accordance with the present disclosure, the communications equipment including various types of ptp/ptmp modules, cellular small cell, etc. that were described above can be used to establish multiple ptp and/or point-to-multiple links where both network nodes of a wireless link, one from where a link originates and the second from where a link terminates (in general, nodes can switch roles dynamically between link originator and link terminator based on the direction of data flow), are located at the different customer locations and providing high speed internet service to the dwellers of the property where wireless mesh network node is deployed and installed. In some cases, one of the two nodes of the link can be at a location where the deployed equipment provides high speed internet service to the dwellers of the property at that location. In other instances, both nodes of the link may be at a location where the deployed equipment does not provide high speed internet service to the dwellers of the property at that location.

It should be understood that the length of the communication links of a wireless mesh network disclosed herein may vary. For instance, the length of the communication links of a wireless mesh network established with the help of the various communication modules and equipment described above may be less than 300 meters on average. Alternatively, the length of the communication links of a wireless mesh network can be greater than 300 meters on average as well. Many other lengths of the communication links are possible as well.

In accordance with the present disclosure, further disclosed herein are communication modules that employ direct RF (microwave/millimeter wave)-to-optical and direct Optical-to-RF (microwave/millimeter wave) conversion. In one example implementation, the high-speed photo detectors can be used that directly translate an optical signal into a microwave signal. One of ordinary skill in the art will appreciate that other approaches can be used for direct optical-to-RF conversion. Similarly, a dipole antenna directly coupled to a plasmonic modulator allows direct conversion from the RF to the optical world. One of ordinary skill in the art will appreciate that different approaches can be used for direct conversion of RF signals to optical signals. This direct optical-to-RF and direct RF-to-Optical conversion modules eliminate the need of the use of analog to digital and digital to analog (ADC/DAC) modules that are required by traditional modem implementations. These mixed signal components (i.e., ADC/DAC) consume high amount of power and also increase the cost as each antenna is required to be connected to a separate ADC/DAC module.

Figure 19:
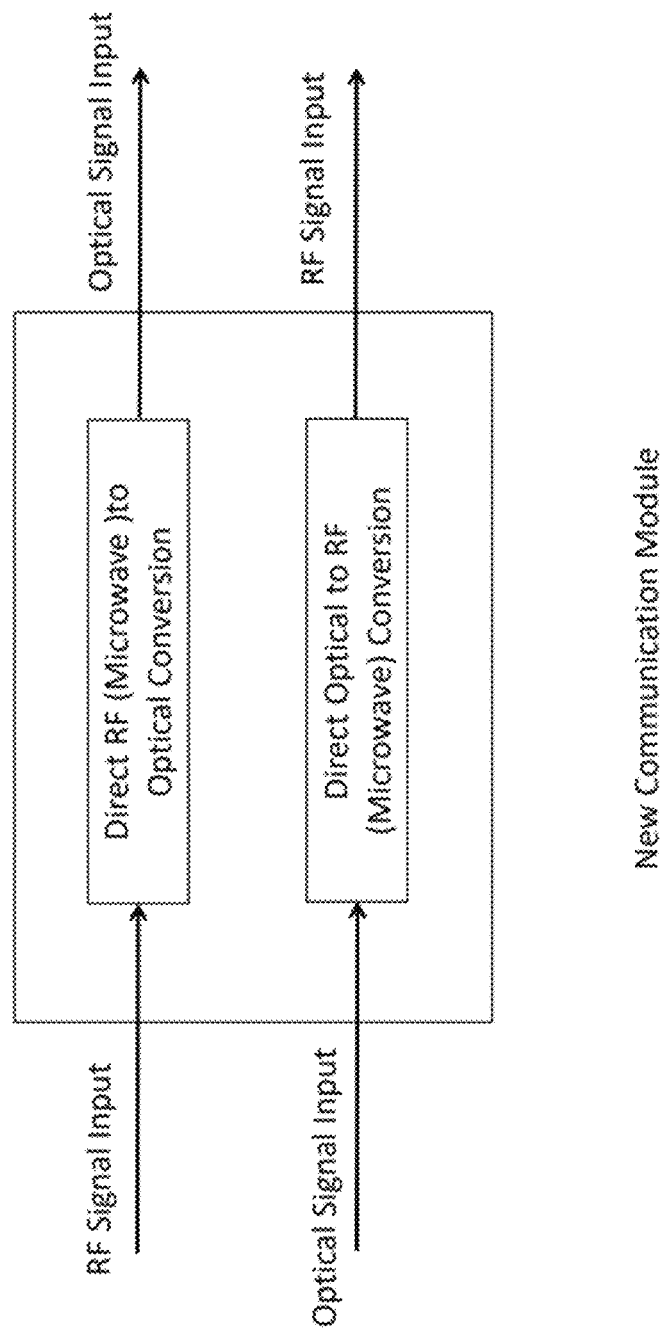
FIG. 19 depicts an example of communication module based on direct RF-to-Optical and direct Optical-to-RF conversion, in accordance with the present disclosure.

FIG. 19 shows a communication module based on direct RF-to-Optical and direct Optical-to-RF conversion. Communication module of FIG. 19 contains a single direct RF-to-Optical sub-module and a single Optical-to-RF sub-module. However, communication module of FIG. 19 can host any integer number of direct RF-to-Optical sub-modules greater than or equal to zero and any integer number of direct Optical-to-RF sub-modules greater than or equal to zero. In one example embodiment, this direct RF-to-Optical and direct Optical-to-RF conversion technology can be implemented is an integrated Circuit (IC) or chip.

Figure 20:
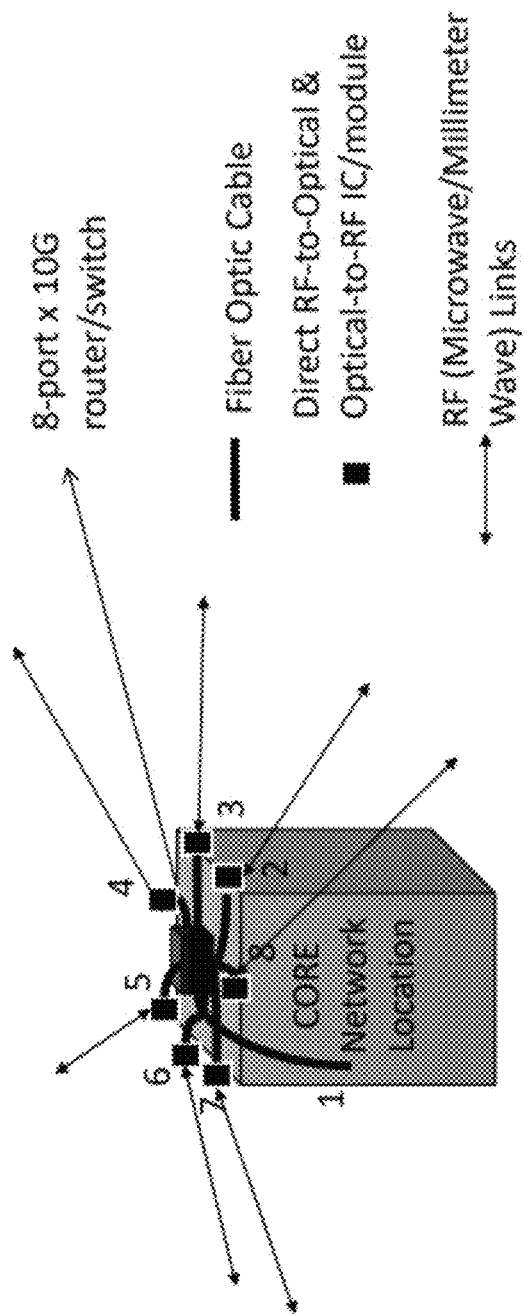
FIG. 20 depicts an example router/switch, in accordance with the present disclosure.

Based on the above explanation with respect to the example communication module of FIG. 19, in an example embodiment, the core of a wireless mesh network can be a wireline optical or wired router/switch where each port is mapped, either through a direct connection or over optical/wired line, to an individual direct conversion Optical-to-RF or RF-to-Optical chip that then focuses, on both receiver and transmitter side, all RF energy into a high gain narrow beam that can be both fixed or steerable. In one example embodiment, a standard 8-port×10G router/switch could be used, with one port being used as a data drop to local building/site and the other 7 ports being connected over a fiber optic cable to various Optical-to-RF or RF-to-Optical end points that are located at multiple distributed locations external (and/or internal) on/in the building/site as shown in FIG. 20. One of ordinary skill in the art will understand that the router/switch can have a different number of ports as well.

These multiple distributed locations can be determined in advance based on the use of connection potentiality optimization algorithms, where the algorithm understands the relationship between end point placement and potentially connection partners. Also, the individual ptp beams can be dynamically steered among potential ptp connection partners to facilitate path optimization algorithms and/or to respond to network congestion and/or network element failures. In one embodiment, these Optical-to-RF or RF-to-Optical end points that establish ptp/ptmp beams can be placed below a roof's eaves and in other embodiments, these end points can be placed above a roof's eaves. In some other embodiments, some of the Optical-to-RF or RF-to-Optical end points can be placed below a roof's eaves and some can be placed above a roofs eaves and actual placement may depend upon the line-of-sight profile of the location/site.

It should be understood that the example communication module discussed in the context of FIGS. 19-20 can be implemented in other communication modules that were discussed in the context of FIGS. 1-18. For instance, the modules discussed in the context of FIGS. 1-18 can have direct RF-to-Optical and direct Optical-to-RF technology embedded such that the narrow beam, extremely narrow beam, and/or ptp/ptmp/multiple ptp links can be established without the need for ADC/DAC mixed signal circuitry that consumes a high amount of power and requires to be connected individually with each antenna.

In accordance with the present disclosure, a modified version of the communication nodes discussed earlier for forming a wireless mesh network will now be discussed. In one embodiment, a communication node can host flexible millimeter-wave radio equipment capable of establishing multiple ptp and/or ptmp links operating over millimeter-wave frequencies and can comprise 3 different sub-modules: (1) digital/network module, (2) ptp radio module, and (3) ptmp radio module. A digital/network module is responsible for interfacing the above millimeter-wave radio box (and thus the communication node) with a core network (which may also at times be referred to as a backhaul or fiber network). Specifically, it provides switching capability to direct traffic between the ptp or ptmp radio modules of the millimeter-wave radio box (communication node) and the core network. The connectivity between a single or multiple ptp and/or ptmp radio modules of the millimeter-wave radio box and the core network can be based over a variety of interfaces including but not limited to PCI/PCI express bus interface and ethernet.

In one embodiment, PCI/PCIe can be used when a ptp or ptmp radio that needs to be connected is enclosed in the same box with a digital/network module and separation between the digital/network module and the ptp module is limited to few inches such as 3-6 inches or less.

In one embodiment, a digital/network module provides connectivity to a single ptp or ptmp module over a single PCI/PCIe bus interface. In a different embodiment, a digital/network module provides connectivity to 3 ptp or 3 ptmp or a combination of 3 ptp/ptmp modules over three separate PCI/PCIe bus interfaces. In another embodiment, a digital/network module provides connectivity to N ptp or N ptmp or a combination of N ptp/ptmp modules over N separate PCI/PCIe bus interfaces, where N is a positive integer number greater than zero.

An ethernet interface such as an RJ45 port with multi-gigabit support, including but not limited to 1 Gb, 2.5 Gb, 5 Gb, 10 Gb, etc., can be used to connect ptp or ptmp radio modules with a digital/network module. In one embodiment, an ethernet interface can be used when the ptp or ptmp radio that needs to be connected is not enclosed in the same box with a digital/network module and separation between digital/network module and the ptp module is greater than 3-6 inches. In some embodiments, the length can be 10 meters or more.

In one embodiment, a digital/network module provides capability of connecting up to 4 ptp/ptmp radios or up to 3 ptp/ptmp radio and a small cell over 4 ethernet interfaces. In a different embodiment, a digital/network module provides capability of connecting up to N ptp/ptmp radios or up to N−1 ptp/ptmp radio and a small cell over N ethernet interfaces, where N is a positive integer number greater than zero. Digital/network module also contains SFP/SFP+ interface or any other interface to connect digital/network module with the core network.

The ptmp radio module of the communication node discussed above is responsible for establishing ptmp millimeter-wave-based bi-directional links to connect to peer millimeter-wave radios in a wireless mesh network. The ptmp radio module comprises a baseband sub-module and RF module. Baseband module handles the baseband processing and among other aspects is responsible for baseband processing related to beamforming. RF module contains phased antenna array that works in conjunction with baseband module to generate ptmp millimeter-wave beams.

The ptp radio module of the communication node described above is responsible for establishing ptp millimeter-wave-based bi-directional links to connect to a peer millimeter-wave radio in a wireless mesh network. The ptp radio module comprises a baseband sub-module, RF module and beam narrowing module. The baseband module handles the baseband processing and, among other aspects, is responsible for baseband processing related to beamforming. RF module contains phased antenna array that works in conjunction with baseband module to generate ptp millimeter-wave beam. A beam narrowing module is responsible for narrowing the beam by focusing most of the radiated signal energy in the desired direction and lowering the antenna side lobes to minimize the interference in a wireless mesh network.

In one embodiment, the beam narrowing module can be a lens antenna integrated with an RF module. In another embodiment, the beam narrowing module can be a parabolic antenna integrated with an RF module. In yet another embodiment, the beam narrowing module could be a module other than a lens or parabolic antenna and rely on a different approach to narrow the beam originating from a phased array based RF module.

Figure 21:
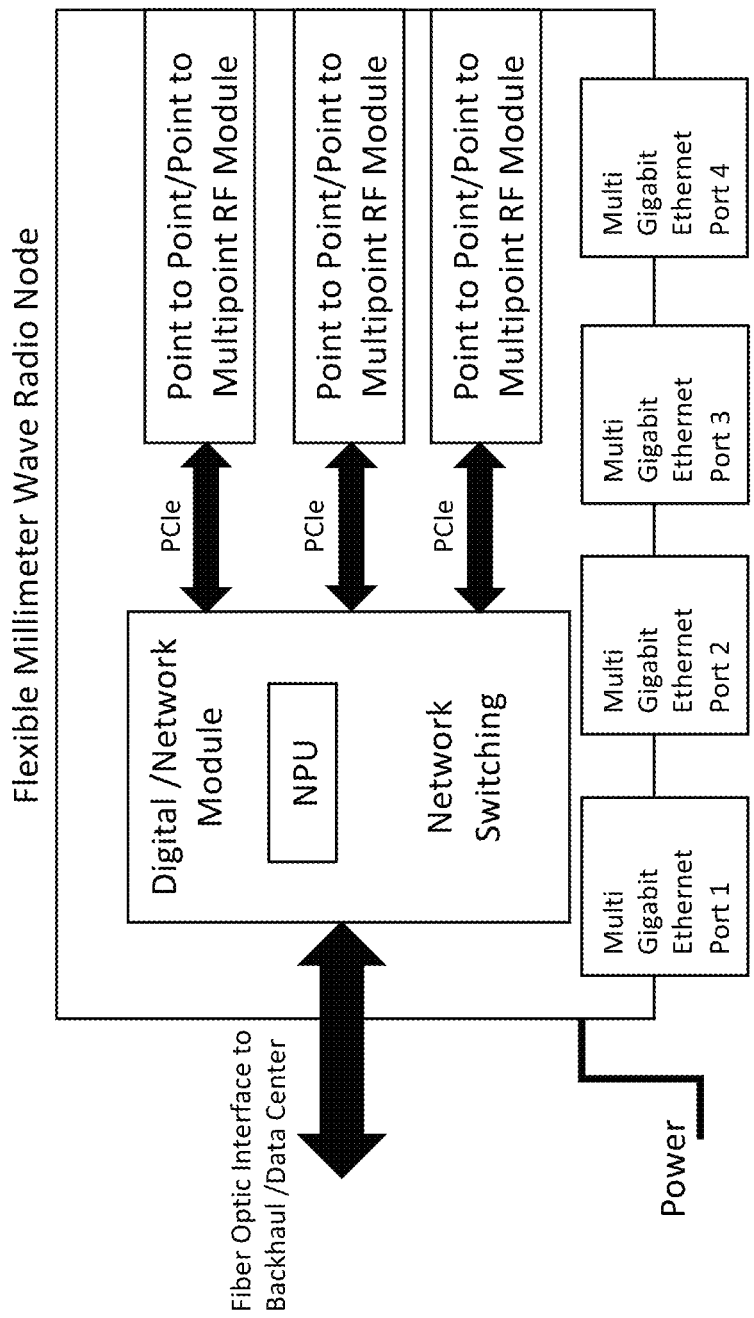
FIG. 21 depicts an example block diagram of flexible millimeter-wave communication equipment, in accordance with the present disclosure.

Referring to FIG. 21, a logical block diagram of the flexible millimeter-wave communication equipment described above is shown. As explained earlier, a flexible millimeter-wave radio node contains within an enclosure (typically outdoor) a digital/network module that has a network processing unit (sometimes referred to as an "NPU" for short) and is configured to provide network switch operations between the fiber optic backhaul interface and the ptp or ptmp radio modules either connected via PCI/PCIe interface or via multi gigabit ethernet ports. A flexible millimeter-wave radio module also contains within the enclosure 3 ptp or ptmp radios. For providing mesh network deployment flexibility, a node can also be connected to external ptp/ptmp radios via ethernet ports. A node can be solar powered or can be powered via electric power outlet of the home where the node is installed. FIG. 21 also shows that this flexible millimeter-wave radio node may only need a single NPU that controls all the ptp or ptmp RF modules either connected via a PCI/PCIe interface or via a multi gigabit ethernet interface. Hence this example flexible millimeter-wave radio node removes the need for using a dedicated NPU for each ptp/ptmp RF module.

Figure 22:
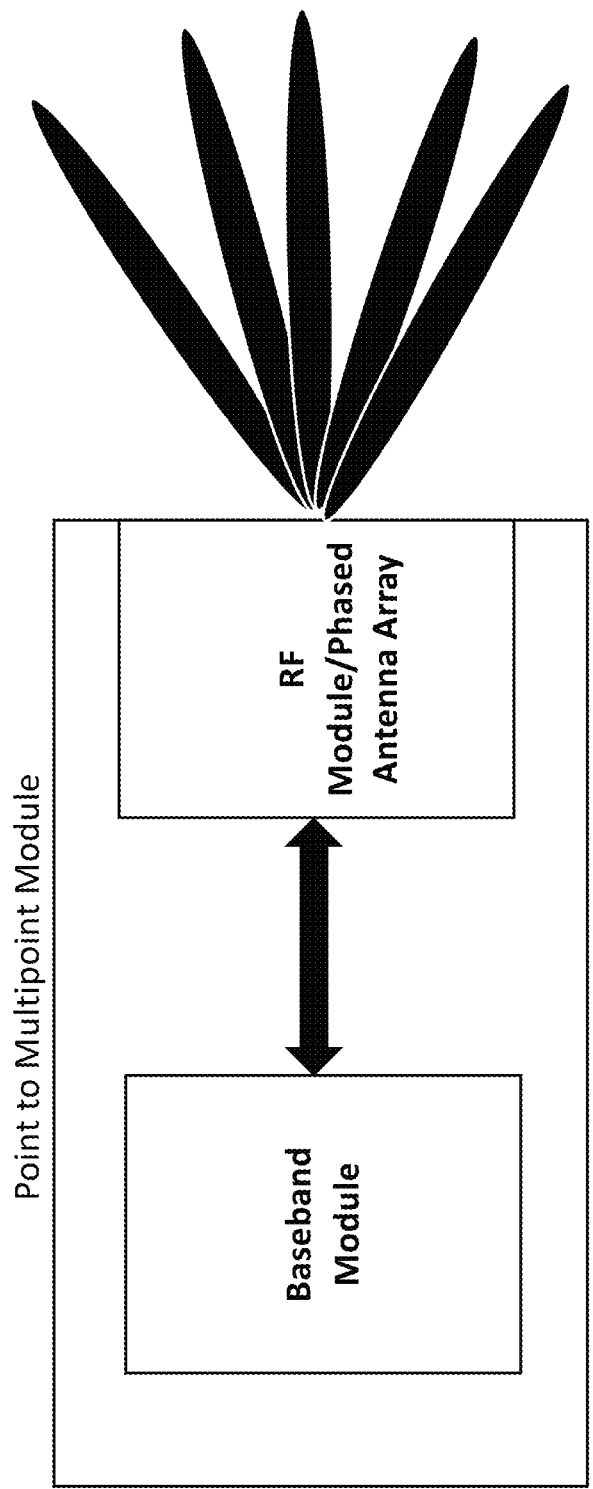
FIG. 22 depicts an example block diagram of a ptmp radio module of a communication node, in accordance with the present disclosure.

FIG. 22 shows a block diagram of a ptmp radio module of the communication node described above. As shown, this radio module contains a baseband module and a RF module that has the phased antenna array for providing beamforming capability.

Figure 23:
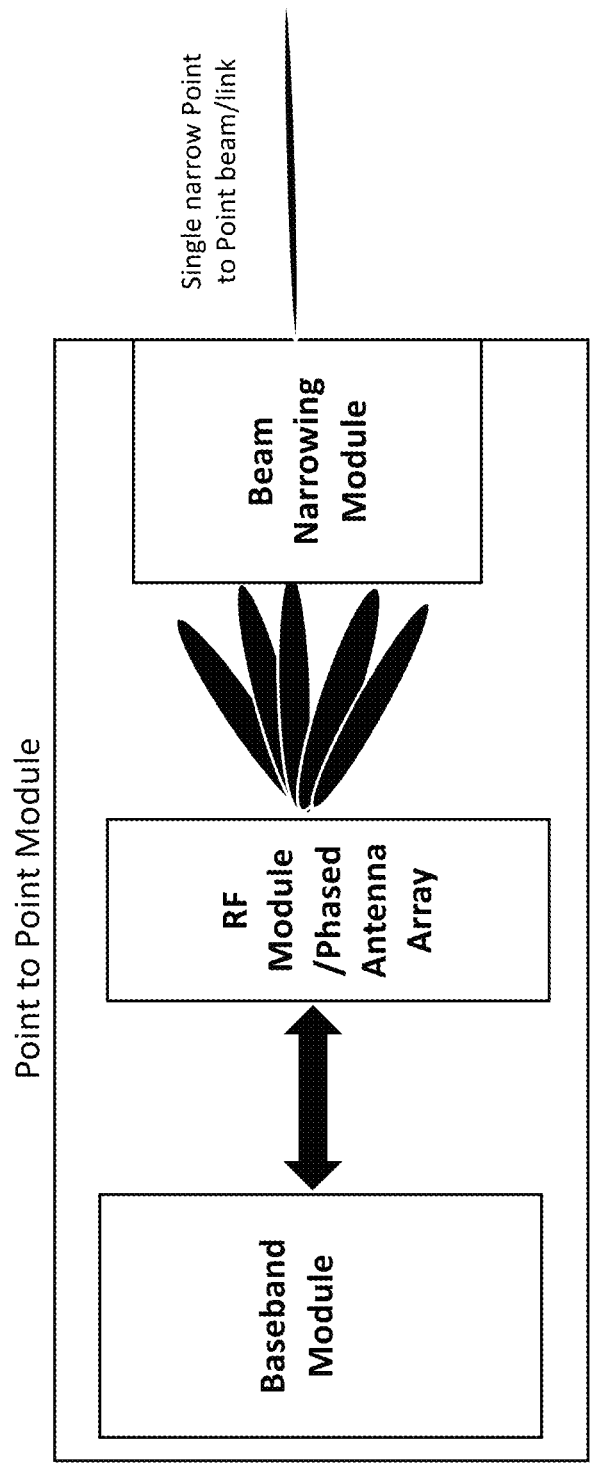
FIG. 23 depicts an example block diagram of a ptp radio module of a communication node, in accordance with the present disclosure.

FIG. 23 shows a block diagram of the ptp radio module of the communication node discussed above. This radio module contains a baseband module, an RF module that has the phased antenna array for providing beamforming capability, along with a beam narrowing module. The beam narrowing module, based on various techniques discussed earlier, narrows the beam generated by the phased antenna array of the RF module.

Figure 24:
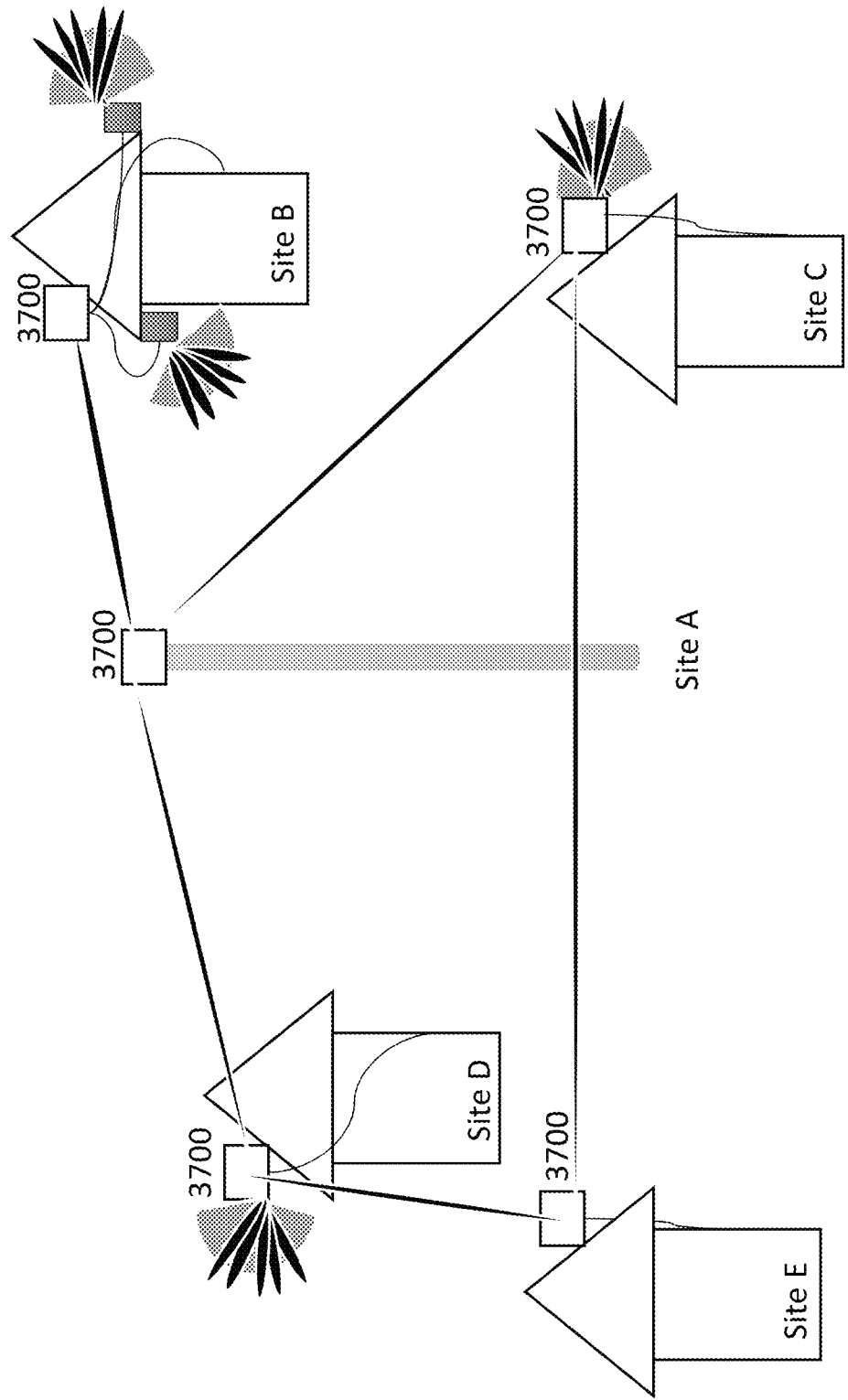
FIG. 24 depicts an example of a wireless mesh network comprising a plurality of communication nodes, in accordance with the present disclosure.

Referring to FIG. 24, various different use cases of the communication nodes described above and explained in the context of FIGS. 21-23 is shown. FIG. 24 shows a wireless mesh network comprising 5 communication nodes 3700. Communication nodes 3700 may each be a flexible millimeter-wave communication node that has been discussed earlier.

At "Site A" of the wireless mesh network, a communication node 3700 may be solar powered and mounted on the pole. This node 3700 at Site A may have 3 ptp links generated by 3 ptp radio modules integrated with the digital/network module. At "Site B," a communication node 3700 may be powered with an electric power outlet of the home and may have one ptp link via a single integrated ptp radio module and 2 ptmp links via two ptmp radio modules that are not integrated with a digital/network module but instead connected via ethernet interface to the communication node. Similarly, at "Site C," a communication node 3700 may be powered with an electric power outlet of the home and may have two ptp links via two integrated ptp radio module and one ptmp radio module integrated with a digital/network module. At "Site E," a communication node 3700 may be powered with an electric power outlet of the home and may have two ptp links via two integrated ptp radio module. Further, at "Site D," a communication node 3700 may be powered with an electric power outlet of the home and may have two ptp links via two integrated ptp radio module and one ptmp radio module integrated with the digital/network module.

Figure 25A:
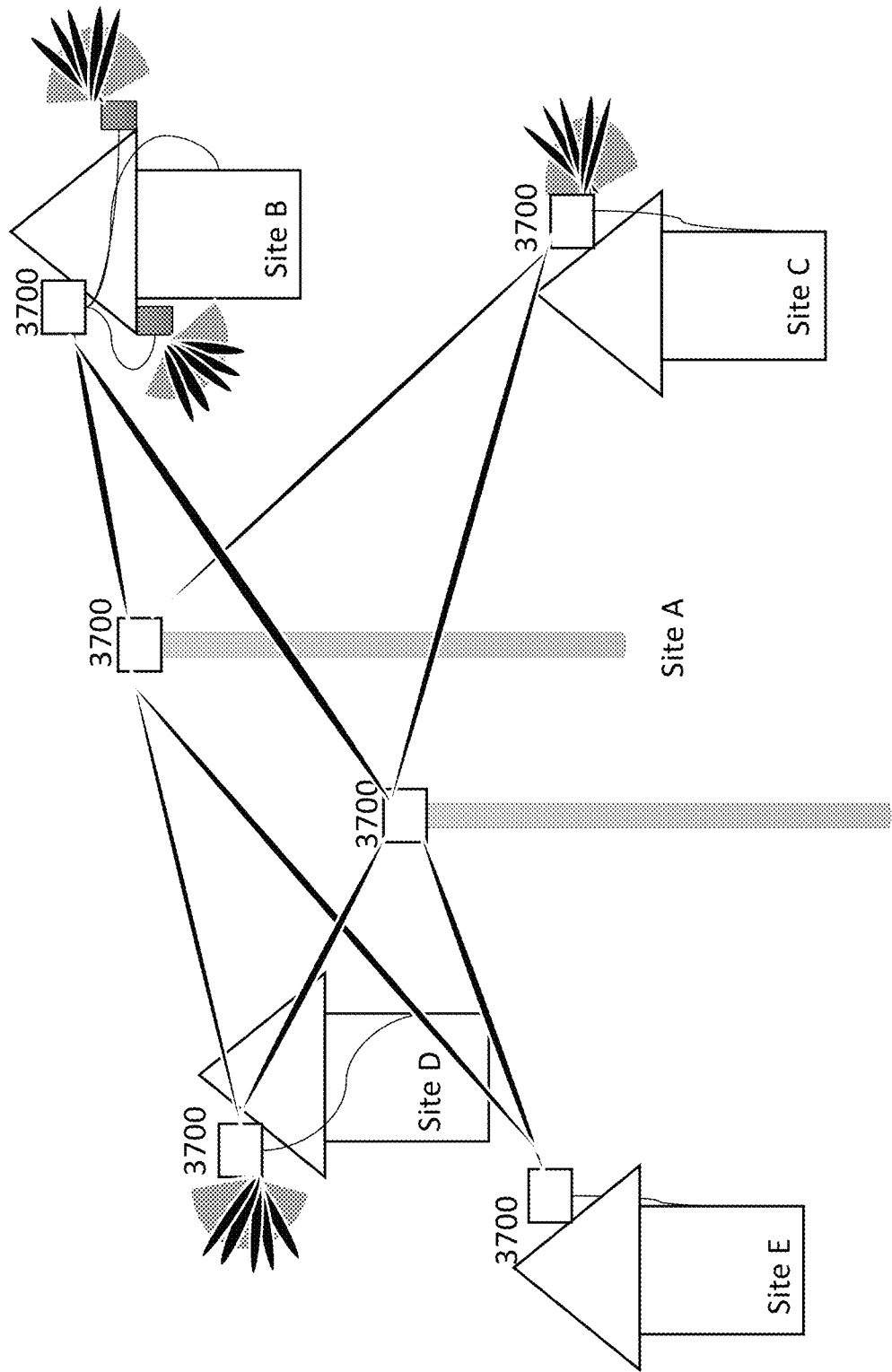
FIG. 25A depicts another example of a wireless mesh network comprising a plurality of communication nodes, in accordance with the present disclosure.

Referring to FIG. 25A, another use case of the communication node described above is shown. In particular, FIG. 25A shows an example wireless mesh network that includes communication nodes 3700 at the 5 sites previously described with respect to FIG. 24, as well as an additional communication node 3700 at "Site A2." Similar to communication node 3700 at "Site A," communication node 3700 at "Site A2" may be mounted on a pole (among other possibilities).

Based on the preceding disclosure (e.g., the disclosure in connection with FIGS. 5-7, 9-11, 13, and 16-18), one of ordinary skill in the art will appreciate that each communication node 3700 at a given site may have the capability to communicate with multiple other communication nodes at multiple other sites. For instance, communication node 3700 at "Site B" may have the capability to communicate with the respective communication nodes 3700 at both "Site A" and communication node 3700 at "Site A2." Similarly, the respective communication node 3700 at each of "Site C," "Site D," and "Site E" may have the capability to communicate with the respective communication nodes 3700 at both of "Site A" and "Site A2."

Furthermore, based on the preceding disclosure (e.g., the disclosure in connection with FIGS. 5, 11, and 18), one of ordinary skill in the art will appreciate that each communicate node 3700 at a given site (e.g., communication node 3700 at "Site B") may have the capability to dynamically switch its active communication link from a first communication node 3700 at a first site (e.g., communication node 3700 at "Site A") to a second communication node 3700 at a second site (e.g., communication node 3700 at "Site A2") based on some trigger that is similar to the triggers described above (e.g., changes in link condition such as a change from a LOS path to a non-LOS path due to a change in environment, increased interference, instructions from higher layers, latency, bandwidth, and/or packet loss requirements of a particular application, etc.).

Figure 25B:
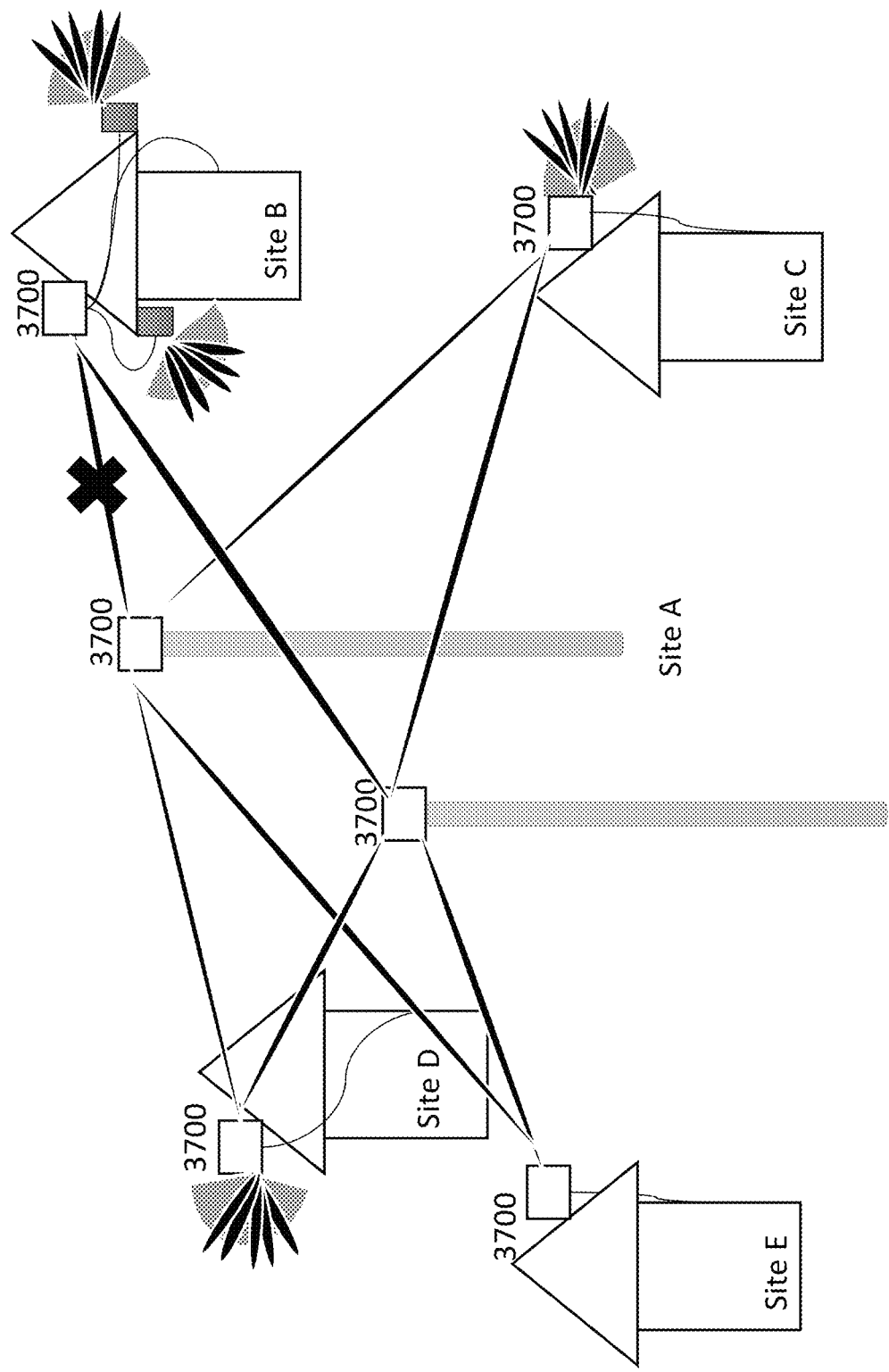
FIG. 25B depicts yet another example of a wireless mesh network comprising a plurality of communication nodes, in accordance with the present disclosure.

For instance, in the scenario shown in FIG. 25A, the respective communication node 3700 at each of "Site B," "Site C," "Site D," and "Site E" may initially be configured to actively communicate with the communication node 3700 at "Site A" (which may function to route backhaul traffic to and/or from such other sites). However, at some later point in time, the communication node 3700 may dynamically switch its active communication link from the communication node 3700 at "Site A" to the communication node 3700 at "Site A2" (which may also function to route backhaul traffic to and/or from such other sites) due to some trigger similar to the triggers described above. Such a scenario is shown in FIG. 25B.

It should be understood that FIGS. 24-25 are described in such a manner for the sake of clarity and explanation and that the example wireless mesh networks described in FIGS. 24-25 may take various other forms as well. For instance, the example wireless mesh networks may include more or less communication nodes, and a given communication node may take various other forms and may be mounted in various other manners and/or mounted on various other objects as well (e.g., mounted on a pedestal). Further, in line with the preceding disclosure, one or more of the communication nodes (e.g., the communication nodes 3700 at "Site A" and "Site A2) may be mounted to an object that is at or near a fiber access point. Further yet, the example mesh networks may have various different configurations of ptp or ptmp modules either integrated or connected via an ethernet interface and powered via various different power options.

Another important aspect of communication node 3700 is that the integrated radio modules can be pluggable. In other words, based on a specific use case, the number and types of radio modules integrated with a digital/network module via PCI/PCIe interface can easily be changed by plugging in the desired number and type of radio modules with full flexibility instead of having one specific configuration.

So far the modified version of communication nodes discussed above and also described in the context of FIGS. 21-25 assumes that the ptp or ptmp modules connected to a digital/network module with an NPU via a high speed interface (e.g., PCI/PCIe/Thunderbolt) are also located inside a same enclosure. It should be understood that the ptp or ptmp modules connected to a digital/network module via high speed interface can also be located outside the digital/network module with the NPU and inside an independent box/enclosure connected via an outdoor cable supporting the PCI/PCIe/Thunderbolt high speed communication protocol to the enclosure of the digital/network module.

Figure 26:
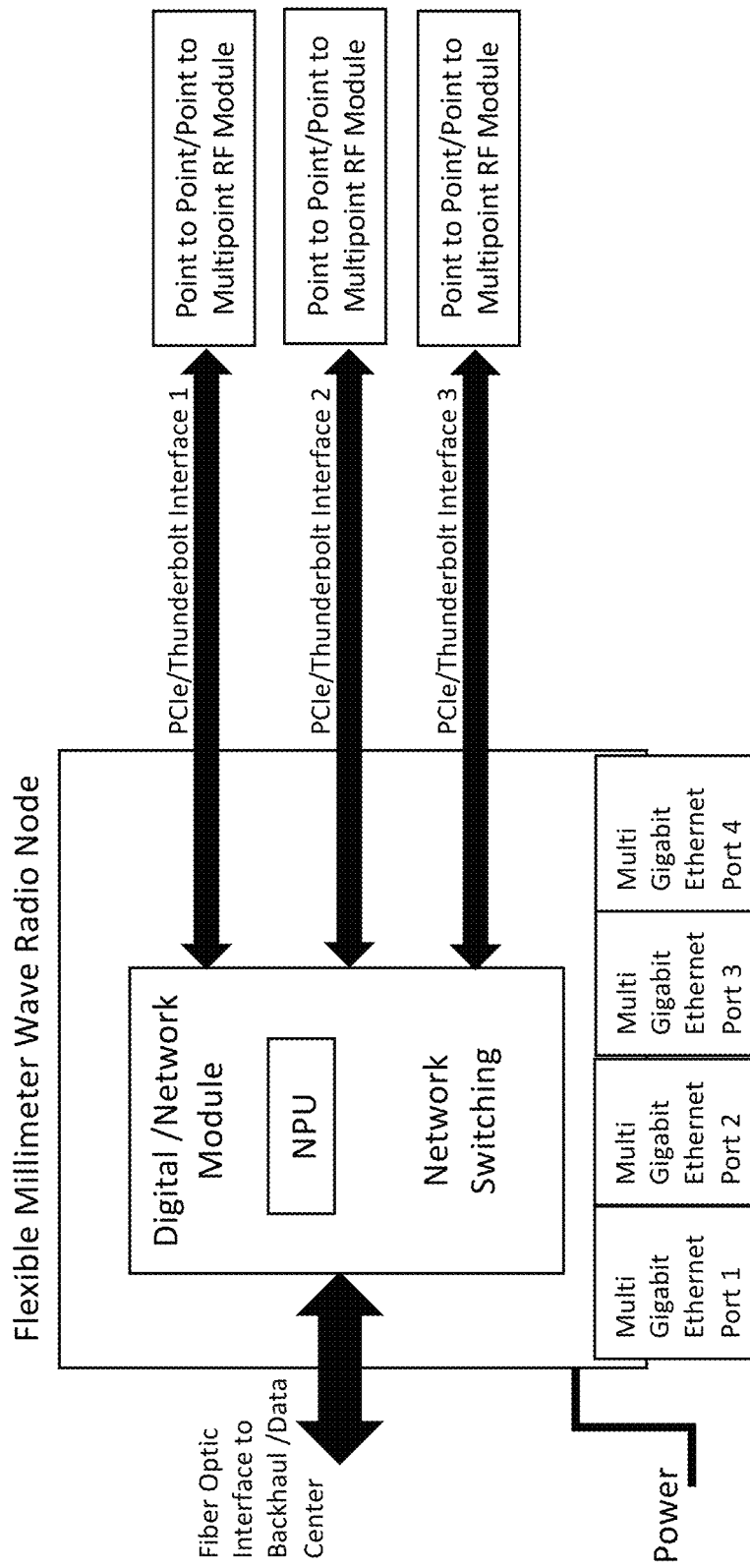
FIG. 26 depicts an example modified version of flexible millimeter-wave communication equipment, in accordance with the present disclosure.

As one example, FIG. 26 depicts a modified version of a flexible millimeter-wave radio box, where the ptp or ptmp RF modules are located outside a digital/network module with NPU enclosure and inside separate independent box/enclosure and connected via an outdoor wired cable capable of supporting high speed communication interface (e.g., PCI/PCIe/Thunderbolt Interface). As shown, 3 ptp or ptmp modules are connected via PCIe/Thunderbolt interfaces to the digital/network module with the NPU using a compatible outdoor cable.

In general, it should be understood that N number of ptp or ptmp modules in separate independent enclosures can be connected via a PCIe/Thunderbolt compatible outdoor cable, where N is an integer greater than zero. It should also be understood that the length of the outdoor cable compatible with high speed communication protocol, such as PCIe/thunderbolt, depends on the maximum limit defined by the technology. In one embodiment, PCIe/thunderbolt cable can be up to 3 meters. In other embodiments, the length of the outdoor PCI/PCIe/thunderbolt compatible cable can be less than or greater than 3 meters.

In yet another embodiment of the present disclosure, a wireless mesh network may include ultra-high-capacity nodes that are capable of establishing ultra-high-capacity links (e.g., ptp or ptmp bi-directional communication links) using a millimeter-wave spectrum, including but not limited to 28 Ghz, 39 Ghz, 37/42 Ghz, 60 Ghz (including V band), or E-band frequencies, as examples. These ultra-high-capacity links may have a larger range as compared to other ptp or ptmp links, including but not limited to ptp or ptmp links of the type discussed above with reference to FIGS. 1-26.

For instance, as one possibility, a ptp or ptmp link of the type discussed above with reference to FIGS. 1-26 may have an average range of up to 100 meters, whereas an ultra-high-capacity link may have a range of more than 100 meters. As another possibility, a ptp or ptmp link of the type discussed above with reference to FIGS. 1-26 may have an average range of up to 500 meters, whereas an ultra-high-capacity link may have a range of more than 500 meters. As yet another possibility, a ptp or ptmp link of the type discussed above with reference to FIGS. 1-26 may have an average range of up to 1000 meters, whereas an ultra-high-capacity link may have a range of more than 1000 meters.

However, in other implementations, it is possible that the length of an ultra-high-capacity link may be similar to the length of a ptp or ptmp links of the type discussed above with reference to FIGS. 1-26, but may nevertheless provide higher capacity such that a fewer number of ultra-high-capacity nodes/links may be used (as compared to the ptp or ptmp nodes/links of the type discussed above with reference to FIGS. 1-26) to build a main high capacity backbone through the mesh (i.e., the ultra-high-capacity nodes/links may be sparser).

The higher capacity and/or extended range of these ultra-high-capacity nodes/links may be achieved via various advanced signal processing techniques, including but not limited to multiple input multiple output (MIMO) such as 2×2 MIMO, 4×4 MIMO, 8×8 MIMO or an even higher order MIMO, use of vertical and horizontal polarization (V & H), higher switch capacity of the digital network module due to higher processing power such as support of 8×25 Gbps port (200 Gbps aggregate traffic flow), higher order modulation including 16QAM, 64QAM, 256QAM, 512 QAM, 1024 QAM, orbital angular momentum (OAM) multiplexing, and/or higher antenna gains, among other possibilities. Further, in some implementations, the higher capacity and/or extended range of these ultra-high-capacity nodes/links can be achieved using a subset of the advanced signal processing techniques mentioned above.

These ultra-high-capacity nodes/links may be used in conjunction with other ptp and/or ptmp links, including but not limited to ptp or ptmp links of the type discussed above with reference to FIGS. 1-26, to add another layer to a wireless mesh network.

Figure 27:
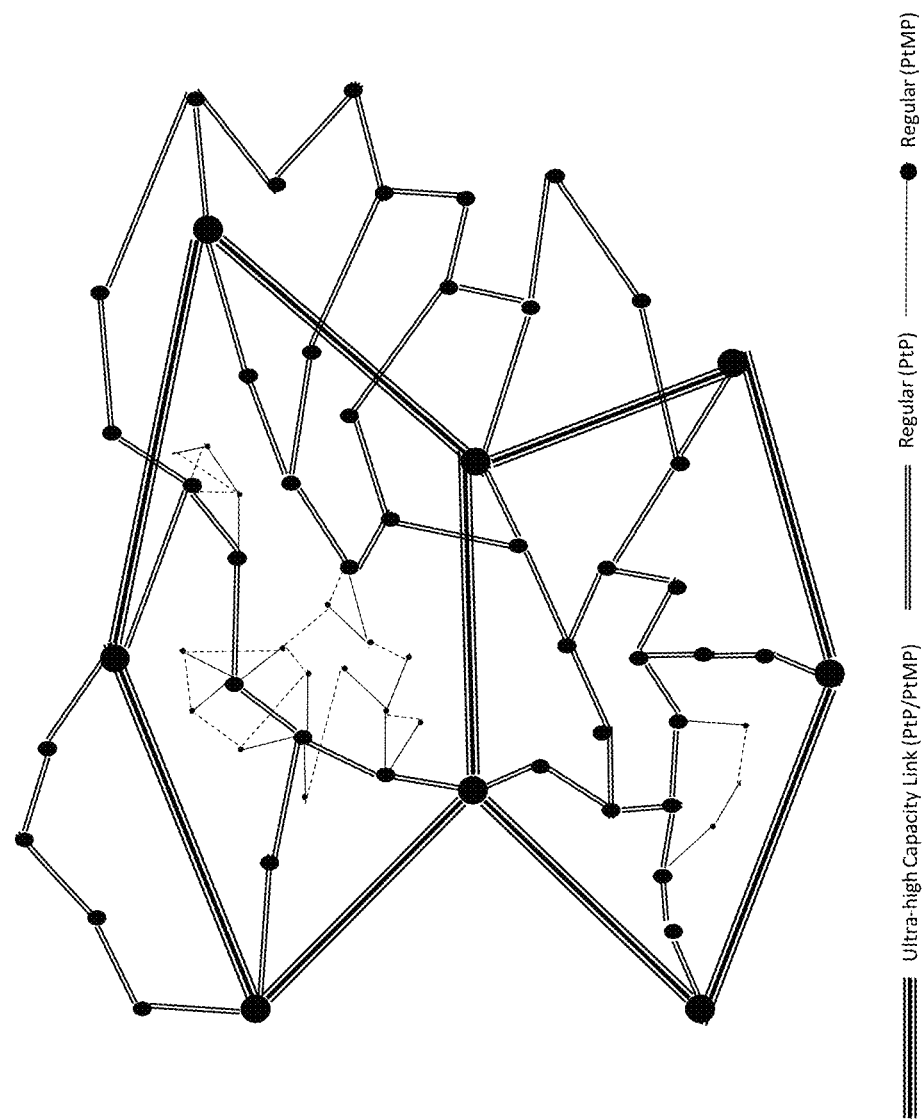
FIG. 27 depicts an example of a multi-layer wireless mesh network, in accordance with the present disclosure.

To illustrate with an example, FIG. 27 shows one example of a multi-layer wireless mesh network in which triple-compound links represent the ultra-high-capacity links described above, double-compound rings represent ptp links of the type discussed above with reference to FIGS. 1-26, and single-line links represent ptmp links of the type discussed above with reference to FIGS. 1-26. In this respect, each of the different types of links may be considered to define a different layer of the multi-layer wireless mesh network (e.g., an ultra-high-capacity layer, a standard ptp layer, and a standard ptmp layer).

As shown in FIG. 27, longer ultra-high-capacity links may be used bring a high level of capacity to the wireless mesh network, which can then be delivered to an end user/customer via a shorter ptp or point to multi point link (which may not be ultra-high-capacity). It should also be understood that while the ptmp links may primarily serve to provide flexibility in building the wireless mesh network due to the capability of beam steering and ability to establish multiple links from a single radio, these ptmp links may also be used to indirectly connect two ptp links via multiple ptmp link hops that can add additional reliability to the network.

Further, it should be understood that a multi-layer wireless mesh network such as the one illustrated in FIG. 27 can be deployed in various manners. For instance, in one implementation, different layers of the multi-layer mesh network can be deployed in parallel. In another implementation, different layers of the multi-layer wireless mesh network can be deployed in different phases. For example, a deployment approach for a multi-layer wireless mesh network may involve first building a core network backbone (e.g., an ultra-high-speed network) using ultra-high-capacity nodes/links and then densifying the network during one or more subsequent phases using other types of ptp or ptmp nodes/links, including but not limited to ptp or ptmp radio links of the type discussed above with reference to FIGS. 1-26. In another example, a deployment approach for a multi-layer wireless mesh network may involve first building a network of ptp nodes/links that are not ultra-high capacity and then later upgrading capacity by adding ultra-high-capacity nodes/links. A multi-layer wireless mesh network can be deployed in other manners as well.

Figure 28:
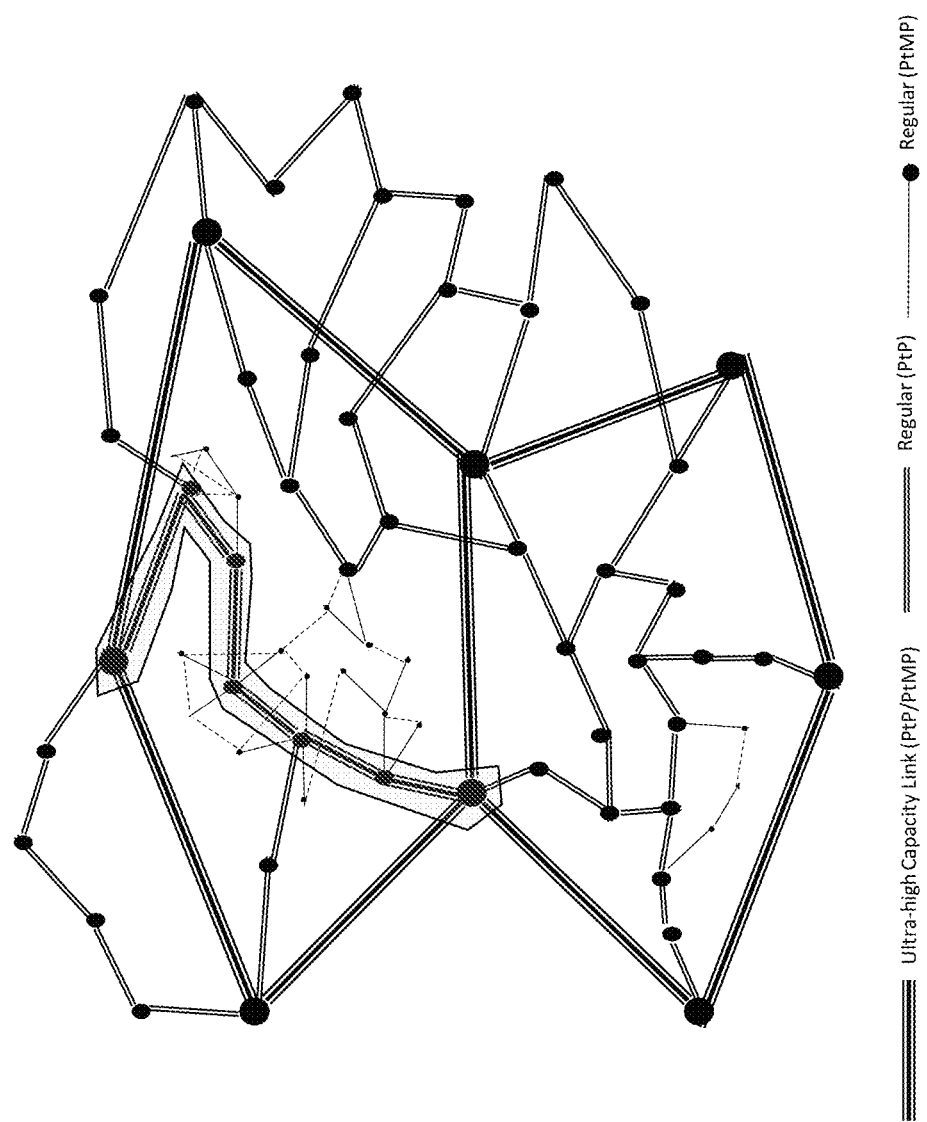
FIG. 28 depicts another example of a multi-layer wireless mesh network, in accordance with the present disclosure.

One variation of the multi-layer mesh architecture described above is that the ultra-high-capacity links can be designed to create specific paths based on a traffic requirement and/or some other criteria defined by the operator. To illustrate with an example, FIG. 28 shows another example of a multi-layer wireless mesh network in which some of the preexisting, non-ultra-high-capacity ptp links included in the example multi-layer wireless mesh network of FIG. 27 are replaced by ultra-high-capacity links (shown as triple-compound links) to provide ultra-high capacity to specific segments of the wireless mesh network. This can be done either by supplementing the hardware of the preexisting, non-ultra-high-capacity nodes at the customer location with new hardware (e.g., a new radio or other associated hardware) capable of establishing ultra-high-capacity links or by replacing the hardware of the preexisting, non-ultra-high-capacity nodes at the customer location with new hardware (e.g., a new radio or other associated hardware) capable of establishing ultra-high-capacity links.

Another variation of the multi-layer mesh architecture described above is that different layers of the wireless mesh network may be deployed at different heights, which may create physical-link separation by allowing re-use of the available frequency spectrum. For instance, in one implementation, a multi-layer wireless mesh network can have at least 2 layers of ultra-high-capacity links operating in the same frequency range, but at different heights. To illustrate with an example, a first layer of ultra-high-capacity links can be deployed at a lower height, such as by installing the required hardware at a lower height within a structure hosting the wireless mesh hardware (e.g., on a lower floor of a building), and a second layer of the ultra-high-capacity links can be deployed at a higher height, such as by installing the required hardware at a higher height of the structure hosting the wireless mesh hardware (e.g., at higher floor of the building). In this respect, the deployment of these different layers of ultra-high-capacity links at different heights may serve to increase the capacity of the multi-layer wireless mesh network.

While the foregoing example involves the deployment of multiple different layers of ultra-high-capacity links at multiple different heights, it should be understood that this example is merely provided for purposes of illustration, and that multiple layers of wireless mesh links of any type may be deployed at different heights in order to enhance the overall capacity of the multi-layer wireless mesh network, including but not limited to layers of ultra-high-capacity links, non-ultra-high-capacity ptp links, and/or non-ultra-high-capacity ptmp links.

Yet another variation of the multi-layer mesh architecture described above is that the ptmp links that are not ultra-high capacity (which are shown in FIGS. 27 and 28 as single-line links) may be replaced by wired links, such as a coaxial wire loop, fiber loop or some other type of wired link. To illustrate with an example, a multi-layer mesh network may include wired links that comprise the coaxial portion of the HFC (Hybrid Fiber Coax) used by the cable companies, in which case this coaxial portion of the HFC may bring mesh network connectivity to end users while the fiber portion of the HFC may bring the high-speed internet to the neighborhood. In this respect, the wireless mesh links consisting of ultra-high-capacity links (which are shown in FIGS. 27 and 28 as triple-compound links) and/or non-ultra-high-capacity ptp links may play the role of the fiber equivalent portion of the HFC by bring high capacity from a fiber POP to the neighborhood.

According to yet another aspect of the present disclosure, sites that are installed with wireless communication equipment for operating as nodes of a wireless mesh network that is utilized for delivering services to end users such as high-speed internet (which may sometimes be referred to as a "next generation" wireless mesh network) may also be installed with equipment that enables the sites to additionally operate as nodes of an edge computing platform that is configured to support any of various different types of edge computing applications, examples of which may include autonomous vehicle ("AV") applications, industrial automation and/or robotics applications, augmented/virtual reality applications, and video monitoring and/or processing applications, among other possibilities.

For instance, as discussed above, a communication system that is based on the wireless mesh network technologies disclosed herein may include different tiers of sites that are installed with wireless communication equipment for operating as different tiers of nodes within a wireless mesh network—including fiber PoP sites that host fiber PoP nodes, seed homes that host seed nodes, and anchor homes that host anchor nodes—and these different tiers of sites/nodes may be interconnected together via wireless ptp and/or ptmp links in order to form the wireless mesh network. In accordance with this aspect of the present disclosure, some or all of these sites could then additionally be installed with equipment for operating as nodes of an edge computing platform, where the additional equipment installed at each such node may take the form of an edge computing system comprising hardware (e.g., a processor, data storage, a communication interface, etc.) and associated software for performing functions related to any of various types of edge computing applications. This novel architecture enables the mesh-based communication system disclosed herein to additionally perform remote processing and/or data storage for edge computing applications in a distributed manner at sites that are closer to the location where data for the edge computing applications is being generated and/or consumed, which may improve the response time and/or user experience for such edge computing applications.

In one implementation, the edge computing systems that are installed at the different tiers of nodes of the wireless mesh network may also have different levels of processing power. For instance, the edge computing systems installed at fiber PoP nodes of a wireless mesh network may generally have the highest level of processing power within the communication system, the edge computing systems installed at seed nodes of the wireless mesh network may generally have the second highest level of processing power within the communication system, and the edge computing systems installed at anchor nodes of the wireless mesh network may generally have the third highest level of processing power within the communication system. In this respect, the processing power of the edge computer systems may be defined based on various factors, examples of which may include clock speed, memory size, number of processing cores, and/or total number of physical computers/servers, among other possibilities.

When engaging in processing and/or data storage for an edge computing application, such an implementation enables the distributed edge computing platform disclosed herein to intelligently balance between (1) utilizing edge computing systems installed at nodes that are closer to an endpoint of an edge computing application such as anchor nodes, which may have lesser processing power than other nodes that are deeper into the distributed edge computing platform but may enable the communication between the endpoint and the nodes to traverse shorter distances (e.g., a lower number of hops) that should theoretically result in lower latency, and (2) utilizing edge computing systems installed at nodes that are further away from an endpoint of an edge computing application such as seed nodes or fiber PoP nodes, which may have more processing power than other nodes that are closer to the edge of the distributed edge computing platform but may require communication between the end-user equipment and the nodes to traverse longer distances (e.g., a higher number of hops) that may result in increased latency. In this respect, the edge computing systems belonging to the different tiers of the distributed edge computing platform disclosed herein may function to coordinate with one another to arbitrate the utilization of edge computing resources within the platform in a manner that is intended to optimize certain metrics related to the edge computing application, such as response time or bandwidth.

For instance, when an edge computing system installed at a given node receives a request to process data for an edge computing application, the edge computing system may evaluate and balance factors such as (1) the available processing power at the receiving node as compared to other nodes of the distributed edge computing platform, which may be defined in terms of the total available processing power at the nodes and perhaps also the current utilization of the processing power at the nodes (to the extent such information is available), and (2) the expected latency involved in offloading the processing to one or more other nodes in the distributed edge computing platform, which may be defined in terms of number of hops between the receiving node and the one or more other nodes, the maximum available bandwidth (or minimum possible latency) of each wireless link between the receiving node and the one or more other nodes, and perhaps also the current utilization of each wireless link between the receiving node and the one or more other nodes (to the extent such information is available). The edge computing system at the receiving node may evaluate other factors as well. Based on its evaluation, the edge computing system at the receiving node may then determine an appropriate plan for processing the data for the edge computing application (e.g., a plan that is expected to yield the quickest response time), and if that plan involves processing at one or more other nodes within the distributed edge computing platform, the edge computing system at the receiving node may in turn coordinate with the edge computing system at each of the one or more other nodes in order to cause the processing to be carried out.

Figure 29:
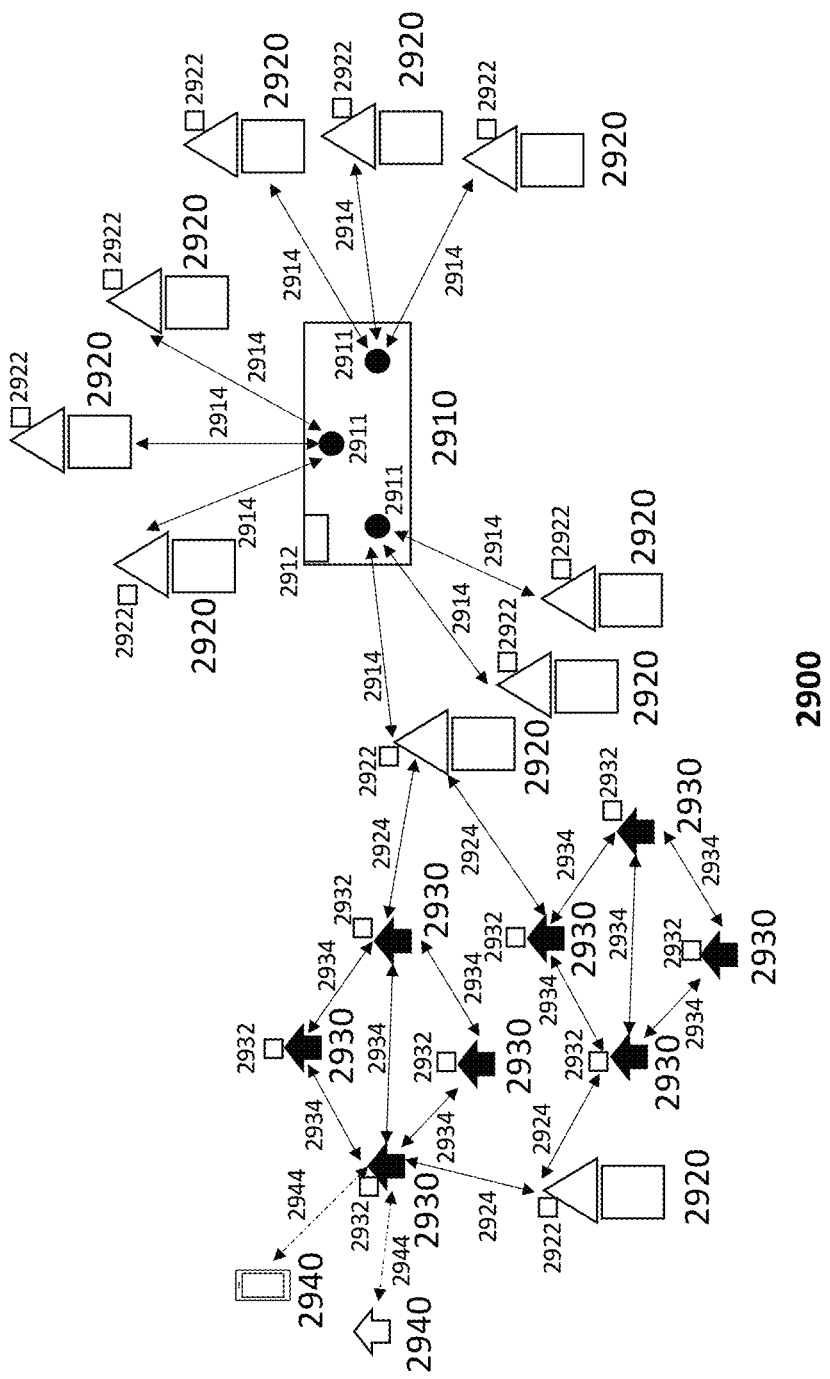
FIG. 29 depicts an example of a communication system in which an edge computing platform has been built on top of a wireless mesh network, in accordance with the present disclosure.

Turning now to FIG. 29, an example communication system 2900 that is built in accordance with this aspect of the present disclosure is illustrated. As shown in FIG. 29, example communication system 2900 may comprise a wireless mesh network of different tiers of wireless communication nodes that are configured to deliver a service such as high-speed internet service to end users—including at least one fiber POP node 2910 hosted at a fiber PoP site, at least one seed node 2920 hosted at a respective seed home, at least one anchor node 2930 hosted at a respective anchor site—where such nodes have also been installed with equipment (e.g., edge computing systems) for enabling such nodes to additionally operate as part of a distributed edge computing platform that is configured to perform processing and/or data storage for one or more edge computing applications. Additionally, as shown in FIG. 29, example communication system 2900 may also include at least one client node 2940 (which may be referred to as a "sub-anchor node") that can connect to other nodes of example communication system 2900 (e.g., anchor nodes) via a wireless link, such that the service(s) delivered by the wireless mesh network can be provided to client node 2940 and an edge computing application edge running on client node 2940 can also utilize the distributed edge computing platform. In this way, a distributed edge computing platform is "overlaid" onto an underlying wireless mesh network that is constructed in the manner disclosed herein, which may leverage the benefits of the disclosed wireless mesh network technologies (e.g., high capacity and low latency) in order to improve upon existing edge computing platforms.

For instance, as shown in FIG. 29, example communication system 2900 may include 1 fiber POP node 2910, 10 seed nodes 2920, 8 anchor nodes 2930 that are interconnected via wireless links to form a wireless mesh network, along with 2 client nodes 2940 that are each connected to a given anchor node 2930 of the wireless mesh network via a wireless link. In this arrangement, fiber POP 2910 is shown to be connected to certain seed nodes 2920 via respective PoP-to-seed wireless links 2914, certain seed nodes 2920 are shown to be connected to certain anchor nodes 2930 via respective seed-to-anchor wireless links 2924, certain anchor nodes 2930 are shown to be connected to other anchor nodes 2930 via respective anchor-to-anchor wireless links 2934, and then each client node 2940 is shown to be connected to a given anchor node 2930 via client-to-anchor wireless link 2944. In one implementation, each of wireless links 2914, 2924, 2934, and 2944 may take the form of a millimeter-wave ptp or ptmp link having very high capacity (e.g., a bandwidth ranging from 20 gigabits per second to 100 gigabits per second bi-directionally), but it should be understood that these wireless links could take other forms well. Further, while FIG. 29 shows one particular arrangement of fiber POP nodes, seed nodes, anchor nodes, and client nodes that have been interconnected via wireless links 2914, 2924, 2934, and 2944 to form a wireless mesh network, it should be understood that the nodes of example communication system 2900 may be arranged and interconnected together in various other manners as well—including but not limited to the possibility that example communication system 2900 could include any number of fiber POP nodes, seed nodes, anchor nodes, and client nodes.

Fiber POP node 2910 of example communication system 2900 may be hosted at any PoP site that has access to dedicated dark or lit fiber that provides fiber POP node 2910 with access to a very large amount of data bandwidth (e.g., several hundred gigabits/second) to carry network traffic to and from a core network/data center (not shown in the FIG. 29 for the sake of simplicity). Such a fiber PoP site may take various forms. As one possibility, the fiber PoP site could be a commercial building, such as a grocery store like Walmart, where equipment for establishing wireless links for the wireless mesh network (e.g., millimeter-wave radios and antennas) can be installed on the building's rooftop in a manner that provides good line-of-sight to surrounding areas. In such an implementation, an owner or operator of computing system 2900 could enter in a direct or indirect partnership or agreement with the owner or operator of the building and/or a fiber service provider to use the building either exclusively or on a shared basis as a site for a fiber POP node 2910. Additionally, in a scenario where the owner or operator of the building also owns other similar buildings, such as a chain of Walmart grocery stores, the agreement may involve exclusive or shared use of multiple different buildings as sites for fiber POP nodes 2910. As another possibility, the fiber PoP site could be some other building or structure, such as a cell tower or a residential or commercial building that is tall enough to provide good line-of-sight to surrounding areas.

As shown in FIG. 29, fiber PoP 2910 may include one or more antenna masts that each carry wireless communication equipment (e.g., one or more millimeter-wave radios and antennas and perhaps other supporting equipment such as routers, switches, power and/or battery units, mounts, etc.)

for establishing one or more PoP-to-seed wireless links 2914 with one or more seed nodes of example communication system 2900. For example, FIG. 29 shows that fiber PoP 2910 may include three antenna masts 2911, each of which may carry wireless communication equipment (e.g., multiple millimeter-wave radios and antennas) that is configured to establish three separate PoP-to-seed wireless links 2914 with three seed nodes 2920. As noted above, in one implementation, each PoP-to-seed wireless link 2914 may take the form of a millimeter-wave ptp or ptmp link having very high capacity (e.g., a bandwidth ranging from 20 gigabits per second to 100 gigabits per second bi-directionally), but it should be understood that these wireless links could take other forms well. Further, it should be understood that fiber PoP 2910 shown in FIG. 29 is merely an illustrative example and that the number of antenna masts 2911 included in a fiber PoP node and/or the number of wireless links established by each antenna mast of a fiber PoP node may vary.

Turning to the seed nodes, each seed node 2920 of example communication system 2900 may be hosted at a site that may take the form of detached single-family home or residential unit, a non-detached residential building such as an MDU, a commercial building such as SMBs, or some other private property or infrastructure, where wireless communication equipment for establishing wireless links with other nodes of the wireless mesh network can be deployed at the site (e.g., on the rooftop of the building). In this respect, in addition to serving as an infrastructure node of the wireless mesh network, each seed node 2920 may deliver a mesh-based service such as high-speed internet to individuals that are located (e.g., reside or work) at the site of each seed node 2920.

Further, each seed node 2920 of example communication system 2900 may be installed with wireless communication equipment (e.g., millimeter-wave radios and antennas and perhaps other supporting equipment such as routers, switches, power and/or battery units, mounts, etc.) that enables the seed node 2920 to establish one or more wireless links with one or more other nodes of the wireless mesh network. For instance, a given seed node 2920 may be installed with wireless communication equipment for establishing a PoP-to-seed wireless link 2914 with at least one fiber PoP node 2910 and a respective seed-to-anchor wireless link 2924 with each of one or more anchor nodes 2930. Additionally, although not shown, a given seed node 2920 could also be installed with wireless communication equipment for establishing a seed-to-seed wireless link with a peer seed node 2920. As noted above, in one implementation, each PoP-to-seed wireless link 2914, seed-to-anchor wireless link 2924, and seed-to-seed wireless link (if present) may take the form of a millimeter-wave ptp or ptmp link having very high capacity (e.g., a bandwidth ranging from 20 gigabits per second to 100 gigabits per second bi-directionally), but it should be understood that these wireless links could take other forms well.

Turning to the anchor nodes, as with the seed nodes, each anchor node 2930 of example communication system 2900 may be hosted at a site that may take the form of detached single-family home or residential unit, a non-detached residential building such as an MDU, a commercial building such as SMBs, or some other private property or infrastructure, where wireless communication equipment for establishing wireless links with other nodes of the wireless mesh network can be deployed at the site (e.g., on the rooftop of the building). In this respect, in addition to serving as an infrastructure node of the wireless mesh network, each anchor node 2930 may deliver a mesh-based service such as high-speed internet to individuals that are located (e.g., reside or work) at the site of each anchor node 2930.

Further, each anchor node 2930 of example communication system 2900 may be installed with wireless communication equipment (e.g., millimeter-wave radios and antennas and perhaps other supporting equipment such as routers, switches, power and/or battery units, mounts, etc.) that enables the anchor node 2930 to establish one or more wireless links with one or more other nodes of the wireless mesh network. For instance, depending on its positioning within the wireless mesh network, a given anchor node 2930 may be installed with wireless communication equipment for establishing any one or more of (1) a seed-to-anchor wireless link 2924 with a seed node 2920 (or perhaps multiple such links), (2) an anchor-to-anchor wireless link 2934 with a peer anchor node 2930 (or perhaps multiple such links), and/or (3) an anchor-to-client wireless link 2944 with one or more client nodes 2940 (or perhaps multiple such links). A few representative examples of the possible configurations of an anchor node 2930 are illustrated in FIG. 29—some anchor nodes 2930 have a seed-to-anchor wireless link 2924 with a seed node 2920 as well as anchor-to-anchor wireless links 2934 with multiple peer anchor nodes 2930, other anchor nodes 2930 have anchor-to-anchor wireless links 2934 with multiple peer anchor nodes 2930 (but are not connected to any seed node 2920 or client node 2940), and then one anchor node 2930 closer to the edge has anchor-to-anchor wireless links 2934 with multiple peer anchor nodes 2930 as well as anchor-to-client wireless link 2944 with two client nodes 2940. Many other configurations of an anchor node 2930 are possible as well. As noted above, in one implementation, each seed-to-anchor wireless link 2924, anchor-to-anchor wireless link 2934, and anchor-to-client wireless link 2944 may take the form of a millimeter-wave ptp or ptmp link having very high capacity (e.g., a bandwidth ranging from 20 gigabits per second to 100 gigabits per second bi-directionally), but it should be understood that these wireless links could take other forms well.

Turning lastly to the client nodes, each client node 2940 of example communication system 2900 may comprise equipment (e.g., a millimeter-wave radio and associated antenna) for connecting to an infrastructure node of the wireless mesh network via a wireless link so as to enable to client node 2940 to send data to and/or receive data from the wireless mesh network. For example, as shown in FIG. 29, client nodes 2940 may each be connected to a given anchor node 2930 of the wireless mesh network via an anchor-to-client wireless link 2944, which may comprise whichever anchor node 2930 is physically closest to client nodes 2940 (among other possibilities). As noted above, in one implementation, each anchor-to-client wireless link 2944 may take the form of a millimeter-wave ptp or ptmp link having very high capacity (e.g., a bandwidth ranging from 20 gigabits per second to 100 gigabits per second bi-directionally), but it should be understood that these wireless links could take other forms well.

In practice, client nodes 2940 may take any of various forms, examples of which may include fixed-location CPE and mobile computing devices or systems, among other possibilities. Further, in practice, client nodes 2940 may be owned by, operated by, or otherwise associated with individuals or organizations that are considered to be end users (or sometimes referred to as customers) of a service that is delivered by the wireless mesh network, such as a high-speed internet service. Further yet, it should be understood that client nodes 2940 may switch its connection to the wireless mesh network from one infrastructure node to another over the course of time (e.g., if client node 2940 is a mobile device that is changing location).

In line with the discussion above, the wireless communication equipment for establishing the wireless links of the wireless mesh network may take any of various forms. As one possibility, such wireless communication equipment may include an independent ptp/ptmp radio module for each wireless ptp or ptmp link that is established at a given node. As another possibility, such wireless communication equipment may include a central unit (e.g., an NPU) that is configured to control one or more ptp/ptmp radio modules that each generates a respective ptp or ptmp link. As yet another possibility, such wireless communication equipment may include a single or multiple massive MIA/10 (multiple input multiple out) radio along with RF chains and two-dimensional antenna arrays that may simultaneously generate and operate dedicated ptmp or coordinated ptmp links to connect to other nodes of the wireless mesh network. The wireless communication equipment for establishing the wireless links of the wireless mesh network may take other various forms as well.

In line with the discussion above, each different type of wireless link 2914, 2924, 2934, 2944 within the wireless mesh network of FIG. 29 could be either a wireless ptp link or a wireless ptmp link. However, in practice, these different types of wireless links have different respective advantages and disadvantages and may thus be better suited for use in different segments of the wireless mesh network.

For instance, millimeter-wave ptp links generally have a better interference profile than millimeter-wave ptmp links, and in most cases, millimeter-wave ptp links are unlikely to cause interference with one another even if such millimeter-wave ptp links do not have an extremely-narrow beamwidth (e.g., a 3 dB-beamwidth of up to 10 degrees or perhaps more). The primary exception to this would be a scenario where a ptp receiver has established a ptp link with a corresponding ptp transmitter but is also pointed towards the boresight (or closer to) of another ptp transmitter that is not intended to establish a ptp link with the ptp receiver. However, this scenario is unlikely and can be easily mitigated by changing the position of the impacted ptp receiver and its corresponding. However, because millimeter-wave ptp links have a narrower beamwidth, they are better suited for establishing connections between nodes that have predefined, fixed locations and are expected to require minimal or no coordination after deployment of the wireless mesh network, such as Fiber PoP, seed, and anchor nodes. On the other hand, because millimeter-wave ptmp links have a wider beamwidth (e.g., a beamwidth ranging from 120 degrees to 180 degrees), they are better suited for establishing connections with nodes that do not have predefined locations and may require coordination for frequency planning, interference mitigation, or the like after deployment of the wireless mesh network, such as client nodes that may be added after deployment of the wireless network and/or may not have a fixed location (e.g., mobile client devices). In this respect, the coordination that may be required may involve intra-link coordination between multiple devices that are communicating over the same ptmp link and inter-link coordination between multiple ptmp links operating on the same frequency.

In order to leverage these differing characteristics of ptp and ptmp links, in one particular implementation, the wireless mesh network disclosed herein may be designed such that each of the PoP-to-seed wireless links 2914, seed-to-anchor wireless links 2924, seed-to-seed wireless links (if present), and anchor-to-anchor wireless links 2934 is a wireless ptp link, while each wireless link between an infrastructure node and a client node (such as anchor-to-client wireless link 2944) is a wireless ptmp link originated by the infrastructure node. In this respect, the wireless mesh network may be considered to have two different "layers" (or "segments") of wireless links: (1) a first layer comprising the wireless ptp links that interconnect the fiber PoP, seed, and anchor nodes together, which may be preferred to as a "ptp layer," and (2) a second layer comprising the wireless ptmp links that connect the infrastructure nodes of the wireless mesh network to the client nodes, which may be preferred to as a "ptmp layer."

As discussed above, a distributed edge computing platform may also be overlaid onto the underlying wireless mesh network of FIG. 29 by installing certain nodes with equipment (e.g., an edge computing system) that enables such nodes to additionally operate as part of the distributed edge computing platform.

For instance, as shown in FIG. 29, Fiber POP node 2910 of example communication system 2900 may be installed with an edge computing system 2912 comprising hardware (e.g., a processor, data storage, a communication interface, etc.) and associated software for performing functions related to any of various types of edge computing applications, perhaps along with other supporting equipment (e.g., routers, switches, power and/or battery units, cooling units, etc.). In one implementation, edge computing system 2912 that is installed at Fiber POP node 2910 may be designed to have a very high level of processing power that exceeds the processing power of edge computing systems installed at any of the lower tiers of nodes within example communication system 2900, such as the seed and anchor nodes. For example, edge computing system 2912 may comprise multiple racks of high-powered, multi-core servers (perhaps along with associated power and cooling units) that are configured to run multiple tasks simultaneously and may be viewed as a "mini cloud" computing platform. However, edge computing system 2912 may take other forms as well.

Further, as shown in FIG. 29, each seed node 2920 of example communication system 2900 may be installed with a respective edge computing system 2922 comprising hardware (e.g., a processor, data storage, a communication interface, etc.) and associated software for performing functions related to any of various types of edge computing applications, perhaps along with other supporting equipment (e.g., routers, switches, power and/or battery units, cooling units, etc.). In one implementation, edge computing systems 2922 that are installed at seed nodes 2920 may be designed to have a high level of processing power that is not at the level of edge computing system 2912, but exceeds the processing power of edge computing systems installed at any of the lower tiers of nodes within example communication system 2900, such as the anchor nodes. For instance, each edge computing system 2922 may comprise a lesser number of servers (e.g., a few servers or perhaps as little as one server) that generally impose less power and cooling demands (e.g., less than 100 watts of power) than edge computing system 2912, and may also occupy a smaller physical footprint and/or have a lower cost. Additionally, in practice, edge computing systems 2922 may be designed to operate in harsher physical environments (e.g., environments with a greater extent of dust, debris, vibrations, etc. and/or a wider range of operating temperature). However, edge computing systems 2922 may take other forms as well.

While edge computing systems 2922 are generally designed to have a lower level of processing power than edge computing system 2912, it should be understood that edge computing systems 2922 will generally be closer to the location where processing and storage may be needed for an edge computing application than edge computing system 2912, and may thus provide superior response time relative to edge computing system 2912.

Further yet, as shown in FIG. 29, each respective anchor node 2930 of example communication system 2900 (or at least a subset thereof) may be installed with a respective edge computing system 2932 comprising hardware (e.g., a processor, data storage, a communication interface, etc.) and associated software for performing functions related to any of various types of edge computing applications, perhaps along with other supporting equipment (e.g., routers, switches, power and/or battery units, cooling units, etc.). In one implementation, edge computing systems 2932 that are installed at anchor nodes 2930 may be designed to have a level of processing power that is not at the level of either edge computing systems 2922 or edge computing system 2912, but may still be capable of performing processing for edge computing applications. For instance, each edge computing system 2932 may comprise a lesser number of servers than edge computing system 2922 (e.g., a single server), and may also occupy a smaller physical footprint and/or have a lower cost. Additionally, as with edge computing systems 2922, edge computing systems 2932 may be designed to operate in harsher physical environments (e.g., environments with a greater extent of dust, debris, vibrations, etc. and/or a wider range of operating temperature). However, edge computing systems 2932 may take other forms as well—including but not limited to the possibility that edge computing system 2932 may have a level of processing power that is relatively similar to edge computing systems 2922.

While edge computing systems 2932 are generally designed to have a lower level of processing power than edge computing systems 2922 and edge computing system 2912, it should be understood that edge computing systems 2932 will generally be closer to the location where processing and storage may be needed for an edge computing application than edge computing systems 2922 and edge computing system 2912, and may thus provide superior response time relative to edge computing systems 2922 and edge computing system 2912.

In accordance with the disclosed architecture, the edge computing systems installed at the different tiers of nodes in example communication system 2900 may then be configured to communicate with one another via the wireless links described above, which may take the form of millimeter-wave ptp and/or ptmp links that have high capacity (e.g., a bandwidth ranging from 20 gigabits per second to 100 gigabits per second bi-directionally) and low latency (e.g., less than 1 millisecond for ptp links and less than 4 milliseconds for ptmp links).

In addition to having the capability to connect to the wireless mesh network and access mesh-based services delivered via the wireless mesh network, certain client nodes 2940 of example communication system 2900 may then be programmed with the capability to operate as endpoints for one or more edge computing applications (or may provide a direct or indirect connection to such a client device), examples of which may include AV applications, industrial automation and/or robotics applications, augmented/virtual reality applications, and video monitoring and/or processing applications, among other possibilities. In this respect, certain client nodes 2940 may be installed with software associated with an edge computing application and may function to generate and/or consume data for the edge computing application that is processed and/or stored by the distributed edge computing platform disclosed herein.

In line with the discussion above, the edge computing systems installed at the different tiers of nodes in example communication system 2900 may also function to coordinate with one another to arbitrate the utilization of edge computing resources within the platform (e.g., processing and memory resources). For instance, when a given edge computing system 2932 installed at a given anchor node 2930 receives a request to process data for an edge computing application, the given edge computing system 2932 may evaluate and balance factors such as (1) the available processing power at the anchor node 2930 as compared to other nodes of the distributed edge computing platform (e.g., seed nodes 2920 and fiber PoP node 2910) and (2) the expected latency involved in offloading the processing to one or more other nodes in the distributed edge computing platform (e.g., seed nodes 2920 and fiber PoP node 2910), among other possibilities. Based on its evaluation, the given edge computing system 2932 may then determine an appropriate plan for processing the data for the edge computing application (e.g., a plan that is expected to yield the quickest response time), and if that plan involves processing at one or more other nodes within the distributed edge computing platform, the given edge computing system 2932 may in turn coordinate with the edge computing system at each of the one or more other nodes in order to cause the processing to be carried out. In this way, the edge computing platform disclosed herein may be able to provide improved response times for edge computing applications relative to existing edge computing platforms.

In some implementations, the edge computing systems may also be configured to store copies of digital content (or perhaps other types of data) that is not considered to be "local" to the edge computing systems, including but not limited to digital content that is local to other edge computing systems in the platform. This provides content redundancy in the edge computing platform. Hence, when an end user of the edge computing platform requests digital content, then this mechanism allows the request to be fulfilled in a variety of different ways, including a request processed by a local node and/or remote node based on various criteria including but not limited to latency, network congestion, etc. of the application making the request.

Turning now to FIG. 30, a simplified block diagram is provided to illustrate some structural components that may be included in an example edge computing system 3000, which may be installed as edge computing system 2912, 2922, or 2932. In line with the discussion above, edge computing system 3000 may generally comprise one or more physical computing devices (e.g., one or more servers or perhaps one or more racks of servers), and these one or more computing devices may collectively include at least a processor 3002, data storage 3004, and a communication interface 3006, all of which may be communicatively linked by a communication link 3008 that may take the form of a system bus, a communication network such as a public, private, or hybrid cloud, or some other connection mechanism.

Processor 3002 may comprise one or more processing components, such as one or more general-purpose processors (e.g., one or more single- or multi-core microprocessors such as central processing units), special-purpose processors (e.g., one or more application-specific integrated circuits or digital-signal processors such as tensor processors), programmable logic devices (e.g., a field programmable gate array), controllers (e.g., microcontrollers), and/or any other processor components now known or later developed. In line with the discussion above, it should also be understood that processor 3002 could comprise processing components that are distributed across a plurality of physical computing devices connected via a network, such as a computing cluster of a public, private, or hybrid cloud.

In turn, data storage 3004 may comprise one or more non-transitory computer-readable storage mediums that are collectively configured to store (i) program instructions that are executable by processor 3002 such that edge computing system 3000 is configured to perform some or all of the disclosed functions in connection with edge computing applications, and (ii) data that may be received, derived, or otherwise stored, for example, in one or more databases, file systems, or the like, by edge computing system 3000 in connection with the disclosed functions. In this respect, the one or more non-transitory computer-readable storage mediums of data storage 3004 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 3004 may comprise computer-readable storage mediums that are distributed across a plurality of physical computing devices connected via a network, such as a storage cluster of a public, private, or hybrid cloud. Data storage 3004 may take other forms and/or store data in other manners as well.

Communication interface 3006 may be configured to facilitate wireless and/or wired communication with the wireless communication equipment disclosed herein. Additionally, in an implementation where edge computing system 3000 comprises a plurality of physical computing systems connected via a network, communication interface 3006 may be configured to facilitate wireless and/or wired communication between these physical computing systems (e.g., between computing and storage clusters in a cloud network). As such, communication interface 3006 may take any suitable form for carrying out these functions, examples of which may include an Ethernet interface, a Wi-Fi network, a cellular network, a serial bus interface (e.g., Firewire, USB 3.0, etc.), a chipset and antenna adapted to facilitate wireless communication, short-range wireless protocols, and/or any other interface that provides for wireless and/or wired communication. Communication interface 3006 may also include multiple communication interfaces of different types. Other configurations are possible as well.

Although not shown, edge computing system 3000 may additionally include or have an interface for connecting to user-interface components that facilitate user interaction with edge computing system 3000, such as a keyboard, a mouse, a trackpad, a display screen, a touch-sensitive interface, a stylus, a virtual-reality headset, and/or speakers, among other possibilities.

It should be understood that edge computing system 3000 is one example of a computing system that may be used with the embodiments described herein. Numerous other arrangements are possible and contemplated herein. For instance, other computing systems may include additional components not pictured and/or more or fewer of the pictured components.

CONCLUSION

Example embodiments of the disclosed innovations have been described above. At noted above, it should be understood that the figures are provided for the purpose of illustration and description only and that various components (e.g., modules) illustrated in the figures above can be added, removed, and/or rearranged into different configurations, or utilized as a basis for modifying and/or designing other configurations for carrying out the example operations disclosed herein. In this respect, those skilled in the art will understand that changes and modifications may be made to the embodiments described above without departing from the true scope and spirit of the present invention, which will be defined by the claims.

Further, to the extent that examples described herein involve operations performed or initiated by actors, such as humans, operators, users or other entities, this is for purposes of example and explanation only. Claims should not be construed as requiring action by such actors unless explicitly recited in claim language.

The invention claimed is:

1. A communication system comprising:
 a set of nodes that are installed with respective equipment for operating as part of a wireless mesh network, the set of nodes comprising:
  a first tier of one or more nodes that are each located at a Point of Presence (PoP) site having fiber access to a core network;
  a second tier of one or more nodes that are each located at a respective seed site, wherein each node in the second tier is directly connected to at least one node in the first tier via a PoP-to-seed wireless link; and
  a third tier of one or more nodes that are each located at a respective anchor site, wherein each node in the third tier is connected to at least one node in the second tier either (i) directly via a seed-to-anchor wireless link or (ii) indirectly via one or more intermediate nodes in the third tier, one or more anchor-to-anchor wireless links, and one seed-to-anchor wireless link,
   wherein at least one node in the first tier, at least one node in the second tier, and at least one node in the third tier is further installed with respective equipment for operating as part of an edge computing platform.

2. The communication system of claim 1, wherein the respective equipment for operating as part of the edge computing platform installed at each of the at least one node in the first tier, the at least one node in the second tier, and the at least one node in the third tier comprises a respective edge computing system.

3. The communication system of claim 2, wherein:
 the respective edge computing system installed at the at least one node in the first tier has a higher level of processing power than the respective edge computing system installed at the least one node in the second tier; and
 the respective edge computing system installed at the least one node in the second tier has a higher level of processing power than the respective edge computing system installed at the least one node in the third tier.

4. The communication system of claim 2, wherein the respective edge computing systems installed at the at least one node in the first tier, the at least one node in the second tier, and the at least one node in the third tier are configured to coordinate with one another to arbitrate utilization of computing resources within the edge computing platform based at least on (i) processing power and (ii) latency.

5. The communication system of claim 1, wherein each PoP-to-seed wireless link, each seed-to-anchor wireless link, and each anchor-to-anchor wireless link comprises a millimeter-wave point-to-point (ptp) link.

6. The communication system of claim 1, further comprising:
   a client node that is connected to the wireless mesh network via an anchor-to-client wireless link that originates at a given node in the third tier, wherein the client node is configured to operate as an endpoint for an edge computing application that utilizes the edge computing platform.

7. The communication system of claim 6, wherein each PoP-to-seed wireless link, each seed-to-anchor wireless link, and each anchor-to-anchor wireless link comprises a millimeter-wave point-to-point (ptp) link, and wherein the anchor-to-client wireless link comprises a millimeter-wave point-to-multipoint (ptmp) link.

8. The communication system of claim 6, wherein the given node in the third tier comprises whichever node in the third tier is physically closest to the client node.

9. The communication system of claim 1, wherein each respective seed site and each respective anchor site comprises a residential or commercial building.

10. The communication system of claim 1, wherein the wireless mesh network is utilized to deliver high-speed internet service to end users.

* * * * *